US009645726B2

(12) United States Patent
Moore et al.

(10) Patent No.: US 9,645,726 B2
(45) Date of Patent: May 9, 2017

(54) MAPPING APPLICATION WITH INTERACTIVE DYNAMIC SCALE AND SMART ZOOM

(71) Applicant: Apple Inc., Cupertino, CA (US)

(72) Inventors: Bradford A. Moore, San Francisco, CA (US); Alexandre Carlhian, Paris (FR); Edouard D. Godfrey, Paris (FR); Guillaume Borios, Boulogne-Billancourt (FR); Albert P. Dul, San Jose, CA (US); Marcel van Os, San Francisco, CA (US); Woo-Ram Lee, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 363 days.

(21) Appl. No.: 14/078,503

(22) Filed: Nov. 12, 2013

(65) Prior Publication Data

US 2014/0365934 A1 Dec. 11, 2014

Related U.S. Application Data

(60) Provisional application No. 61/832,836, filed on Jun. 8, 2013.

(51) Int. Cl.
  *G06F 3/048* (2013.01)
  *G06F 3/0486* (2013.01)
  (Continued)

(52) U.S. Cl.
  CPC ......... *G06F 3/0486* (2013.01); *G01C 21/367* (2013.01); *G01C 21/3664* (2013.01); *G06F 3/04815* (2013.01); *G06F 3/04842* (2013.01)

(58) Field of Classification Search
  None
  See application file for complete search history.

(56) References Cited

U.S. PATENT DOCUMENTS 6,178,380 B1  1/2001  Millington
6,202,026 B1  3/2001  Nimura et al.
(Continued)

FOREIGN PATENT DOCUMENTS

EP  1788541  5/2007
EP  2672223  12/2013
(Continued)

OTHER PUBLICATIONS

Author Unknown, "Android 2.3.4 User's Guide", May 20, 2011, pp. 1-384, Google, Inc.
(Continued)

*Primary Examiner* — William Trapanese
(74) *Attorney, Agent, or Firm* — Gianni Minutoli; Page Ponsford; DLA Piper LLP US

(57) ABSTRACT

Some embodiments provide a mapping application that includes a novel dynamic scale that can be used to perform different zoom operations. In some embodiments, the scale also serves as a distance measurement indicator for a corresponding zoom level. The application continuously adjusts several different attributes of the scale, including the scale size, the number of segments on the scale and the representative distance of a segment on the scale. In some embodiments, the mapping application provides a smart zoom feature that guides a user during a zoom to a location. In particular, the smart zoom detects that a location of a zoom is near a pin on the map, and if so, zooms to the pin on the map. Otherwise, if the location is near a cloud of pins, the application zooms to the cloud of pins. Otherwise the zoom is directed towards the user's selected location.

26 Claims, 32 Drawing Sheets

(51) Int. Cl.
  *G06F 3/0481* (2013.01)
  *G06F 3/0484* (2013.01)
  *G01C 21/36* (2006.01)

(56) References Cited

U.S. PATENT DOCUMENTS

| | | | |
|---|---|---|---|
| 6,321,158 B1 | 11/2001 | DeLorme et al. | |
| 6,983,203 B1* | 1/2006 | Wako | G01C 21/3682 340/988 |
| 7,437,279 B2 | 10/2008 | Agrawala et al. | |
| 7,542,882 B2 | 6/2009 | Agrawala et al. | |
| 8,355,862 B2 | 1/2013 | Matas et al. | |
| 8,464,182 B2 | 6/2013 | Blumenberg et al. | |
| 8,468,469 B1* | 6/2013 | Mendis | G06F 3/0484 715/788 |
| 8,606,516 B2 | 12/2013 | Vertelney et al. | |
| 8,607,167 B2 | 12/2013 | Matas et al. | |
| 8,639,654 B2 | 1/2014 | Vervaet et al. | |
| 2003/0191578 A1* | 10/2003 | Paulauskas | G01C 21/3682 701/438 |
| 2004/0162669 A1 | 8/2004 | Nagamasa | |
| 2006/0247855 A1* | 11/2006 | de Silva | G01C 21/36 701/454 |
| 2008/0040024 A1 | 2/2008 | De Silva | |
| 2008/0086264 A1* | 4/2008 | Fisher | 701/209 |
| 2009/0187335 A1 | 7/2009 | Muhlfelder et al. | |
| 2009/0198767 A1 | 8/2009 | Jakobson et al. | |
| 2010/0045704 A1 | 2/2010 | Kim | |
| 2010/0268448 A1 | 10/2010 | Doan et al. | |
| 2011/0167058 A1 | 7/2011 | van Os | |
| 2011/0249030 A1 | 10/2011 | Hirose et al. | |
| 2011/0313649 A1 | 12/2011 | Bales et al. | |
| 2012/0151401 A1* | 6/2012 | Hwang | G06F 3/0488 715/771 |
| 2013/0325339 A1 | 12/2013 | McCarthy | |
| 2013/0325342 A1 | 12/2013 | Pylappan et al. | |
| 2013/0328861 A1 | 12/2013 | Arikan et al. | |
| 2013/0328915 A1 | 12/2013 | Arikan et al. | |
| 2013/0328916 A1 | 12/2013 | Arikan et al. | |
| 2013/0328924 A1 | 12/2013 | Arikan et al. | |

FOREIGN PATENT DOCUMENTS

| | | |
|---|---|---|
| EP | 2672225 | 12/2013 |
| EP | 2672226 | 12/2013 |
| WO | WO 2011/146141 | 11/2011 |
| WO | WO 2012/034581 | 3/2012 |
| WO | WO 2013/184348 | 12/2013 |
| WO | WO 2013/184444 | 12/2013 |
| WO | WO 2013/184445 | 12/2013 |
| WO | WO 2013/184449 | 12/2013 |
| WO | WO 2013/184450 | 12/2013 |

OTHER PUBLICATIONS

Author Unknown, "GARMIN. nüví 1100/1200/1300/1400 series owner's manual," Jan. 2011, 72 pages, Garmin Corporation, No. 68, Jangshu $2_{nd}$ Road, Sijhih, Taipei County, Taiwan.
Author Unknown, "Google Maps Voice Navigation in Singapore," software2tech, Jul. 20, 2011, 1 page, available at http://www.youtube.com/watch?v=7B9JN7BkvME.
Author Unknown, "'Touch & Go' Owner's Manual," Jul. 2011, 218 pages, Toyota, United Kingdom.
Ruhs, Chris, "My Favorite Android Apps: Maps," Jun. 24, 2011, 1 page, available at http://www.youtube.com/watch?v=v2aRkLkLT3s.

* cited by examiner

MAPPING APPLICATION WITH INTERACTIVE DYNAMIC SCALE AND SMART ZOOM

CLAIM OF BENEFIT TO PRIOR APPLICATIONS

This application claims benefit to U.S. Provisional Patent Application 61/832,836, filed Jun. 8, 2013, which is incorporated herein by reference.

BACKGROUND

With proliferation of computing devices such as smartphones, tablets, laptops, and desktops, users are enjoying numerous applications of numerous kinds that can be run on their devices. One popular type of such application is mapping applications that allow user to browse maps. Despite their popularity, these mapping applications have shortcomings with their user interfaces and features that can cause inconvenience to the users. For example, users may be limited in the variety of tools they may use to navigate a map. Furthermore, the existing tools may be limited in the variety of operations that they may be used to perform.

BRIEF SUMMARY

Some embodiments of the invention provide a mapping application that includes several novel on screen controls. In some embodiments, these novel controls include one or more of a dynamic scale that can be used to perform different zoom operations and an interactive compass control for adjusting a 2D/3D presentation of a map being displayed by the mapping application. The mapping application may be executed both on a device that has a touch-sensitive screen (e.g., smartphone, tablet) or a device that receives user input through various other mechanisms (e.g., a desktop, laptop, etc.). For example, the mapping application can be controlled using a variety of input devices, including any combination of a trackpad, keypad, and mouse.

In some embodiments, the dynamic scale serves as a distance measurement indicator for a corresponding zoom level of the map. The dynamic scale of some embodiments displays several different values for different attributes of the scale. These attributes include the range of the scale (e.g., 0 to 20 miles), the number of segments displayed on the scale (e.g., 2 segments corresponding to 0-10 and 10-20 miles vs. 3 segments corresponding to 0-10, 10-20 and 20-30 miles), and the size of the scale (adjustable size that varies between e.g., 0.5-2 cm on display screen). The mapping application of some embodiments continuously computes the values for the several attributes of the dynamic scale for different zoom levels. Furthermore, in some embodiments a user may select and drag the scale in different directions in order to change to different zoom levels of the map.

In some embodiments, the mapping application provides a "smart-aim" zoom feature that guides a user during a zoom to a location on the map. In particular, the smart-aim zoom will first determine whether a particular location at which a user would like to zoom is near a particular point of interest on the map. If the user's selected location is near a point of interest on the map, the mapping application of some embodiments zooms to the point of interest on the map. If the location is not near a single point of interest, but near a cloud of points of interest, the mapping application of some embodiments zooms to the center of the cloud of points of interest on the map. Otherwise the zoom is directed towards the user's selected location. In some embodiments, the smart-aim zoom feature treats points of interest on the map the same as "pins" on the map.

In some embodiments, the mapping application also provides a "locked" zoom feature that allows a user to focus a zoom on a particular location of the map without having to constantly re-center the map region to zoom in on the location. In particular, the locked zoom feature locks a particular location to use as a "center" of a zoom when it first receives an initial input to zoom the map. The subsequent zooms are then locked towards this particular location even though the location indicator may be moved to a different area of the map. For example, a user may apply a series of two-finger spreading gestures on a trackpad device to zoom-in on a particular location on the map. While applying these series of gestures on the trackpad, the user may accidentally cause the location indicator to move to a different location of the map than the original location at which the user intended to direct the zoom. However, the locked zoom feature of the mapping application prevents the application from zooming to the moved location indicator location, since the application locked the center of the zoom at the original location at which the user first initiated the zoom on the map. Thus the user may continue to apply the gestures to zoom towards this original intended location without having to constantly re-center the map on the original location when the location indicator is accidentally moved to a different location on the map.

In some embodiments the mapping application also provides an interactive compass control that can be used to apply several different operations in the mapping application. For example, different user input on the compass control can cause the mapping application to perform various different operations, including rotating the map in different directions, transitioning the map presentation between a 2D and 3D mode, and various other operations based on the particular type of user input. In particular, when the compass is dragged in a first vertical direction, the mapping application of some embodiments transitions from a 2D presentation to a 3D presentation (or vice-versa). When the compass control is dragged in a second, horizontal direction, the mapping application of some embodiments rotates the map in conjunction with the rotation of the compass. When the compass control receives a first selection input (e.g., a mouse click on the compass control), both the compass and corresponding map are rotated until they reach a north-up orientation. When the compass receives a second subsequent selection input (e.g., a second mouse click), the mapping application toggles the presentation of the map between a 2D and 3D mode. In addition to causing the application to perform the various operations described above, the compass control in some embodiments serves as (1) an indicator as to whether the mapping application is currently in a 2D mode or a 3D mode and (2) an indicator that continuously points to north (e.g., the direction to the North Pole).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
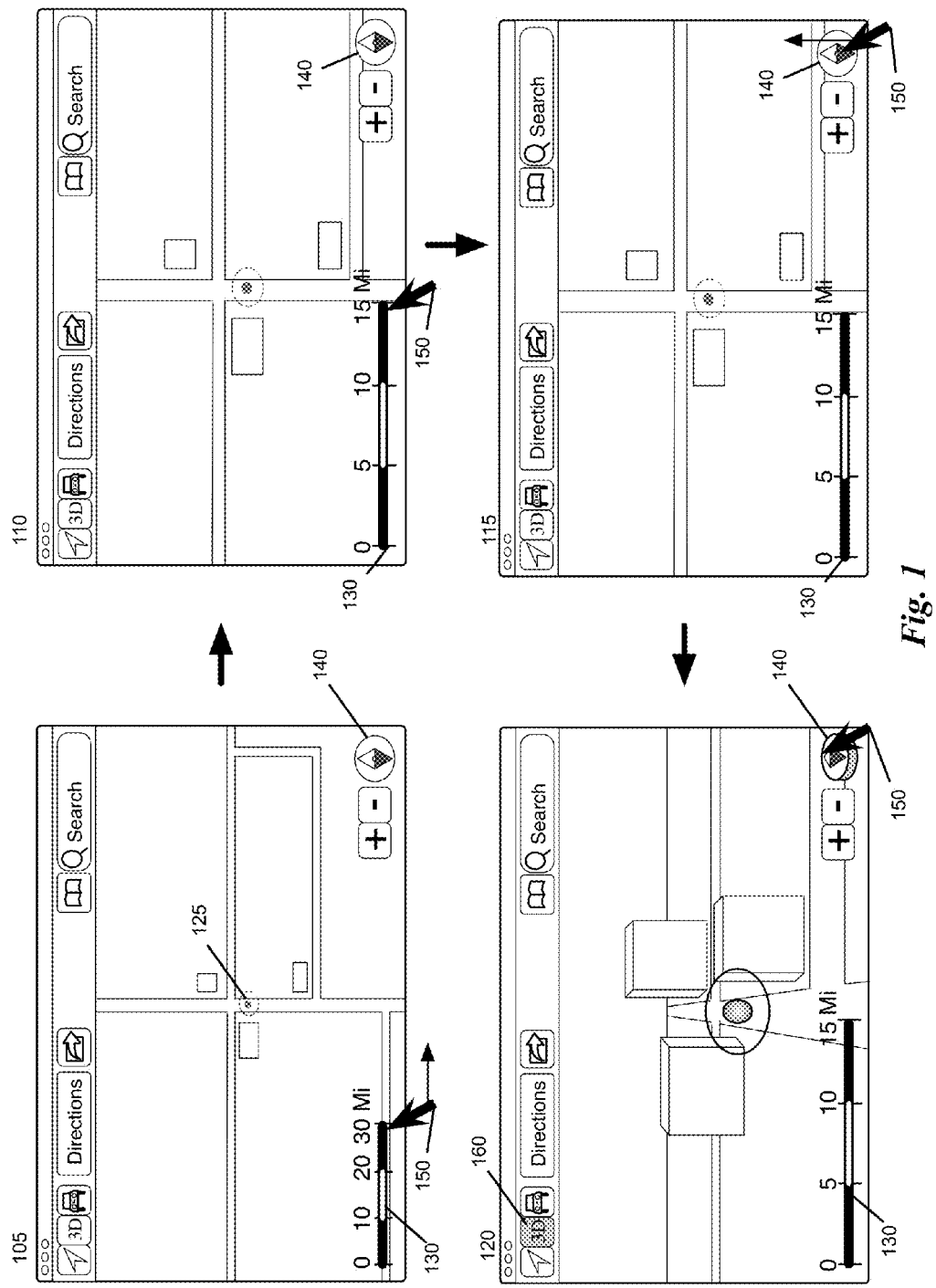
FIG. 1 conceptually illustrates a graphical user interface of a mapping application of some embodiments that provides novel on screen controls, including a novel dynamic scale and a novel compass control.

Some embodiments of the invention provide a mapping application that provides several novel on screen controls. In some embodiments, these novel controls include one or more of a dynamic scale that can be used to perform different zoom operations and an interactive compass control for adjusting a 2D/3D presentation of a map displayed by the mapping application. FIG. 1 illustrates a graphical user interface of a mapping application in some embodiments that includes the novel on screen controls. The example illustrated in this figure is provided in terms of four stages 105-120 of interactions with the mapping application using the novel on screen controls.

Stage 105 of this figure illustrates the user interface (UI) of the mapping application. The mapping application provides two novel selectable UI items, which are a selectable dynamic scale 130 and a selectable compass control 140. The dynamic scale 130 serves as both a distance measurement indicator for a corresponding zoom level of the map and a tool for zooming to different zoom levels of the map.

The compass control 140 provides a tool for navigating the map and transitioning between a 2D and 3D presentation of the map. Furthermore, the compass control 140 serves as an indicator as to 1) the direction north on the map and 2) whether the map is in a 2D or 3D mode. In some embodiments, this compass control 140 is in the shape of two isosceles triangles that abut at their bases, with one of the triangles pointing north (in a direction away from the abutting bases) and having a color (e.g., orange) that differentiates it from the other triangle. As further described below, the compass control 140 can also be used to restore a north-up orientation after the user has rotated a 2D or 3D view of the map.

Stage 105 illustrates the mapping application displaying a region of a map. The map region includes 3 buildings and various intersecting roads. The user's current location 125 is also indicated on the map. The dynamic scale 130 displays several different attributes within the scale to provide the user with a distance measurement tool, including a range of the scale, the size of the scale as displayed on the screen of the device, the number of segments on the scale, and the value of each segment. In this example, the scale 130 is illustrated with each segment having an alternating color pattern (i.e., black/white/black). In some embodiments, the scale is a solid line with tick marks used to illustrate the different segments of the line. As illustrated, scale 130 currently has a range of 0-30 miles, includes 3 segments that correspond to 0-10, 10-20 and 20-30 mile segments, and has a particular size on the map (e.g., between 0.5 and 2 cm on the screen). For this particular zoom level, the mapping application has computed these particular values for each of the different attributes of the scale 130. Furthermore, the scale 130 may adjust any one of these attributes, including the range, the number of segments to display, the size of each segment, the size of the scale, and the segment unit value of the segment (e.g., feet, miles, etc. for the standard system or meters, kilometers, etc. for metric system) as needed based on the particular zoom level of the map.

In some embodiments, the scale 130 can also be used as a UI tool for changing the zoom level of the map being displayed by the mapping application. In particular, a user may perform a dragging operation on the scale 130 in different directions to either zoom in or zoom out of the map. Stage 105 illustrates the user performing a drag operation on the scale 130 using a location indicator 150 (e.g., cursor) to select and drag the scale 130. In particular, the user is selecting and dragging the scale 130 to the right in order to increase the size of the scale. By increasing the size of the scale, the user is also zooming in on the region of the map being displayed by the mapping application. Likewise, if a user decreases the size of the scale 130 (e.g., by dragging the scale to the left), the mapping application will zoom out to a lower zoom level of the map.

Stage 110 illustrates that the mapping application has zoomed in on the map and is now displaying a larger region of the map as a result of the user having dragged the scale in stage 105. The roads on the map now appear wider than in stage 105. Likewise, the mapping application has adjusted the various attributes being displayed by the scale 130 for this particular zoom level. In particular, the scale 130 now has a range between 0-15 miles and the size of the scale 130 as displayed on the screen of the device has increased in order to accurately provide a distance measurement for the new zoom level. However, the mapping application has kept the number of segments displayed on the scale at 3 corresponding to 0-5, 5-10 and 10-15 from the previous stage 105, with each segment having a segment unit value of 5 miles. Thus the mapping application determined, based on its computations for the different attribute values of the scale, that it needed to adjust the size of the scale and the segment unit value of each segment of the scale between stage 105 and 110. Stages 105-110 illustrate the changing attributes of the dynamic scale 130 for different zoom levels and using the dynamic scale to zoom to the different zoom level.

In some embodiments, the mapping application provides a "smart-aim" zoom feature that guides a user when zooming on a location on the map. In particular, the smart-aim zoom will first determine whether a particular location at which a user would like to zoom is near a particular point of interest on the map. If the user's selected location is near a point of interest on the map, the mapping application zooms to the point of interest on the map. If the location is not near a single point of interest, but near a cloud of points of interest, the mapping application zooms to the center of the cloud of points of interest on the map. Otherwise the zoom is directed towards the user's selected location.

A user may also use the compass control 140 to perform 2D/3D perspective view adjustments. The user may drag the compass control 140 in different directions in order to apply several different operations in the mapping application. In particular, when the compass control 140 is dragged in a first vertical direction, the mapping application transitions from a 2D presentation to a 3D presentation (or vice-versa). When the compass control 140 is dragged in a second, horizontal direction, the mapping application rotates the map in conjunction with the rotation of the compass. When the compass control 140 receives a first selection input (e.g., a mouse click on the compass control), both the compass 140 and corresponding map are rotated until they reach a north-up orientation. When the compass control 140 receives a second subsequent selection input (e.g., a second mouse click), the mapping application toggles the presentation of the map between a 2D and 3D mode. In addition to causing the application to perform the various operations described above, the compass control 140 serves as (1) an indicator as to whether the mapping application is currently in a 2D mode or a 3D mode and (2) an indicator that continuously points to north (e.g., the direction to the North Pole).

Stage 115 illustrates that the compass control 140 is currently displayed as a two-dimensional icon to indicate that the mapping application is in a 2D mode. Furthermore, stage 115 illustrates the mapping application receiving a select and drag of the compass control 140 in a vertical direction. This causes the map view to begin to transition from the current 2D mode to a 3D mode. Stage 120 illustrates the mapping application displaying the region of the map in a 3D mode. The building and roads are now illustrated in 3D. The compass control 140 has also changed appearance in order to indicate that the mapping application is currently in a 3D mode. In particular, the compass control 140 is also displayed in 3D, and has been tilted at an angle that corresponds to the current view of the map. Thus the compass control 140 serves as an on screen control tool to perform various adjustments to the 2D/3D viewing mode of the map. Furthermore, the compass control also serves as an indicator of the current viewing mode of the map. In some embodiments, when the mapping application displays the map in 3D, the scale 130 disappears from the display because in such a perspective view, different portions of the map will have different scales. In other embodiments, as shown, the mapping application continues displaying the scale unless the difference in scale between the top and bottom of the map reaches a certain threshold.

The above-described features as well as some other features of the mapping application of some embodiments are further described below. In the description above and below, many of the features are described as part of a mapping application that provides a novel dynamic scale and interactive compass control. However, one of ordinary skill will realize that the novel operations performed by these controls are performed in other embodiments by applications that do not perform all of these operations, or perform other operations in addition to these operations.

Several more detailed embodiments of the invention are described in the sections below. Section I provides a conceptual description of the dynamic scale feature of the mapping application of some embodiments. Next, Section II conceptually describes various zooming operations, including "smart-aim" and "locked" zoom features of the mapping application of some embodiments. Section III describes the interactive compass control for controlling the display of the map region on the mapping application. Section IV provides a description of several electronic systems that implement some embodiments of the invention. Finally, Section V describes a map service environment in which the mapping application of some embodiments operates.

I. Dynamic Scale

In some embodiments, the mapping application provides a dynamic scale that serves as a distance measurement indicator for a corresponding zoom level of the map. The dynamic scale displays several different values for different attributes of the scale. These attributes include the range of the scale (e.g., 0 to 20 miles), the segment unit value of the scale (e.g., feet, miles vs. meters, kilometers, etc.), the number of segments displayed in the scale (e.g., 2 segments corresponding to 0-10 and 10-20 miles vs. 3 segments corresponding to 0-10, 10-20 and 20-30 miles), and the size of the scale (adjustable size that varies between e.g., 0.5-2 cm on display screen). The dynamic scale continuously computes the values for the several attributes of the scale for different zoom levels. Furthermore, a user may select and drag the scale in different directions and amounts in order to change to different zoom levels of the map.

Figure 2:
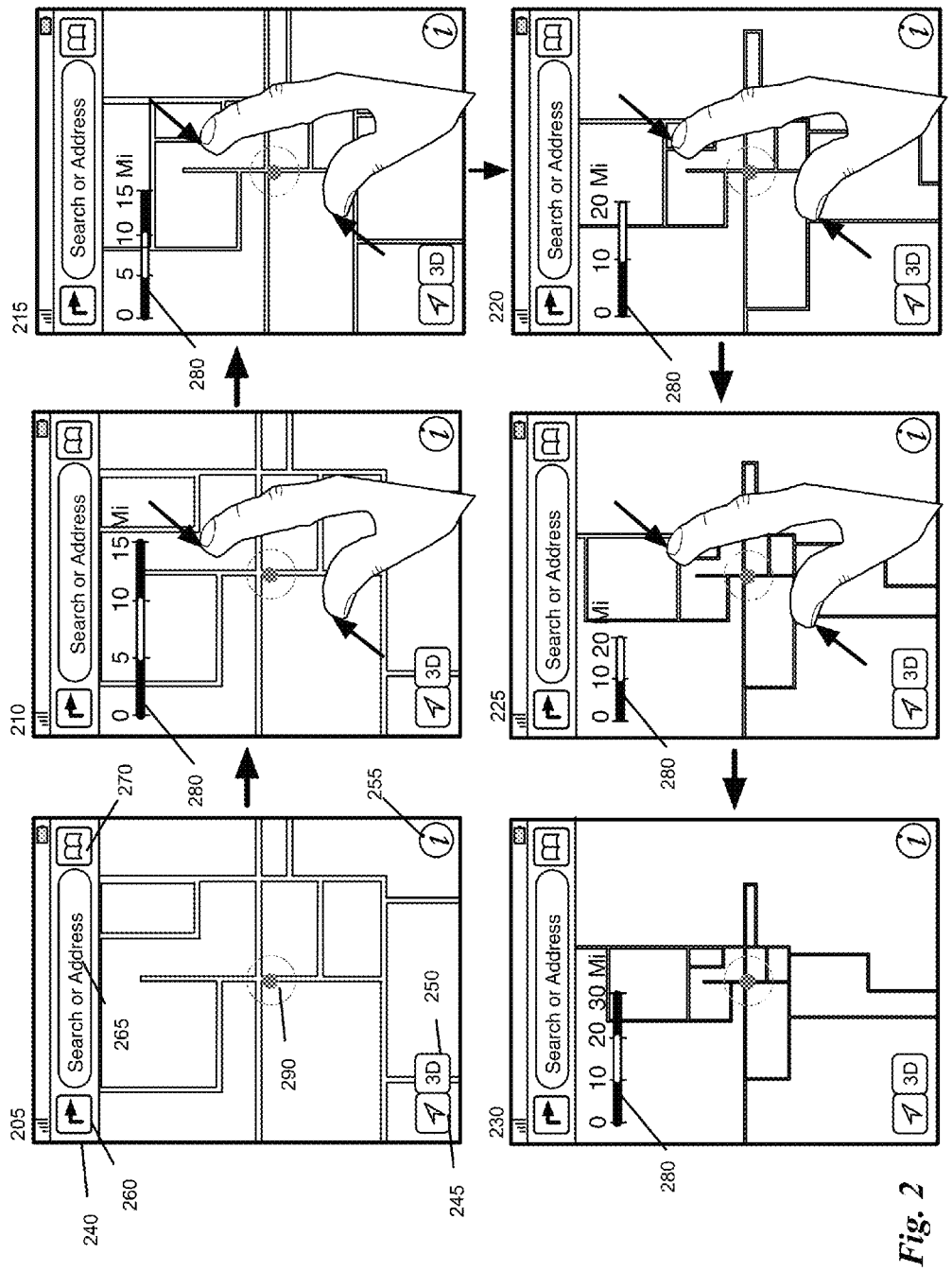
FIG. 2 conceptually illustrates the dynamic scale of the mapping application operating on a device with a touch-screen user interface.
Figure 3:
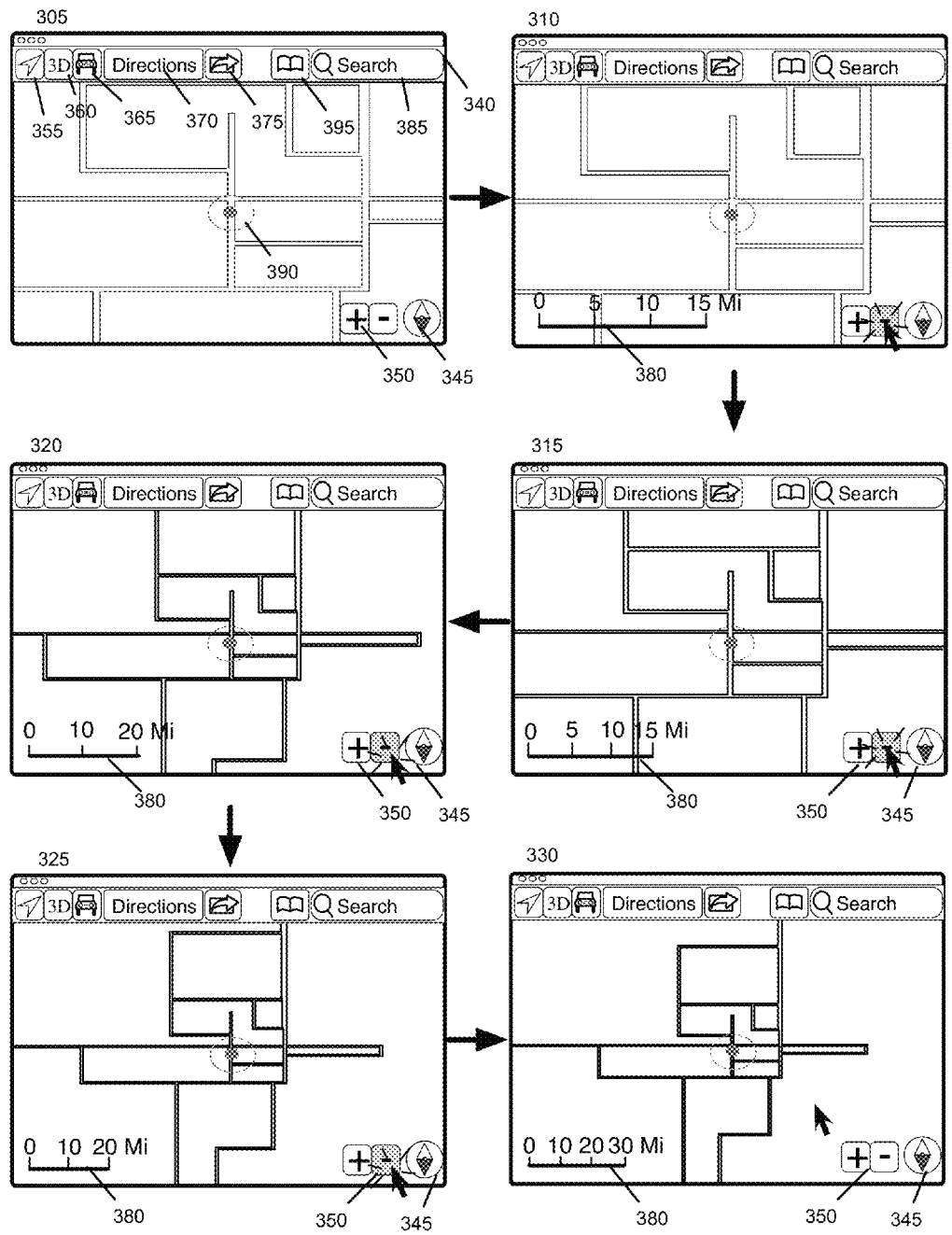
FIG. 3 conceptually illustrates the dynamic scale of the mapping application operating on a device with a cursor-controlled user interface.

As the mapping application changes the map to different zoom levels, it continuously calculates and updates the values for each of these different attributes that are to be displayed on the scale. In particular, the mapping application computes certain desirable number values for the range and segment unit values displayed on the scale. For example, the mapping application will compute desirable values for the attributes of the scale by applying, during the computation of the scale values, different rounding mechanisms. The computations are thus able to produce certain desirable number values for different attributes of the scale. For example, the computations produce segment unit values such as 100 feet, 200 feet, 500 feet, 1 mile, 2 miles, 5 miles, 10 miles, etc. In some embodiments, computations for the scale are able to obtain the desirable values by using a combination of computing a base 10 logarithm of a particular number and then applying a subsequent rounding of the fractional portion of the number. FIGS. 6-10 provided further details regarding these computations for the attributes of the scale. FIGS. 2-3 described below further illustrate the dynamic scale of the mapping application with the changing attributes for the different zoom levels.

The mapping application of some embodiments operates both on mobile devices and standard desktop or laptop devices. Examples of such mobile devices are smartphones (e.g., iPhone® sold by Apple Inc., phones operating the Android® operating system, phones operating the Windows 8® operating system, etc.). The mapping application of some embodiments operates as an application running on an operating system (e.g., OS X®, Windows®, Linux®, etc.) of a desktop or laptop device. FIG. 2 illustrates the dynamic scale of the mapping application operating on a device with a touch-screen user interface (e.g., an iPhone®) and FIG. 3 illustrates the dynamic scale of the mapping application operating on a device with a cursor-controlled user interface (e.g., an application running on the OS X® operating system of a desktop or laptop computer).

FIG. 2 illustrates the dynamic scale of the mapping application operating on a mobile device with a touch-screen interface (e.g., iPhone®). More specifically the example of this figures illustrates in terms of six operations stages 205-230 a user's interaction with the mapping application and how the interactions affect the dynamic scale. Before describing the different stages in this example, the various components of the mapping application user interface (UI) will first be described.

Stage 205 illustrates the mapping application's UI that in some embodiments displays (1) a map of the current location 290 of the device, and (2) several UI controls arranged in both a top bar 240 and as floating controls. As shown in stage 205 of FIG. 1, the floating controls include a position control 245, a 3D control 250, and an information control 255, while the top bar 240 includes a direction control 260, a search field 265, and a bookmark control 270.

The direction control 260 opens a page through which a user can request a route to be identified between a starting location and an ending location. This control provides a mechanism through which the mapping application can be directed to identify and display a route between two locations.

In some embodiments, a user can initiate a search by tapping on the search field 265. This directs the application to present an animation that (1) presents an on-screen keyboard and (2) opens a search table full of recent search queries and other types of information. The user may then enter a search query into the search field. The results of the search query are presented as "pins" on the map. Each pin is dropped on the map at a particular location that corresponds to the pin.

The bookmark control 270 (e.g., button) allows location and routes to be bookmarked by the application. The position control 245 allows the current position of the device to be specifically noted on the map. In some embodiments, once this position control is selected, the application maintains the current position of the device in the center of the map as the device is moving in some embodiments. In some embodiments, the position control can also identify the direction to which the device currently points. The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location.

Lastly, the 3D control 250 is a control for viewing the map in three dimensions (3D). The mapping application provides the 3D control 250 as a quick mechanism of getting into and out of 3D. This control also serves as (1) an indicator that the current view is a 3D view (e.g., by highlighting the control), and (2) an indicator that a 3D perspective is available for a given map view (e.g., a map view that is zoomed out might not have a 3D view available). Having described the various controls and UI tools of the mapping application UI, an example operation of the mapping application, including the changes of the dynamic scale for different zoom levels will now be described with reference to the six stages 205-230 illustrated in FIG. 2.

Stage 205 illustrates the mapping application displaying a region of a map and the various UI controls described above. As shown, the mapping application is not currently displaying a scale on the map. In some embodiments, the mapping application initially launches without displaying the scale. Some embodiments do not display the scale on the map until the user begins a zoom operation of the map or provides other input to cause the scale to appear. Other embodiments, however, always display the scale overlaid on the map.

Stage 210 illustrates the mapping application receiving gestural input through a multi-touch interface of the device. This interface allows a user to provide touch and gestural inputs through the touch-sensitive screen of the device in order to interact with the mapping application. As illustrated in stage 210, the user is applying a two-finger pinching gesture on the screen of the device which has the effect of zooming out on the map. Different embodiments provide different gestural inputs to adjust the map view.

As described, in some embodiments, the gestural input is a two-finger pinching or spreading that will cause the mapping application to change to a different zoom level. Furthermore, some embodiments provide other gestural inputs (e.g., a finger drag or swipe operation) that also change the region of the map being displayed in different manners. In order to illustrate the dynamics of the changing scale 280 for different zoom levels, each stage 210-225 of FIG. 2 illustrates the user continuing to apply a two-finger pinch gesture in order to zoom out of the map region.

Stage 210 also illustrates that the mapping application overlays a scale 280 on the upper left corner of the map. In some embodiments, the scale 280 may appear after a user initiates a zoom operation (e.g., through gestural input) to a different level of the map. In other embodiments, the scale 280 may appear on the map when the mapping application is initially launched by the operating system of the device. In some embodiments, the mapping application only displays the scale while a user performs a zoom operation on the map and removes the scale a threshold time period after the user finishes the zoom operation. In some embodiments, the mapping application animates both the display and removal of the scale. In particular, when a user performs a gesture to zoom the map, the scale fades in to the map display area. After a user has finished performing the zooming gesture, the mapping application fades the scale out of the map display area. Furthermore, in some embodiments, the scale may appear for a certain threshold time period after a user navigates to a different region of the map.

As illustrated, the scale 280 includes various different attributes, including a range of the scale, the size of the scale as displayed on the screen of the device, the number of segments in the scale, and a segment unit value of each segment. As illustrated, scale 280 currently has a range of 0-15 miles, includes 3 segments with a segment unit value of 5 miles that correspond to 0-5, 5-10 and 10-15 mile segments, and has a particular size on the map (e.g., between 0.5 and 2 cm on the screen). For this particular zoom level, the mapping application has computed these particular values for each of the different attributes of the scale. Furthermore, the scale may modify any one of these attributes, including its range, the number of segments to display, the size of each segment, the size of the scale, and the unit value of the scale (e.g., feet, miles, etc. for the standard system or meters, kilometers, etc. for metric system) as needed based on the particular zoom level of the map.

Stage 215 illustrates that the mapping application has zoomed further out and now displays a larger region of the map. The roads on the map now appear narrower than in stage 210. Likewise, the mapping application has adjusted the scale 280 for this particular zoom level. In particular, the mapping application has retained the same values for the range (0-15 miles), number of segments (3), and segment unit value of each segment (5 mile) as the attributes of the scale 280. However, the mapping application has reduced the size of the scale 280 as displayed on the screen of the device from the previous stage 210. Thus the mapping application determined, based on its computations for the different attribute values of the scale 280, to reduce the size of the scale between stage 210 and 215. The size is smaller because now the measurements on the map have changed for the new zoom level. In particular, a 5-mile segment now corresponds to a smaller portion of the map. Stage 215 also illustrates that the user is again applying a two-finger pinching gesture in order to zoom further out of the map region.

Stage 220 illustrates that the mapping application has zoomed out even further than in stage 215 and is now displaying an even larger region of the map than stage 215. For this particular zoom level, the mapping application has computed numerous different values for the different attributes of the scale 280. This stage 220 illustrates that the mapping application has dynamically changed several attributes of the scale 280, including the range, the number of segments, and the segment unit value of each segment. In particular, the range of the scale 280 has changed from stage 215 and is now from 0 to 20 miles, and the number of segments being displayed has been reduced from three to two, with the segment unit value now corresponding to a 10 mile distance on the map (e.g., 0-10 and 10-20 miles). In addition, the mapping application has adjusted the scale 280 size in order to accurately provide the correct distance measurement on the map for the particular zoom level. In particular, a 10-mile segment now corresponds to a larger portion of the map than the previous 5-mile segment, although the 10-mile segment of course corresponds to a smaller portion of the map than 10 miles at the previous zoom level. Stage 220 also illustrates the user continuing to zoom further out of the map region.

Stage 225 illustrates that the mapping application has zoomed out further from stage 220, and is now showing a larger region of the map than stage 220. The mapping application has reduced the size of the scale 280. In particular, a 10-mile segment now corresponds to a smaller portion of the map as compared to stage 220. However, the mapping application has kept the same range (0-20), number of segments (2), and segment unit values (10 miles) for the scale 280 as stage 220. Stage 225 illustrates the user is again continuing to zoom out of the map region.

Stage 230 illustrates that the mapping application has zoomed out further from stage 225. The scale 280 has now changed for this particular zoom level. In particular, mapping application has added a segment to the scale 280 so that it now displays three segments, rather than two segments, which correspond to 0-10, 10-20 and 20-30 miles. Thus the range of the scale 280 is now from 0-30 miles rather than 0-20 miles. Furthermore the total size of the scale 280 has increased (due to the addition of an additional segment), although the size of an individual segment decreased slightly from stage 225.

Stage 230 illustrates that the mapping application continues displaying the scale 280 although the user is no longer providing a gestural input to zoom the map. In some embodiments, after a certain threshold time period has expired from the time at which the user last performed a zoom gesture, the mapping application removes the scale 280 from the map (not illustrated).

Figure 8:
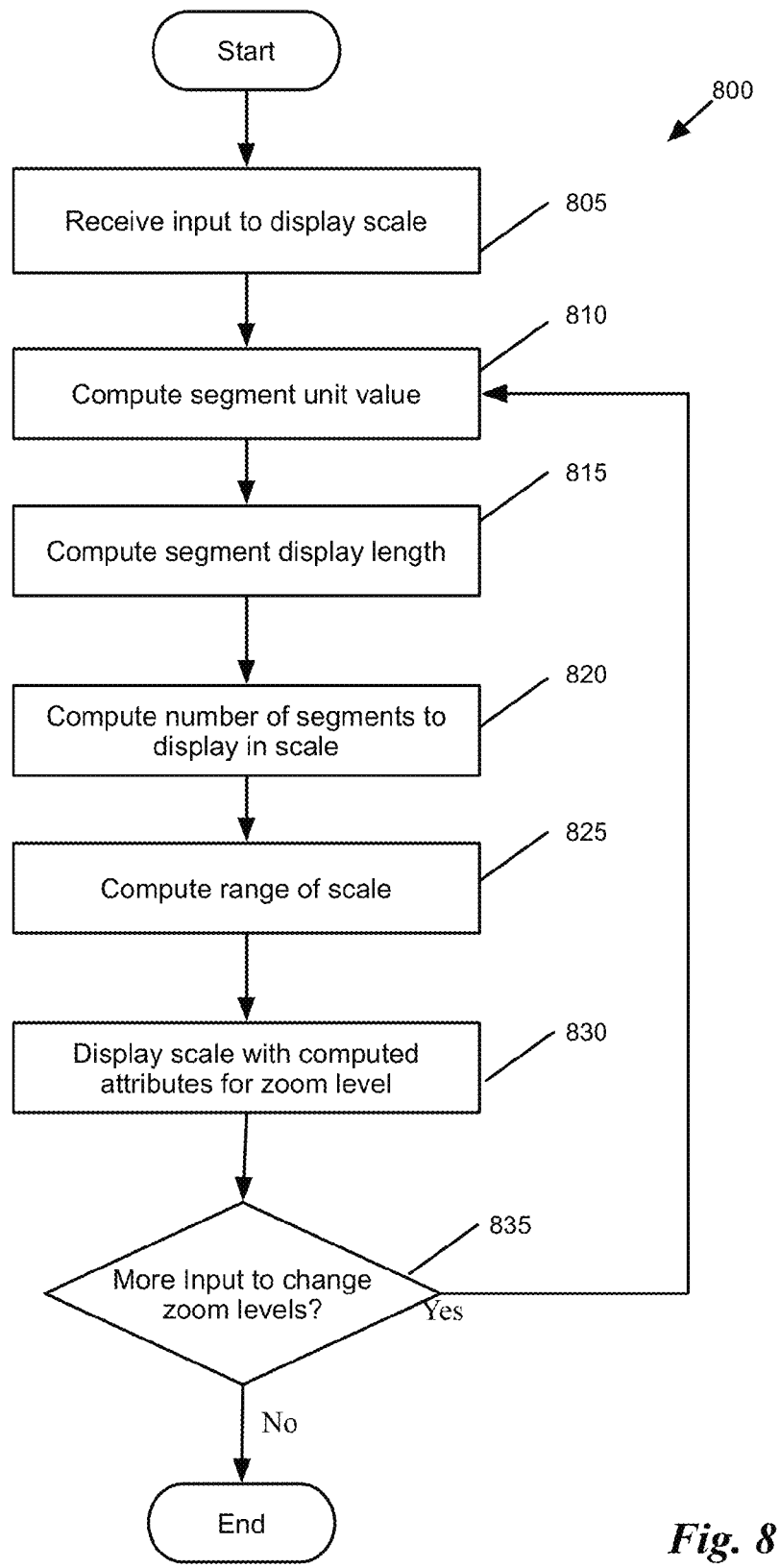
FIG. 8 conceptually illustrates a process of some embodiments for computing the attributes of the dynamic scale on the mapping application.
Figure 9:
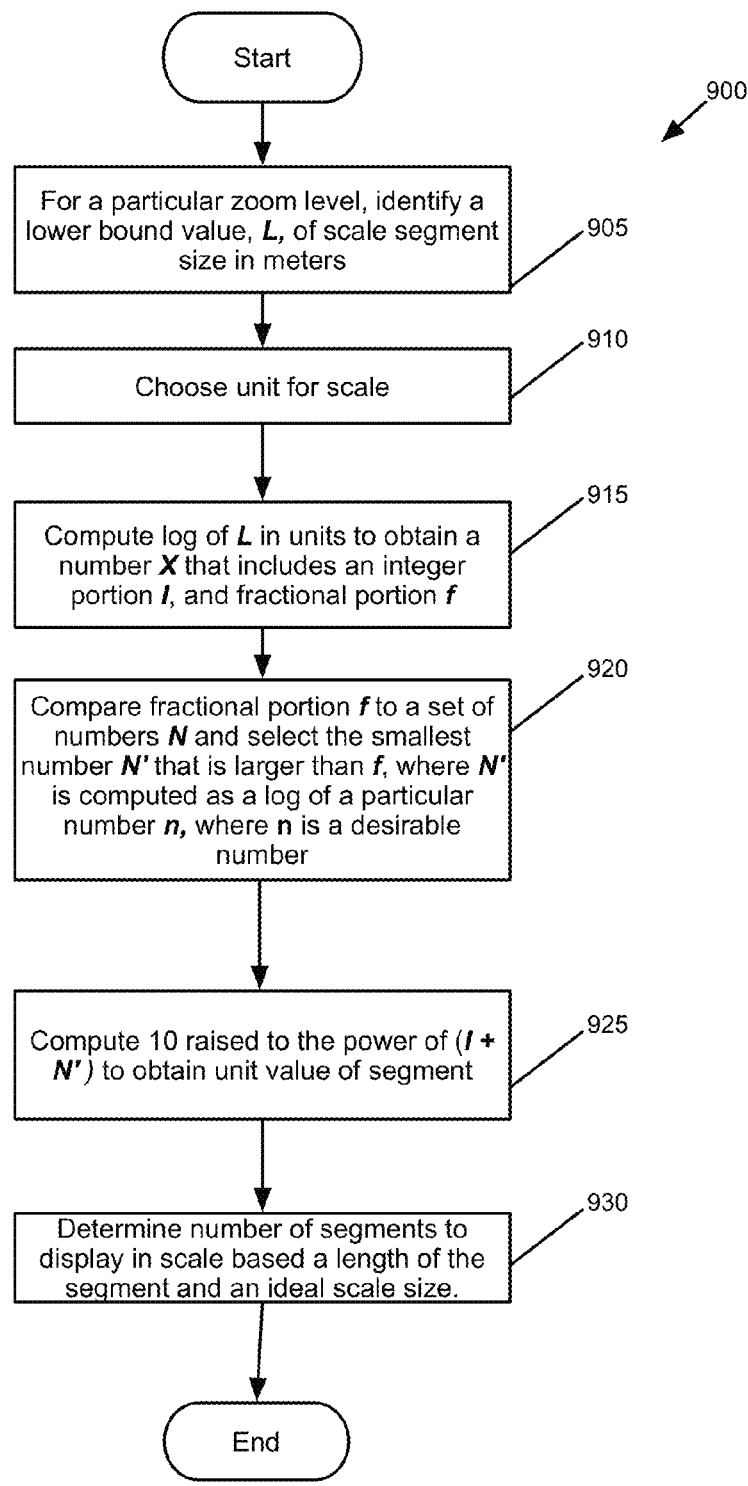
FIG. 9 conceptually illustrates a process for computing desirable segment unit values for the scale based on the particular zoom level.

In order to determine the attributes of the scale 280, in some embodiments, the mapping application computes a segment unit value (e.g., 1 mile, 5 miles, 10 miles, etc.) and segment display length (e.g., X centimeters on the screen) of a single segment and based on the segment unit value and segment display length of the segment, determines whether to display two or three segments on the map. In certain situations, the mapping application will only be able to display two segments such that the total size of the scale does not grow to an undesirable size. In other situations, the mapping application will be able to display three segments and still keep the total size of the scale at a desirable length on the screen. As such, the mapping application continuously computes values for the different attributes of the scale for each particular zoom level. This may include modifying the range of values (e.g. 0-20 miles vs. 0-30 miles etc.), the segment unit value of a segment (e.g., 5 miles, 10 miles, etc.), the number of segments to display (e.g., two segments or three segments), and the size of the scale on the map (e.g., between 0.5-2 cm on the screen). FIGS. 8-9 provide further details regarding computing the values for the different attributes of the scale at the particular zoom level.

FIG. 3 illustrates in six stages 305-330 the dynamic scale of a mapping application that runs on an operating system (e.g., OS X®) of a desktop or laptop device. Before describing this example, the various components of the mapping application user interface (UI) of some embodiments for the desktop or laptop device will be first described. Stage 305 illustrates the mapping application's UI that in some embodiments displays (1) a map of the current location 390 of the device, and (2) several UI controls arranged both in a top bar 340 and as floating controls. As shown in stage 305 of FIG. 3, the floating controls include an interactive compass control 345 and zoom controls 350, while the top bar 340 includes a position indicator 355, a 3D control 360, a navigation control 365, a directions search field 370, a direction control 375, a bookmark control 395, and a search field 385.

The position control 355 re-centers the position of the device on the map. In particular, once this position control 355 is selected, the application re-centers the map to the current position of the device in some embodiments. In some embodiments, upon receiving a second selection of the position control 355, the device also identifies the direction to which it currently points (e.g., using a compass, accelerometer, gyroscope, etc. in the device). The mapping application of some embodiments identifies the location of the device using the coordinates (e.g., longitudinal, altitudinal, and latitudinal coordinates) in the GPS signal that the device receives at the location of the device.

The 3D control 360 is a control for viewing map in three dimensions (3D). The mapping application provides the 3D control 360 as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available).

The navigation control 365 opens a page through which a user can request a route to be identified between a starting location and an ending location. This control provides a mechanism through which the mapping application can be directed to identify and display a route between two locations.

In some embodiments, a user can initiate a directions search by selecting the direction search field 370. The user may then enter a search query into the search field 370. The results of the direction search query are then presented as routes on the map.

The direction control 375 opens a page through which a user can request a route to be identified between a starting location and an ending location. This control provides a mechanism through which the mapping application can be directed to identify and display a route between two locations. The bookmark control 395 (e.g., button) allows location and routes to be bookmarked by the application.

In some embodiments, a user can initiate a search by selecting the search field 385 and then entering a search query into the search field. The results of the search query are also presented as "pins" on the map. In addition to allowing a user to initiate a search, the presence of the search field 385 in the primary map view in some embodiments also allows users to see the query corresponding to search results (e.g., pins) on the map and to remove those search results by clearing the query.

The zoom controls 350 are for zooming-in and zooming-out of the map. The user can select the "+" zoom control 350 to zoom in on the map and the "−" zoom control 350 to zoom out of the map. In some embodiments, the user can select and hold the location indicator over the zoom control 350 to continuously either zoom in or out of the map.

The interactive compass control 345 can be used for a variety of different operations. For example, the user can use the compass control 345 to navigate to different regions on the map and to different viewing angles for viewing a particular region of the map. The user can also use the compass control 345 to transition between a 2D and 3D mode. Furthermore, the compass control 345 is used as an indicator for determining (1) the direction north on the map and (2) whether the map is in a 2D or a 3D mode. Further details regarding the operations of the compass control 345 are described below in Section III (Interactive Compass).

Having described the components of the mapping application UI, an example of dynamic scale will now be described with reference to the six stages 305-330 of FIG. 3. Stage 305 illustrates the mapping application displaying a region of a map and the various UI controls described above. The user has entered this stage after, for example, launching the application from an application launch screen of the device. As illustrated, the mapping application is not currently displaying a scale on the map. In some embodiments, the mapping application initially launches without displaying the scale. Some embodiments do not display the scale on the map until the user begins a zoom operation of the map or provides other input to cause the scale to appear. In some embodiments, the mapping application displays the scale when a user begins a zoom operation of the map and removes the scale after a certain time period after the user has finished the zoom operation.

Stage 310 illustrates the mapping application receiving a selection of the zoom control 350 to zoom out ("−") of the map. The user selects control 350 using a location indicator (e.g., cursor) controlled by a mouse, trackpad, keypad, or other input device. For each of stages 310-325, the user continues to select the zoom control 350 to zoom out of the map region in order to show the dynamics of the changing scale 380 for different zoom levels.

Stage 310 also illustrates that the mapping application overlays a scale 380 on the lower left corner of the map. The scale 380 includes various values for the various attributes, including the range, the size of the scale, the number of segments in the scale, and the segment unit value of each segment. In some embodiments, the scale 380 is displayed as a solid line with various tick marks placed along the scale to identify the segments of the scale. As illustrated, the scale 380 currently has a range of 0-15 miles, includes 3 segments with a segment unit value of 5 miles, corresponding to 0-5, 5-10 and 10-15 miles, and is currently a particular size on the map. For this particular zoom level, the mapping application has computed these values for the attributes of the scale 380.

Stage 315 illustrates a user selecting the zoom control 350 with a location indicator which has caused the mapping application to zoom out and display a larger region of the map. The roads on the map are now narrower than in stage 310 and the map shows a larger area. Likewise, the mapping application has adjusted the scale 380 for this particular zoom level. In particular, the mapping application has retained the same values for the range (0-15 miles), number of segments (3), and segment unit value of each segment (5 miles) attributes of the scale 380. However, the mapping application has reduced the size of the scale 380 from the previous stage 310 in order to correctly represent the scale on the map for the particular zoom level. In particular, a 5-mile segment now corresponds to a smaller portion of the map. Stage 315 also illustrates that the user is again selecting the zoom control 350 in order to zoom further out of the map region.

Stage 320 illustrates that the mapping application has zoomed further out from stage 315 and now displays an even larger region of the map than stage 315. For this particular zoom level, the mapping application has computed numerous different values for the different attributes of the scale 380. In particular, the range of the scale 380 is now from 0 to 20 miles, the number of segments being displayed has been reduced to two, with each segment having a segment unit value of 10 miles (e.g., 0-10 and 10-20 miles). Furthermore, the size of the scale has also changed as needed to correctly represent the scale on the map for the particular zoom level. This stage 320 illustrates that the mapping application has dynamically changed various values of the scale 380, including the range, the number of segments, and the segment unit value of each segment. In addition, the mapping application has modified the size of the scale 380 to accurately provide a correct distance measurement on the map. In particular, a 10-mile segment now corresponds to a slightly larger portion of the map than the previous 5-mile segment, although the 10-mile segment of course corresponds to a smaller portion of the map than 10 miles at the previous zoom level. Stage 320 illustrates that the user is continuing to select the zoom control 350 in order to zoom further out of the map region.

Stage 325 illustrates that the mapping application has zoomed further out from stage 320, and now displays a larger region of the map. The mapping application has reduced the size of the scale 380, but has kept the same range (0-20), number of segments (2), and segment unit values (10 miles). Now, a 10-mile segment corresponds to a slightly smaller portion of the map than stage 320. Stage 325 also illustrates the user continuing to zoom out of the mapping application.

Stage 330 illustrates that the mapping application has zoomed out further than from stage 325. The scale 380 has also changed for the particular zoom level. In particular, the mapping application has added a segment to the scale 380 so that the scale now displays three segments corresponding to 0-10, 10-20 and 20-30 miles. Thus the range of the scale 380 has changed from 0-20 miles to 0-30 miles. Furthermore the size of the scale 380 on the screen has increased (due to the addition of an additional segment) although the size of the individual segments (e.g., 10 mile segment) has decreased slightly from stage 325. In some embodiments, when the mapping application reaches a certain threshold zoom level such that it has zoomed out of the map to the point that different portions of the map display area correspond to different scales (e.g., at a level where different continents are visible and the scale is different for different latitudes on the map), the mapping application removes the scale from map. In some embodiments, when the mapping application displays a region of the map from a particular viewing perspective, such as a 3D view, different scale values may be required for different portions of the map display area and as such the mapping application also removes the scale from the map.

As described above in FIGS. 2-3, the mapping application continuously modifies the various attributes of the scale for the different zoom levels. In some embodiments, the mapping application displays a different scale depending on whether the map is in a satellite mode, standard mode, or a hybrid mode. Depending on the particular mode, the mapping application adjusts various display settings of the scale, including the font, size, color, etc.

Figure 4:
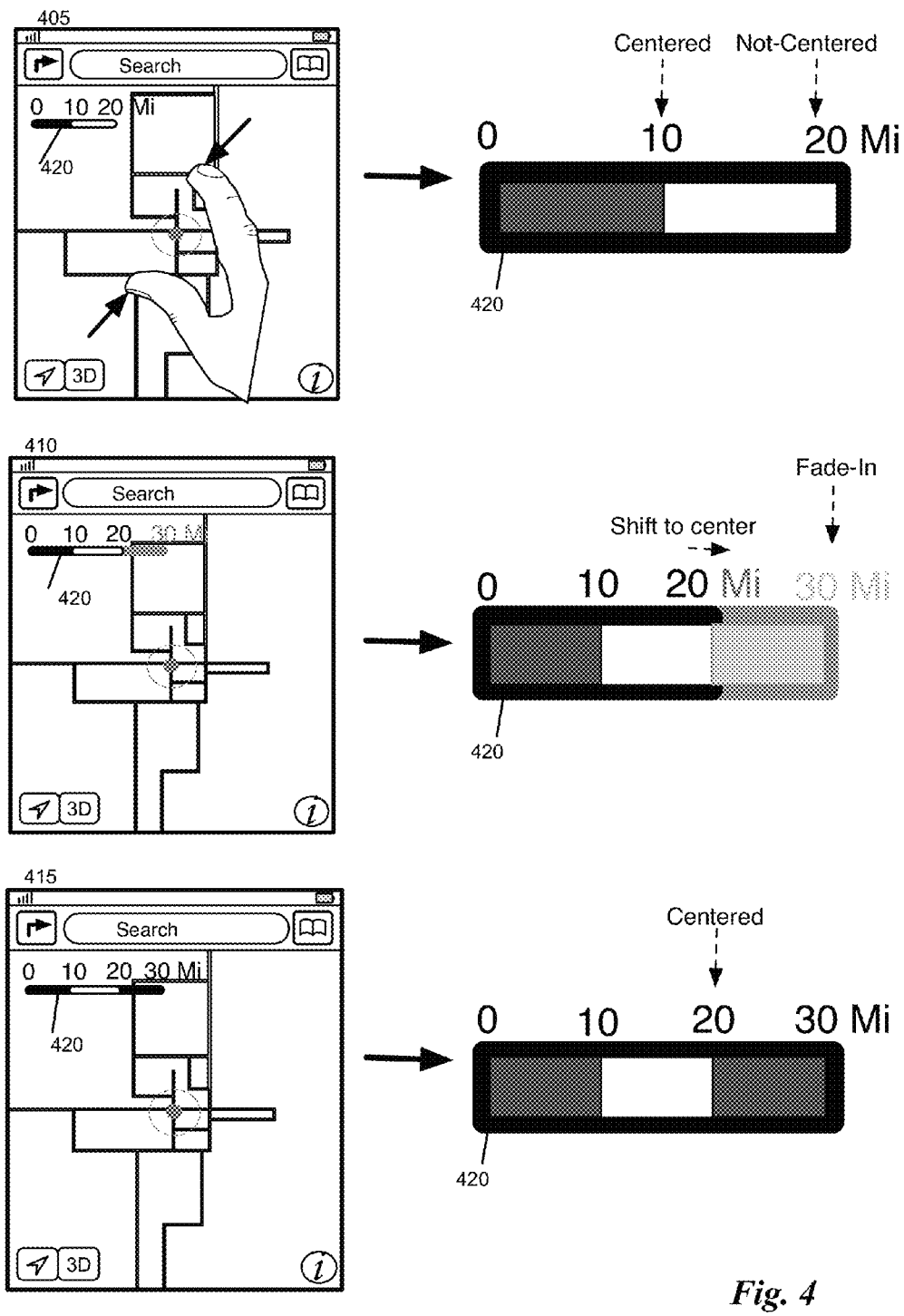
FIG. 4 conceptually illustrates an animation for adding a segment to the scale of some embodiments.
Figure 5:
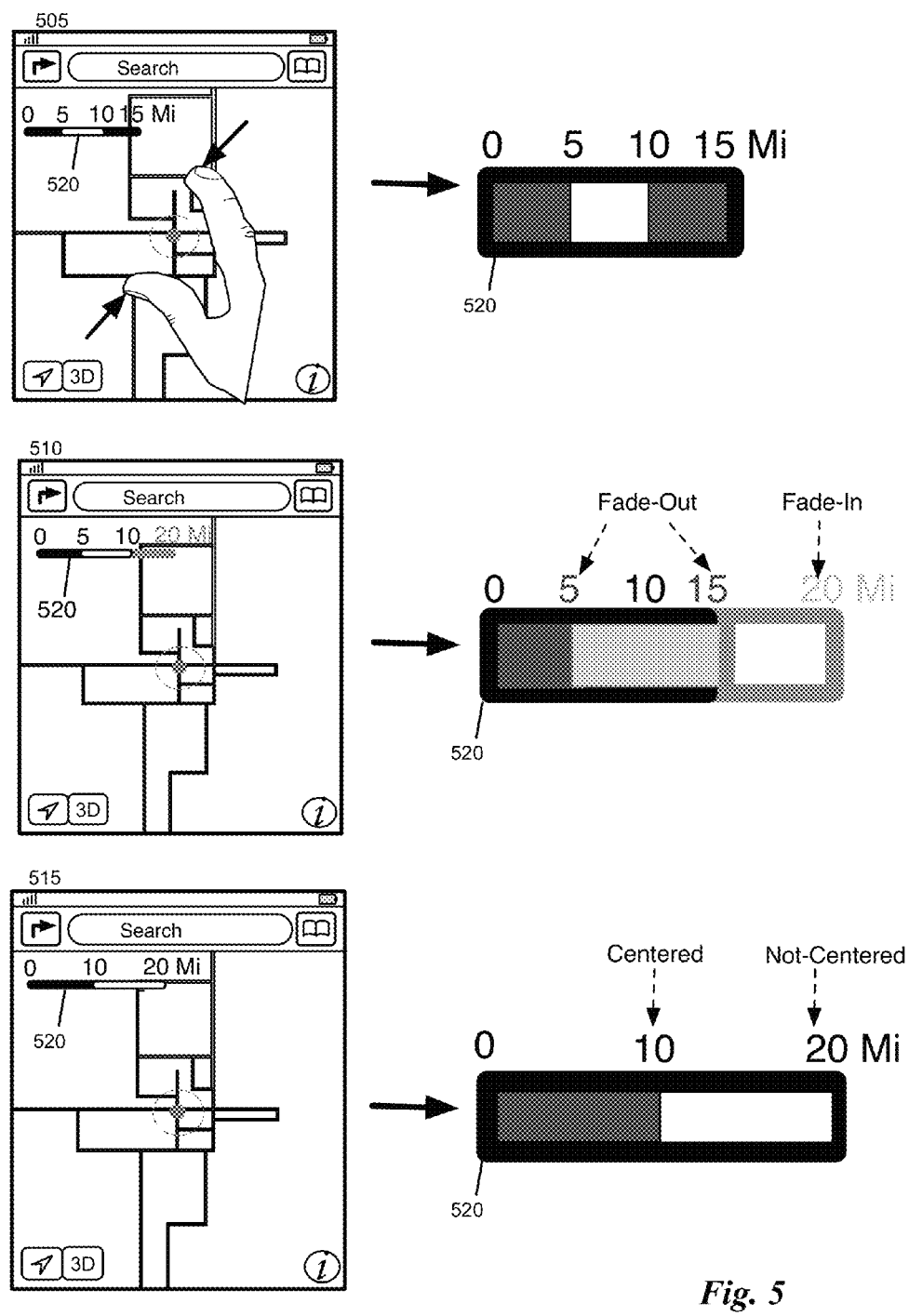
FIG. 5 conceptually illustrates an animation for removing a segment for a scale of some embodiments.

In some embodiments, in order to provide a smooth transition between certain adjustments being made to the scale, the mapping application animates between the different scales that are to be displayed on the map. In particular, when adding or removing a segment to a scale, the mapping application applies a cross-fading technique in order to smooth the transition between the different scales. FIG. 4 illustrates the animation for adding a segment to the scale and FIG. 5 illustrates the animation for removing a segment for a scale. Some embodiments perform these animations only for displaying the scale on a portable device such as a smart phone or a tablet computer, while displaying a different scale with different animations on laptop or desktop computers.

FIG. 4 illustrates in three stages 405-415 the mapping application animating the adjustments to the scale in order to add a segment to the scale. In particular, in order to avoid jumping between a scale with only two segments to a scale with three segments, the mapping application provides a cross-fading technique for modifying the attributes of the scale as the user changes to different zoom levels. For each stage 405-415, a corresponding oversize illustration of the scale 420 is provided to help illustrate the details of the animation that provides the smooth transition.

Stage 405 illustrates the mapping application displaying a region of a map at a particular zoom level. The scale 420 (illustrated on the map and as a standalone oversized scale) for this particular zoom level includes two segments, each with a segment unit value of 10 miles corresponding to 0-10 and 10-20 miles on the scale 420. The range of the scale is 0-30 miles, and the application displays the scale at a particular size on the map. As illustrated, the "10" mile label is currently centered on the scale 420 at the midpoint and the "20" label is aligned with the right edge of the scale 420. Stage 405 also illustrates the user zooming out of the map by applying a two-finger pinch gesture on the screen of the device.

Stage 410 illustrates that the mapping application has zoomed out further from stage 405. The scale 420 has now changed for this particular zoom level. In particular, the mapping application begins to fade in the new third segment to the scale 420, which changes the range of the scale from 0-20 miles to 0-30 miles. In between these stages, the mapping application will have shrunk the first two segments of scale 420 without adding the third segment, until reaching a threshold zoom level at which the application adds the third segment. The mapping application also fades in a new "30" label aligned with the right edge of the third segment (and thus the right edge of the scale), along with the "Mi" label to the right of the scale 420, while shifting the "20" label in order to center it over the corresponding segment and fade out the "Mi" label that was previously displayed but is now located over the middle of the scale.

Stage 415 illustrates that the mapping application has completely faded in the new segment of the scale 420. In particular, the scale 420 now displays three segments, each with a segment unit value of 10 miles, which correspond to 0-10, 10-20 and 20-30 miles. The animation for adding a segment to the scale helps avoid displaying jumps between scales of different sizes when adding a segment or changing a segment unit value (e.g., going from 5 mile segment unit values to a 10 mile segment unit value).

FIG. 5 illustrates the animation for removing a segment from the scale (which occurs, e.g., when the scale changes to a different segment unit value. In particular, in order to avoid displaying a jumping effect when transitioning the display of a scale with three segments to a display of a scale with two segments, the mapping application applies a cross-fading technique for modifying the attributes of the scale as the user changes to different zoom levels. For each stage 505-515, a corresponding oversize illustration of the scale 520 is provided to help illustrate the details of the animation that provides the smooth transition.

Stage 505 illustrates the mapping application displaying a region of a map at a particular zoom level. The scale 520 (illustrated both on the map and as a standalone oversized scale) for this particular zoom level includes three segments, each with a segment unit value of 5 miles corresponding to 0-5 and 5-10 and 10-15 mile segments on the scale 520. The range of the scale is 0-15 miles, and the application displays the scale at a particular size on the map. As illustrated, both the "5" and "10" mile labels are currently centered over their corresponding segment boundaries on the scale 520 and the "15" label is aligned with the right edge of the scale 520. Stage 505 also illustrates the user zooming out of the map by applying a two-finger pinch gesture on the screen of the device.

Stage 510 illustrates that the mapping application has zoomed out further from stage 505. The scale 520 has now changed for this particular zoom level. In particular, mapping application begins to fade in and fade out the different segments of the scale 520 in order to produce a scale with two segments. In between these stages, the mapping application will have shrunk the scale 520 until reaching a threshold zoom level at which the application changes the segment unit values of the scale and thereby increases the overall size of the scale. As illustrated in stage 510, the mapping application has changed the segment unit value of the segments from 5 miles to 10 miles. As such, the mapping application fades out the third segment of the scale in order to display only two segments. Furthermore, the mapping application fades out the "5" and "15" labels and fades in a new "20" label aligned with the right edge of the second segment (and thus the right edge of the scale), along with the "Mi" label to the right of the scale 520. This changes the range of the scale from 0-15 miles to 0-20 miles, with each segment having a segment unit value of 10 miles corresponding to 0-10 and 10-20 miles. The mapping application also shifts the "10" label in order to center it over the corresponding segment border.

Stage 515 illustrates that the mapping application has completely faded in and out different segments of the scale in order to display the modified scale 520. In particular, the scale 520 now displays two segments, each with a segment unit value of 10 miles (rather than 5 mile segments in stage 515), which correspond to 0-10 and 10-20 miles. The animation for removing a segment from the scale helps avoid a jumping effect that would otherwise occur when transitioning between scales of different sizes when changing a segment unit value (e.g., going from 5 mile segment unit values to a 10 mile segment unit value).

Figure 6:
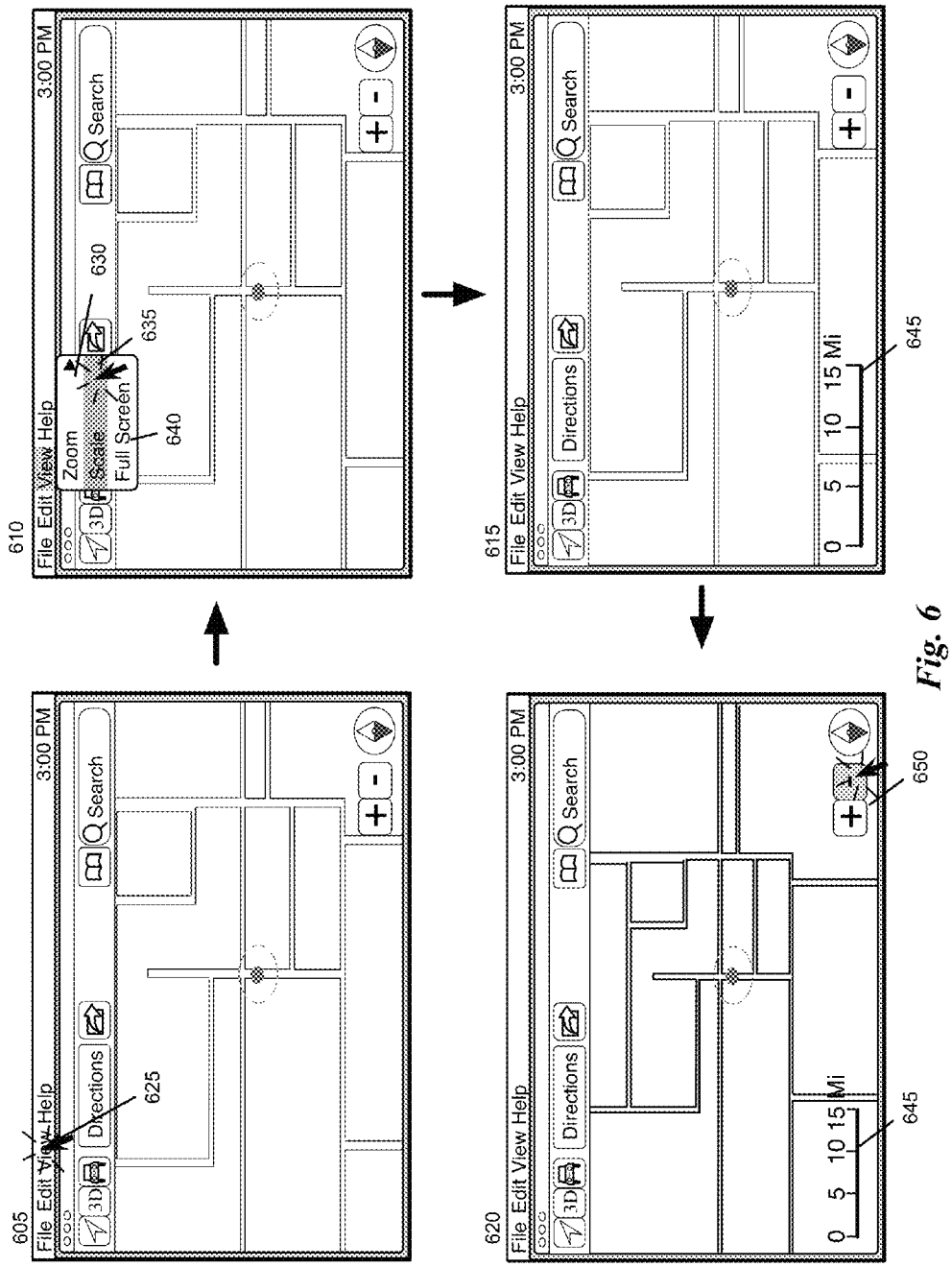
FIG. 6 conceptually illustrates the user menu for displaying the scale of some embodiments.

FIGS. 2-3 also illustrate the dynamic scale appearing only after a user begins interacting with the mapping application (through the two-finger gestural input or input from a location indicator). In some embodiments, a user may use a toolbar menu to display the scale or remove the scale from the map display area of the mapping application. FIG. 6 illustrates in four stages 605-620 a user manually selecting to display the scale through a menu user interface of the mapping application of some embodiments.

The first stage 605 illustrates the user selecting the view menu item 625 while viewing an area on the map. As illustrated, the map application does not display a scale on the map at this stage. The second stage 610 illustrates that the view menu item 625 includes three sub-menu items, including zoom 630, scale 635, and full screen 640. The zoom menu item 630 when selected displays a new sub-menu that allows a user to either zoom-in or zoom-out of the map. In some embodiments, the user may open the view menu 625 and corresponding sub-menu items 630-640 using various shortcut keys (e.g., "Alt"+"v" etc.). In some embodiments, the user may select the sub-menu items using a combination of hotkeys that have been assigned to the particular operations (e.g., holding keys "command" and "+" or "command" and "−"). Selection of the scale 635 menu item causes the application to display the scale or remove the scale from the display if it is being displayed. Selection of the full screen 640 menu item causes the mapping application to display in a full screen mode. As illustrated in stage 610, the user is selecting sub-menu item scale 635. The user may perform this selection operation by positioning a location indicator over the menu item and providing a selection input (e.g., a mouse click). In other inputs, the selection may be received through a tapping gesture on a trackpad or touch-screen user interface of the device.

The third stage 615 illustrates that the mapping application now displays a scale 645. At this particular zoom level of the map, the scale 645 has a range of 15 miles with each segment of the scale having a segment unit value corresponding to 5 miles on the map. The scale 645 also displays three segments (e.g., 0-5, 5-10, and 10-15).

The fourth stage 620 illustrates the user selecting the zoom-out control 650. As such, the size of the scale 645 has been reduced in order to correctly represent the scale on the map for the particular zoom level. In particular, a 5-mile segment of the scale 645 now corresponds to a smaller portion of the map. However, the scale 645 still has a range of 15 miles with a total of three segments being displayed within the scale corresponding to different 5 mile segments on the scale. FIG. 6 illustrates one possible mechanism for displaying the scale on the map of the mapping application. In some embodiments, a user may cause the mapping application to display the scale using various other mechanisms, including selecting different shortcut-keys and hot-keys (e.g., "Alt") of a keypad of the device, or after applying different gestures on a trackpad or touch-screen interface of the device. In some embodiments, the scale is automatically displayed when the mapping application is initially launched and remains displayed at all times until the user directs the mapping application to remove the scale.

Figure 7:
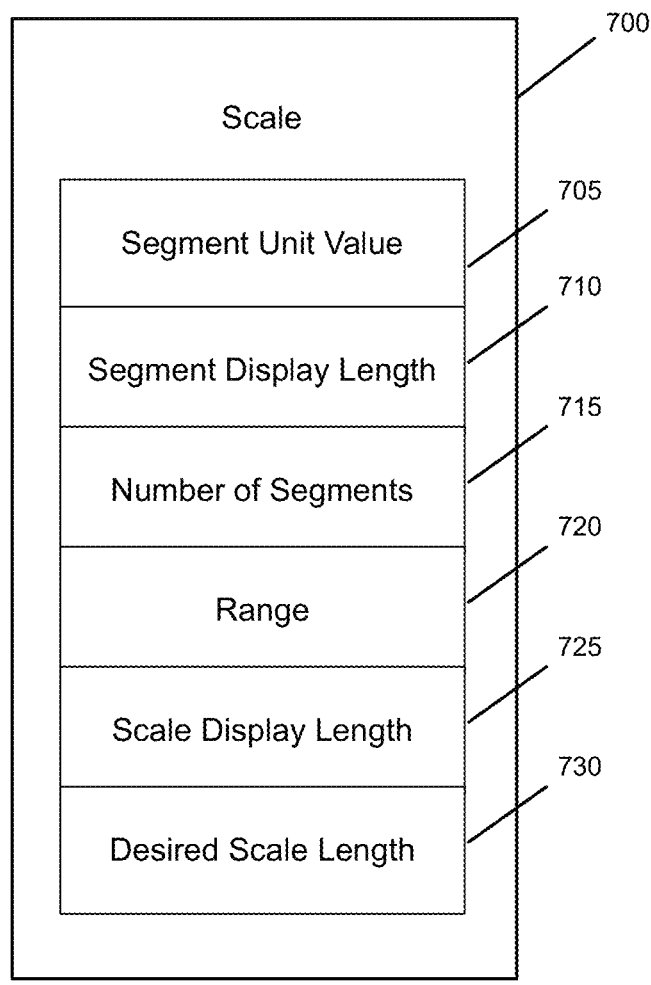
FIG. 7 conceptually illustrates a data structure for a scale with the various attributes of the scale.

FIG. 7 illustrates a data structure for a scale 700 that includes the various attributes of the scale. As illustrated, the scale 700 includes a segment unit value 705, a segment display length 710, a number of segments value 715, a range 720, a scale display length 725 and a desired scale length 735. FIGS. 8 and 9 describe processes for computing values for each of the different attributes of the scale 700. One of ordinary skill in the art will recognize that different embodiments of the mapping application may store more, fewer, or different attributes for a scale than those shown in FIG. 7.

The segment unit value 705 provides a distance value that the segment represents on the map. For example, in a metric system, a segment unit value may be 5 meters, 10 meters, 100 meters, 1 km, 5 km, etc. In a U.S. customary system, a segment unit value maybe 1 feet, 5 feet, 100 feet, 1000 feet, 1 mile, 5 miles, 10 miles, etc. The segment unit value is computed for a particular zoom level in order to provide a desirable segment unit value on the scale. FIG. 9 below describes a process for computing desirable segment unit values for a particular zoom level. The segment display length 710 is the length of the segment as displayed on the screen of the device (e.g., between for example 0.5-2 cm on the screen). This length is determined from the segment unit length based on the scale of the map at the current zoom level.

The number of segments 715 determines the number of segments to display in the scale. In some embodiments, the mapping application may display either two or three segments on the scale. In some embodiments, the mapping application displays as many segments as possible without exceeding a certain percentage of a particular scale length (e.g., the desirable scale length 730).

The range 720 of the scale provides a distance measurement of the total scale on the map. For example, a scale can have a range of 0-20 miles, 0-30 miles, or 0-10 km or 0-20 km. The range 720 is computed using the number of segments 715 and the segment unit value 705 in some embodiments.

The scale display length 725 provides the length of the scale as displayed on the screen. In some embodiments, this value is computed by multiplying the number of segments value 715 with the segment display length value 710.

The desired scale length 730 provides a size value for the desired size of the scale on the screen of the device (e.g., for example 3 cm). In some embodiments, the mapping application may exceed this desired scale length 730 by a certain percentage in order to display three segments. In other situations, the mapping application may not exceed the desired scale length 730 and must display only two segments. Computing the various attribute values 705-730 of the scale 700 illustrated in FIG. 7 are described by reference to the process illustrated in FIG. 8.

FIG. 8 conceptually illustrates a process 800 of some embodiments for computing the attributes of a dynamic scale on the mapping application. In some embodiments, a mapping application that displays the dynamic scale performs the process 800 (e.g., the mapping application described above by reference to FIGS. 2-6). In addition to the process of FIG. 8, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The process 800 starts by receiving (at 805) input to display a scale. In order to display the scale, the process 800 must first compute the different attributes of the scale. As illustrated in FIG. 7, the attributes include the segment unit value 705, the segment display length 710, the number of segments 715, the range 720, the scale display length 725, and the desired scale length 730.

The process initially (at 810) computes a segment unit value. As illustrated in FIG. 7, the segment unit value 705 provides a value that a segment represents on the map. For example, in a metric system, a segment unit value may be 5 meters, 10 meters, 100 meters, 1 km, 5 km, etc. In a U.S. customary system, a segment unit value maybe 1 feet, 5 feet, 100 feet, 1000 feet, 1 mile, 5 miles, 10 miles, etc. The segment unit value is computed for a particular zoom level in order to provide a desirable segment unit value on the scale. FIG. 9 below describes a process for computing desirable segment unit values for a particular zoom level by testing a set of possible segment unit values and determining an optimal one of the values for the zoom level. As described, many of the values for the different attributes 705-730 of the scale 700 are contingent on the computed segment unit value 705 of the scale.

After a segment unit value 810 has been calculated, the process 800 computes (at 810) the segment display length for the particular zoom level that accurately represents the distance of the computed segment unit value on the map. As described above by reference to FIG. 7, the segment display length 710 is the length of the segment as displayed on the screen of the device (e.g., between for example 0.5-2 cm on the screen). In order to compute (at 810) the segment display length, the process 800 determines the distance that is represented by a particular unit (e.g., 1 cm, 2 cm, etc.) on the display of the device. The process 800 then calculates the segment display length 710 in order to provide a length that represents the segment unit value 705 that was calculated for the particular zoom level. For example, if the mapping application determines to display a segment that has a segment unit value 705 of 1 mile, and at the current zoom level, 1 cm distance on the screen represents 1.2 miles, then the mapping application will compute the segment display length 710 of the segment at approximately 0.833 cm on the screen of the device.

The process 800 next computes (at 820) the number of segments 715 to display on the scale. In some embodiments, the scale may display either two or three segments (although other embodiments may use different numbers of segments). The number of segments 715 is computed based on the segment display length 710 and the desired scale length 730. The process illustrated in FIG. 9 provides further details regarding computing the number of segments 715 to display on the scale.

The process 800 next computes (at 825) the range 720 of the scale. As illustrated in FIG. 7, the range 720 provides a range value of the scale computed based on the number of segments 715 (e.g., 2 vs. 3 segments) and the segment unit value 705 (e.g., 1 mile, 5 miles, etc.) For example, for a scale for which the mapping application has computed a number of segments 715 of 2, and a segment unit value 705 of 10 miles, this scale will have a range 720 value of 0-20 miles.

The process then displays (at 830) the scale 700 with the computed set of attributes 705-730. The set of attributes of the scale includes the scale display length 725, the range 720 of the scale, the segment unit value 705 (e.g., 100 feet, 500 feet, 1 mile, 5 miles, 10 miles, vs. 1 meter, 100 meters, 1 km, 5 km, etc.) displayed on the scale, and the number of segments 715 of the scale.

Figure 29:
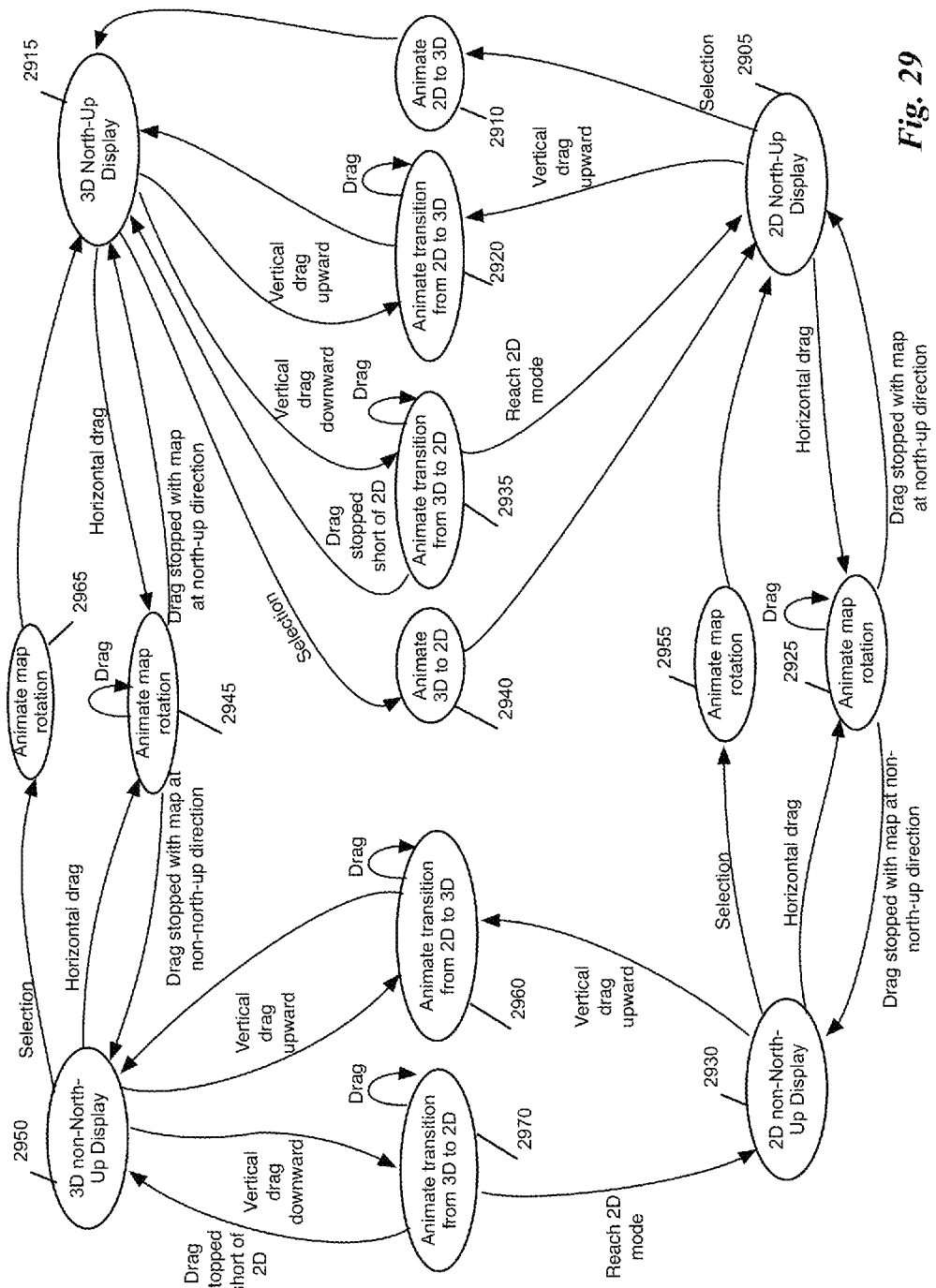
FIG. 29 conceptually illustrates a state diagram that describes different states and transitions between these states for the compass control of the mapping application of some embodiments.

The process 800 then determines (at 835) whether it is receiving more input to change the zoom level. If the process continues to receive input to change the zoom level, the process transitions back to 810 to continue computing values for the various attributes of the scale. If the process determines that there is no additional input to zoom the map, the process ends. As noted above, this process is conceptual and various other types of input may be received prior to receiving an input to change the zoom level that cause the mapping application to perform various other operations that do not affect the display of the scale. Thus the scale may be displayed with the computed set of attributes for an unspecified amount of time (e.g., until the mapping application receives input that changes the zoom level of the map). FIG. 29 below illustrates a state diagram for the different types of user input and the corresponding operations that are performed by the mapping application for each different type of input.

As described, many of the values illustrated in FIG. 7 for the different attributes 705-730 of the scale 700 are contingent on the computed segment unit value 705 of the scale. FIG. 9 illustrates a process 900 for computing a desirable segment unit value 705 for a segment on the scale as well as a number of the segments to include in the scale.

FIG. 9 illustrates a process 900 for computing desirable segment unit values for the segments on the scale. The process initially identifies (at 905), for a particular zoom level, a lower bound value, L, of a scale segment unit value in meters. For example, the process may identify a unit value for a scale segment in meters by determining a maximum size of the scale and the number of meters that could be represented by the scale at this maximum size. For example, at current zoom level, the process may determine that a lower bound meter value of a segment is 1599 meters. In particular, the maximum size of the scale may correspond to 4797 meters, and thus if the scale were to display three segments, each segment would correspond to 1599 meters. This provides the lower bound value L. This value is typically not a desirable number and thus the process will re-adjust the segment unit value according to a new desirable number value that gets computed (at the end of process) for the segment (e.g., 1000 meters, 1 km, 5 km, etc.).

The process then selects (at 910) a unit for the scale. For example, in a metric system, the process determines whether to display the scale in meters or kilometers. In a U.S. customary system, the process would determine whether to display the scale in feet or miles. Continuing with the example, the process may determine to display the 1599 meters in units of "kilometers" with 1 km=1000 meters. In some embodiments, the process may also analyze the locale of the region of the map to determine an appropriate unit measurement. For instance, if the mapping application is in use in Europe, the mapping application may apply the metric system, whereas a device in the U.S. may apply the U.S. standard system.

The process then computes (at 915) a log of the lower bound L (e.g., log(L)) in the chosen units of the lower bound to obtain the number X. The number X includes an integer portion I and a fractional portion f. In some embodiments, the log may be a base 10 logarithm. In other embodiments, a different base may be used (e.g., 2 or the natural log, etc.). Continuing with the example, computing log(1599 meters*1 km/1000 meters)=(approx.) 0.2038484637. Thus the integer portion I=0 and the fractional portion f=(approx.) 0.203.

The process then compares (at 920) the fractional portion f to a set of numbers N and selects the smallest number N' that is larger than f, where N' is computed as a log of a particular number n, where n is a desirable number. For example, the desirable value of n could be 1.25, 2.5, 5 or 10 and the number N in a set of numbers would then be {log(1.25), log(2.5), log(5), log(10)} which equals approximately {0.0969, 0.3979, 0.6989, and 1}. Continuing with the example, the value of log(2.5)=0.3979 is the smallest of the set of numbers that is larger than the fractional portion f=(0.203). Thus the process selects for N' the value of log(2.5) and thus the selected value of n' is 2.5.

The process then computes (at 925) $10^{(I+N')}$ to obtain the segment unit value for a segment. Simplifying the computation results in $10^I*10^{N'}=10^0*10^{(\log(n'))}=n'$, where I=0 and n'=2.5. Thus the scale segment would have a segment unit value of 2.5 km per segment, which was computed for the lower bound value of 1599 meters, and the desired scale with a unit of measurement in kilometers. Referring back to the scale data structure in FIG. 7, some embodiments store this value as the segment unit value 1105 attribute of the scale.

Having computed the segment unit value of a segment for the scale, the process then determines (at 925) the number of segments to display in the scale based on a segment display length of the segment and a desired scale size. In some embodiments, the process determines the number of segments to display on the scale using the following series of computations. The process first computes the segment display length on the screen of the device, as described above in FIG. 8. The process then determines how many scale segments will fit without the scale growing to an undesirable size. In some embodiments, the process maintains a desirable scale length value 730, as illustrated in FIG. 7, from which it computes the lower bound value, L, for the scale at operation 905. The mapping application then determines whether at this desirable scale length value 730, the application can display less than or greater than 2.5 segments. The application then rounds the number to the nearest integer number, such that a number of segments less than 2.5 segments rounds to 2 and a number of segments greater than (or equal to) 2.5 rounds to 3. For example, if the mapping application determines that 2.4 segments fit within the desirable scale length, the application rounds the 2.4 segments down and only displays 2 segments within the scale for display on the map. Only after the scale has been reduced by a certain size will the process then display the third segment (as illustrated above in the transition between stages 225 and 230 of FIG. 2 and stages 325 and 330 of FIG. 3.)

Continuing with the example, if the mapping application determines that 2.8 segments fit within the desirable scale length, the process rounds the 2.8 segments up and displays 3 segments within the scale for display on the map. By only rounding up when the desirable scale length holds close to three segments, the application insures that the size of the scale does not grow to an undesirable length such that it overly obscures the map display area. In some embodiments, the process may compute a different number of segments to display in the scale other than two or three. For instance, in some embodiments, the process may display only a single segment, or 3 or more segments. Furthermore, in some embodiments, the desirable scale length may be different based on various factors, including, for example, the size of the display screen of the device, the user's preference settings, etc.

The dynamic scale provides the user with a tool for approximating distance measurements on the map at different zoom levels. In addition to providing an indication of the distance, the dynamic scale may be used as a tool for various zoom operations. These zoom operations will now be described in detail in the following section II.

II. Zoom Operations

Figure 10:
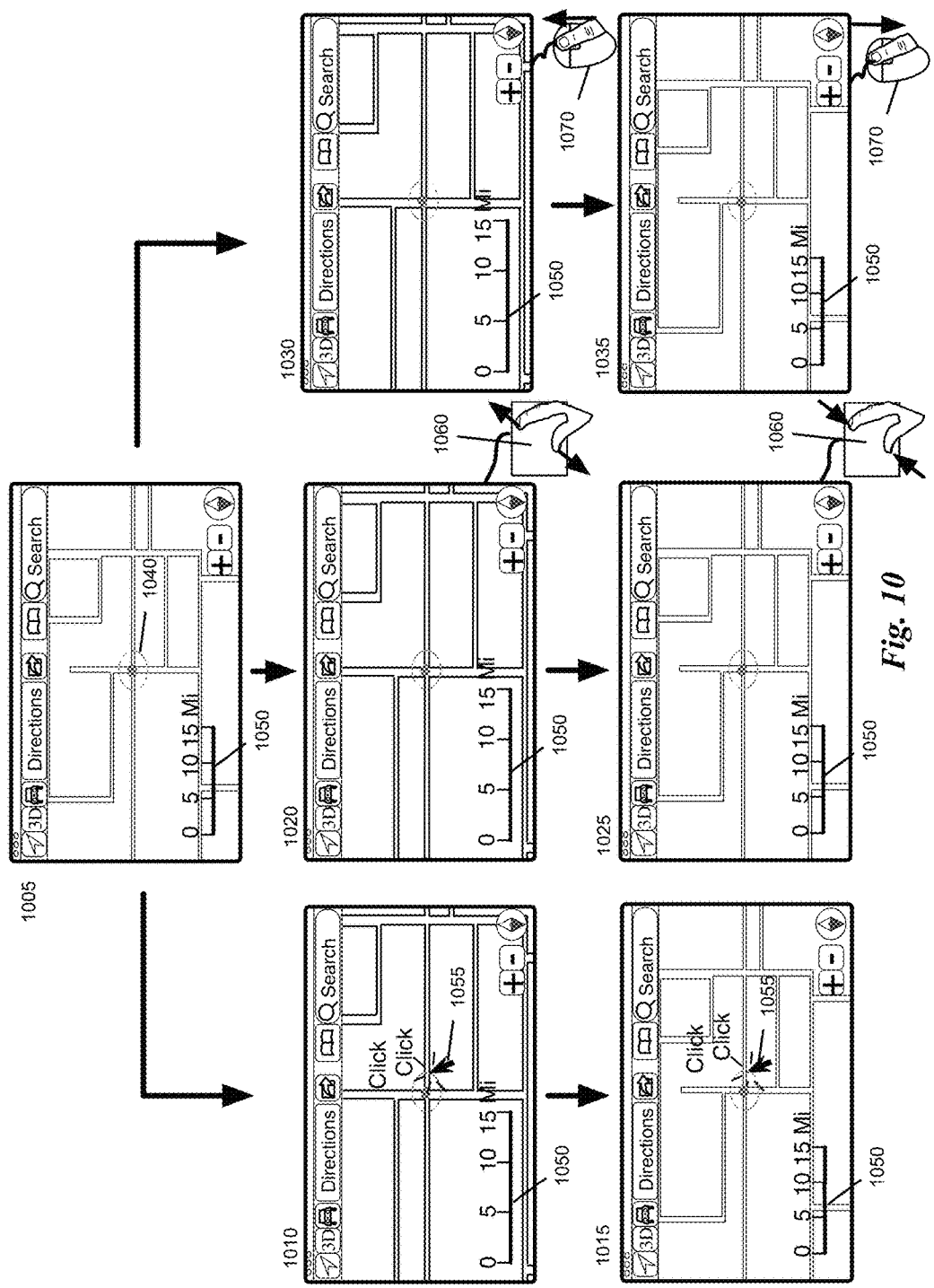
FIG. 10 conceptually illustrates changing to different zoom levels on the map using different mechanisms, including a location indicator, a trackpad device, and a mouse with a scrollable wheel.

The mapping application of some embodiments provides various mechanisms through which a user may zoom in and out of a map region. For a mapping application operating on a device with a touch-screen interface, the mapping application is able to receive various gestural inputs (e.g., two-finger pinch, two-finger spread, finger swipe, etc.) to zoom in and out of the map and to move to different areas of the map. For a mapping application with other user selection tools (e.g., trackpad, mouse, etc.), the mapping application is able to receive other types of input for zooming-in and zooming-out on the map or to move to a different region of the map. Furthermore, certain UI tools, such as the dynamic scale and the compass control tool can also be used to change to different zoom levels and/or to navigate the map. FIG. 10 illustrates three mechanisms that a user may use to zoom to different levels of the map.

A. Standard Zooming Mechanisms

FIG. 10 illustrates a user changing to a different zoom level on the map using three different input devices/tools, including a tool (e.g., mouse) that controls a location indicator (e.g., cursor) on the display, a trackpad device, and a mouse with a scrollable wheel. This example illustrated in this figure is provided using an initial stage 1005 and three separate two-stage sequences (1010-1015, 1020-1025, and 1030-1035) that each begins with the same initial stage 1005. In particular, the sequence of stages 1010-1015 illustrates the user using a location indicator tool to zoom in and out on the map, the sequence of stages 1020-1025 illustrates the user using a trackpad to zoom in and out on the map, and the sequence of stages 1030-1035 illustrates the user using a scrollable wheel on a mouse to zoom in and out on the map.

Stage 1005 illustrates the mapping application displaying a region of a map, the user's current location 1040 on the map, and the scale 1050, among various other controls described above by reference to FIG. 3. The scale 1050 has a range of 0-15 miles. Furthermore, the scale 1050 includes 3 segments, each corresponding to a 5-mile interval. Stage 1010 illustrates the user zooming in on the map by repeatedly selecting with the location indicator 1055 (e.g., double clicking) on a particular location of the map. As such, the map has been zoomed to a higher level than stage 1005. The roads appear wider and a smaller region of the map is being displayed within the map. Furthermore, the scale 1050 has increased in size to correspond to show a larger distance measurement for the higher zoom level, although the other attributes of the scale are identical to stage 1005. In addition to selecting with a location indicator to zoom-in on a particular location, a user is also able to zoom-out of the map using the same repeated selection with the location indicator 1055.

Stage 1015 illustrates the user zooming out of the map using a repeated selection of the location with the location indicator (e.g., double-clicking the location). As illustrated, the mapping application is displaying a larger region of the map than stage 1010 corresponding to the lower zoom level. Furthermore, the scale 1050 has again been reduced in size.

In some embodiments, the map application will initially zoom in on the map when it receives a double-click of the location indicator. After reaching the highest zoom level available on the map, the mapping application will then begin to zoom out for each subsequent double-click location indicator input. In some embodiments, the user may select to either zoom-in or zoom-out using a combination of a keypad key (e.g., holding down "Alt") and then double-clicking (or a similar cursor controller operation) in order to determine whether to zoom in or out of the map. In some embodiments, the user may select with the location indicator the particular location only a single time (e.g., single click) to cause the mapping application to begin zooming to a different level.

Stages 1020-1025 illustrate the user zooming in and out of the map using a trackpad 1060 input device. In particular, the trackpad 1060 is receiving gestural input from the user in these stages. In stage 1020, the user is applying a two-finger spreading gesture, which corresponds to the gestural input for zooming-in on the map. As such, the mapping application is displaying the map region at a higher zoom level than in the initial state 1005. The roads appear wider and a smaller region of the map is being displayed. Furthermore, the scale 1050 has increased in size in order to correctly provide an accurate distance measurement for this particular zoom level, although the other attribute values have remained the same as in the initial stage 1005. The user is also able to zoom out of the map using a different, opposite gestural motion. Stage 1025 illustrates the user zooming out of the map by applying a two-finger pinch on the trackpad 1060. As such, the mapping application is displaying the region of the map at a lower zoom level, with the roads narrower and a larger region of the map being displayed than stage 1020.

Stages 1030-1035 illustrate another mechanism by which a user may control the zoom of the map using a mouse with a scrollable wheel 1070. In particular, the scrollable wheel of the mouse 1070 is receiving gestural input from the user to move the wheel in an upward direction, which corresponds to zooming-in on the map. As such, the mapping application is displaying the map region at a higher zoom level than in the initial state 1005. The roads appear wider and a smaller region of the map is being displayed. Furthermore, the scale 1050 has increased in size in order to accurately provide a distance measurement indication at this particular zoom level, although the other attribute values have remained the same as in the initial stage 1005. The user is also able to zoom out of the map by scrolling the wheel 1070 in the opposite downward direction. Stage 1035 illustrates the user zooming out of the map by rolling the scrollable wheel of the mouse 1070 downwards. As such, the mapping application is displaying the region of the map at a lower zoom level, with the roads narrower and a larger region of the map being displayed than stage 1030. In some embodiments, an upward scroll of a scroll-wheel of a mouse device may correspond to a zoom-out operation of a map and a downward scroll of the scroll-wheel may correspond to a zoom-in on the map. In some embodiments, the scroll-wheel of a mouse may allow a user to click the scroll-wheel which may be used to change to different zoom levels on the map.

Figure 11:
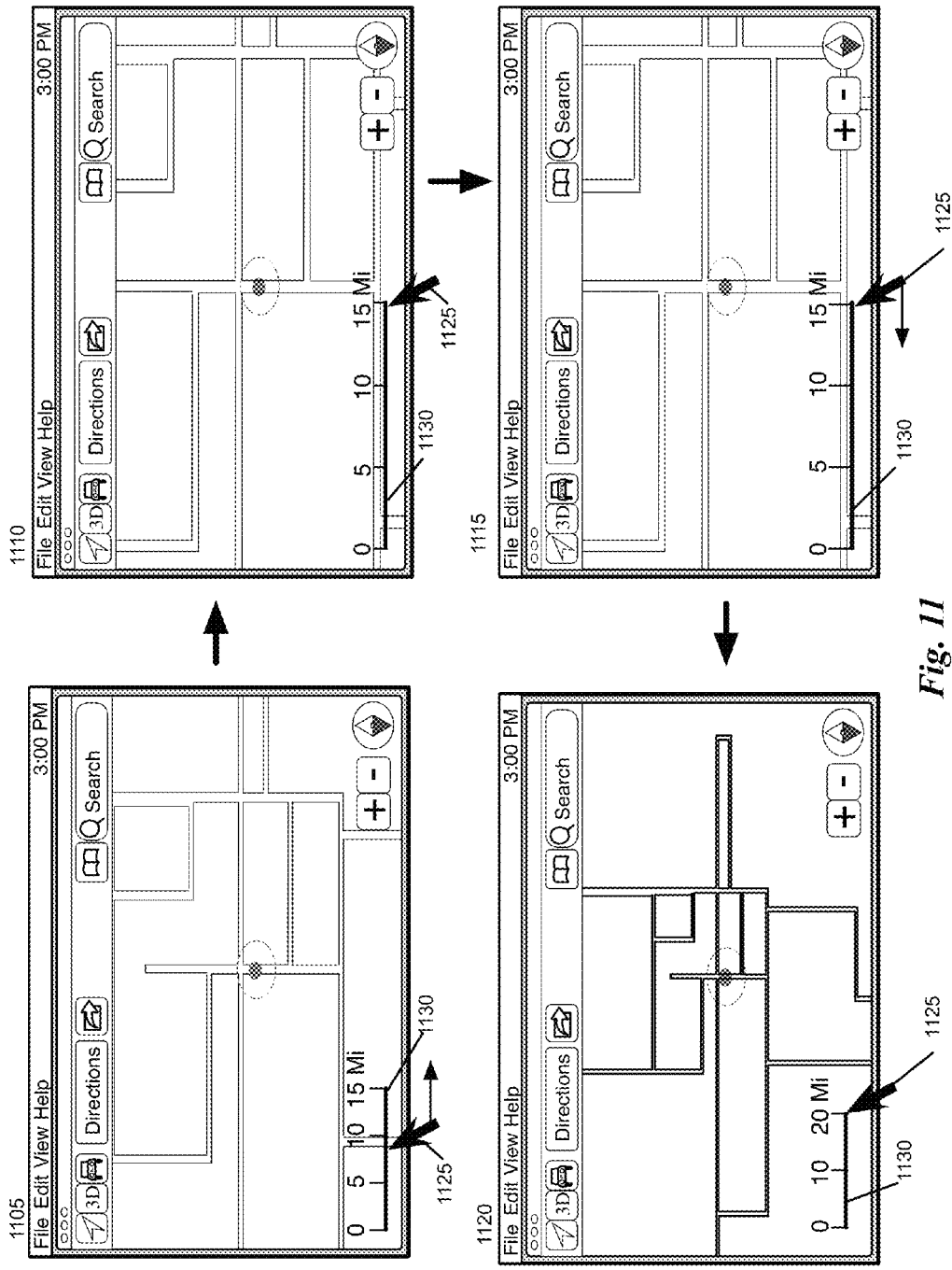
FIG. 11 conceptually illustrates using the dynamic scale as a tool for changing the zoom level of the map.

Besides the various input tools for changing the zoom level on the map, the mapping application of some embodiments allows a user to change to a different zoom level using certain existing UI tools that appear on the map. FIG. 11 illustrates the dynamic scale which serves as a UI tool for providing a distance measurement indication to the user may also be used as a tool for changing the zoom level of the map.

B. Interactive Scale to Zoom Map

FIG. 11 illustrates using the scale as a tool for zooming to different levels of the map. This figure illustrates in four stages 1105-1120 a user both zooming in on an area of a map and zooming out of the area of the map by dragging the scale in different directions. The first stage 1105 illustrates the mapping application displaying an area of a map. The map includes a scale 1130. The scale 1130 currently has a range of 0 to 15 miles and is displaying three segments, each corresponding to 5-mile segments on the map. The user has also placed a location indicator 1125 (e.g., cursor) at a particular location along the scale 1130 and is selecting and dragging the scale 1130 to the right in an outward direction to grow the size of the scale. By selecting and dragging the scale 1130 to the right, the user is able to cause the mapping application to zoom to a higher level on the map. In some embodiments, the user can select and drag the scale 1130 using an input device (e.g., mouse) or using a keypad with various commands.

Stage 1110 illustrates that the scale 1130 has increased in size due to the user selecting and dragging the scale using the location indicator 1125. By increasing the size of the scale 1130, the user has also zoomed in on the map. As illustrated, the streets now appear wider and a smaller area of the map is being displayed.

Figure 12:
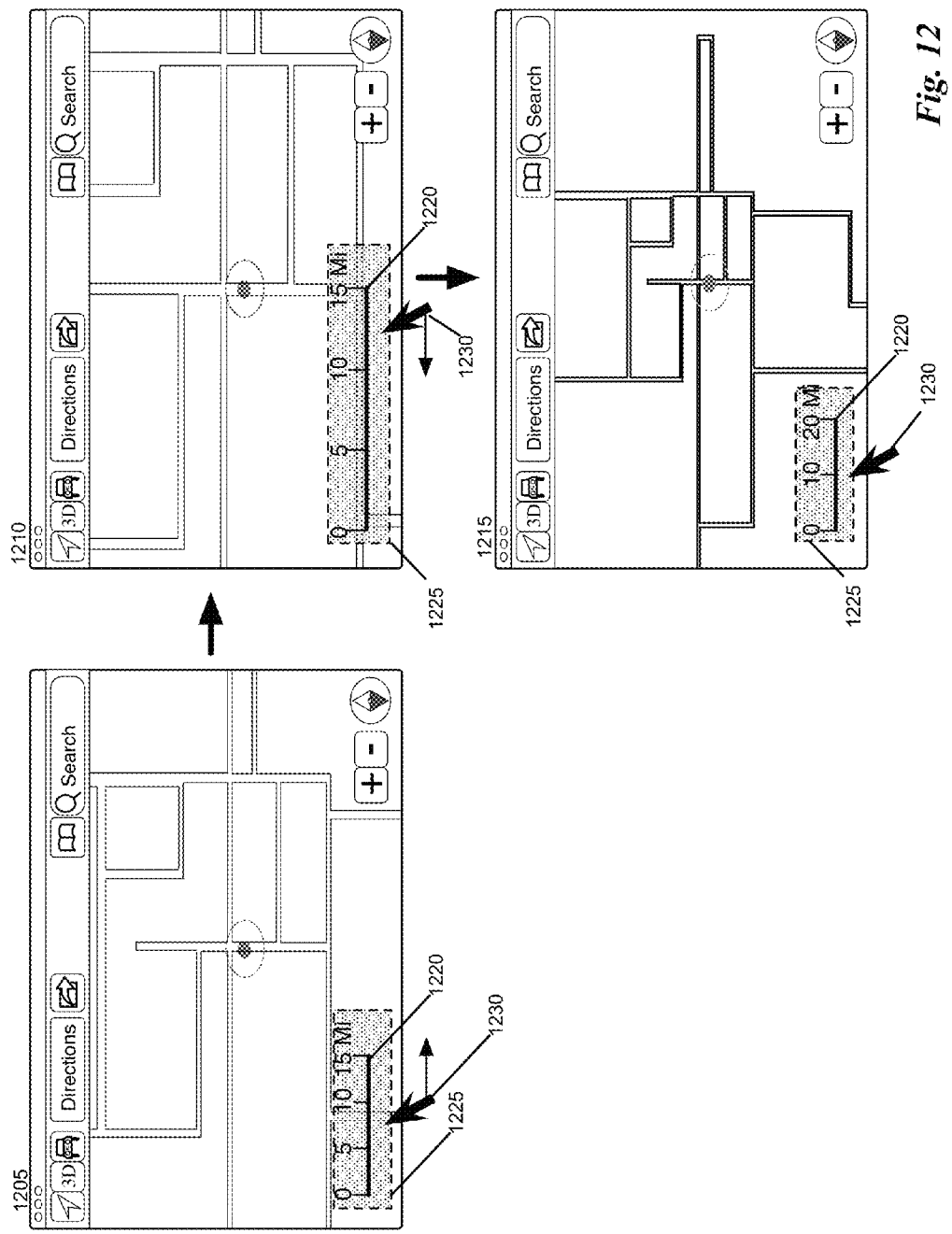
FIG. 12 conceptually illustrates changing the zoom levels of the map by selecting within a buffer region surrounding the scale.

Stage 1115 illustrates the user selecting and dragging the scale 1130 to the left in an inward direction that reduces the size of the scale. Stage 1120 illustrates the mapping application displaying a larger area of the map with the illustrated roads appearing narrower. Furthermore, the scale 1130 has been reduced not only in size, but the range of the scale has been changed to 0 to 20 miles with only two segments being displayed on the scale corresponding to 0-10 and 10-20 mile segments. FIG. 11 illustrates a user selecting a scale of the mapping application to change to different zoom levels of the map. In some embodiments, a user is not required to select directly on the scale to zoom to different levels, but may also select within a certain buffer region surrounding the scale. FIG. 12 illustrates a user changing the zoom levels of the map by selecting within a buffer region surrounding the scale.

FIG. 12 illustrates three stages 1205-1215 of a user first zooming in on an area of a map and then zooming out of the area. The first stage 1205 illustrates the mapping application displaying a region of a map. The mapping application is also displaying a scale 1220. For the particular zoom level of the map, the scale 1220 is at a range of 15 miles, and is displaying three segments each at 5 mile intervals. Stage 1205 also illustrates a shaded region 1225 surrounding the scale 1220. This shaded region 1225 illustrates an area around the scale 1220 that a user may also select to change the size of the scale and thus zoom to a different level of the map. In some embodiments, the mapping application allows a user to select within the general surrounding vicinity of the scale 1220 because a user may have difficulty selecting a position directly on the scale because the mapping application often displays the scale as only a few pixels wide on the display screen of the device. Thus a user may have difficulty positioning their input device directly on a pixel representing the scale 1220. As illustrated in stage 1205, the user is selecting and dragging the location indicator 1230 within the shaded region 1225 of the scale 1220 and moving in an outward direction to increase the size of the scale 1220.

Stage 1210 illustrates that the scale 1220 has increased in size. The scale 1220 still provides a range of 0 to 15 miles and is displaying three segments each at 5-mile intervals. Since the user has increased the size of the scale 1225 through the select and drag operation, the mapping application has also zoomed in on the area of the map. As illustrated, the roads within the region of the map now appear larger than in stage 1205 and a smaller area is being displayed by the mapping application. Stage 1210 also illustrates the user selecting and dragging the location indicator 1230 in an inward direction within the shaded region 1225 surrounding the scale 1220.

Stage 1215 illustrates that the scale 1220 has now decreased in size. Furthermore, the scale 1220 now displays a range of 0 to 20 miles and includes two segments, each at 10-mile intervals. The mapping application also illustrates that the roads are narrower and a larger area of the map being displayed than in stage 1210. FIG. 12 illustrates that the user is able to select within a certain surrounding region of the scale and still change the size of the scale. Although this figure illustrates the surrounding region 1225 as shaded, this is only for illustrative purposes and the surrounding shaded region is not actually visible in the actual implementation of the mapping application in some embodiments. Furthermore, different embodiments may specify a different size of the surrounding region based on different criteria.

In some embodiments, once a user selects a floating control (e.g., the dynamic scale or the compass control described in detail below) with the location indicator to perform a drag operation on the floating control, the mapping application does not display the location indicator (e.g., cursor) while the particular floating control is being dragged. For example, when the user selects and drags the dynamic scale with the location indicator to change to a different zoom level, the mapping application does not display the location indicator during the duration of the drag operation. Likewise, when the user selects and drags the compass control in a particular direction, the mapping application does not display the location indicator during the dragging of the compass control.

By not displaying the location indicator, the application provides the user with a sense that they are now controlling the particular floating control on the screen, rather than the position of the location indicator on the screen. By not displaying the location indicator during these operations, the application gives the user a greater sense of actually controlling the movement of the floating control on the screen. For example, the user may drag the mouse in different directions after selecting the dynamic scale and see the scale being resized and the map being zoomed based on the dragging of the mouse. Likewise, the user may drag the mouse in different directions after selecting the compass control and see both the map and compass control rotate and/or transition between 2D/3D based on the movement of the mouse input device. On the other hand, some embodiments maintain a display of the location indicator without moving the location indicator during the operation.

Figure 13:
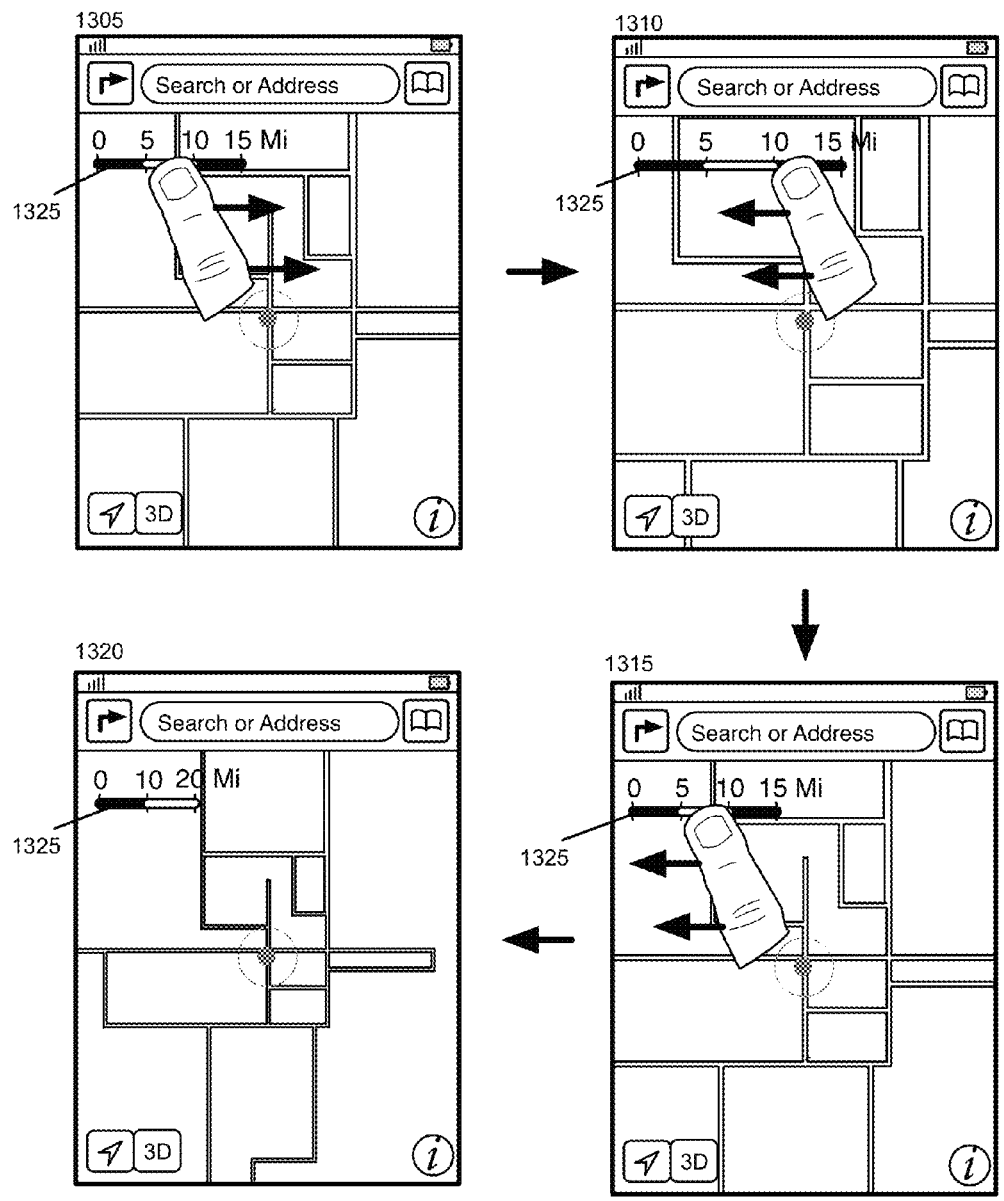
FIG. 13 illustrates a touch input on the scale to zoom to different levels by a mapping application of a touch-sensitive device of some embodiments.

In other embodiments, the floating control tools may be controlled through a touch interface of a device, which may not display a location indicator at all. FIG. 13 illustrates a touch input on the scale to zoom to different levels by a mapping application of a touch-sensitive device of some embodiments. This figure illustrates in four stages 1305-1320 a user using a touching gesture to zoom in on an area of a map and to zoom out of the area of the map. The first stage 1305 illustrates a mapping application running on a device with a touch screen user interface. For example, the device may be a smartphone or tablet that allows a user to touch the screen to navigate the map on a display area. In the first stage 1305, the mapping application is displaying an area of a map at a particular zoom level. The mapping application is displaying a scale 1325 overlaid on the map. The scale 1325 currently has a range of 0 to 15 miles, and is displaying three segments, each at 5-mile intervals (e.g., 0-5, 5-10, and 10-15 miles). The user is also swiping their finger along the scale 1325 in an outward direction to the right, which increases the size of the scale 1325 on the map.

Stage 1310 illustrates that the scale 1325 has increased in size but has maintained the same range (0 to 15 miles) and number of segments. The mapping application has zoomed in on the particular area of the map as a result of the user swiping her finger to increase the size of the scale 1325. Stage 1310 now illustrates the user swiping her finger along the scale 1325 in the opposite, inward direction which reduces the size of the scale 1325 (and thus zooms out). Stage 1315 illustrates that the scale 1325 has decreased in size, but again has maintained the same range (0 to 15 miles) and number of segments (3 segments at 5-mile intervals). The mapping application has also zoomed out to show a larger portion of the map and smaller, narrower roads within the map. Stage 1315 illustrates the user again swiping their finger along the scale 1325 in an inward direction to further reduce the size of the scale 1325 (and thus continue zooming out of the map region). Stage 1320 illustrates that the mapping application has again zoomed out to show a larger region of the map. The scale 1325 has both decreased in size and is showing a new range from 0 to 20 miles. Furthermore, the scale 1325 has reduced the number of segments from three to two, the two segments corresponding to 0 to 10 miles and 10 to 20 miles. The map is displaying a larger region with even smaller roads. FIG. 13 thus illustrates that a user may use various touch gestures on the scale to adjust the zoom level of the map when using a device with a touch-screen interface.

C. Smart-Aim Zoom

In some embodiments, the mapping application provides a "smart-aim" zoom feature that guides a user when zooming to a location on the map. In particular, the smart-aim zoom will first determine whether a particular location at which a user would like to zoom is near a particular point of interest (or a pin) on the map. In some embodiments, if the user's selected location is near (i.e., within a threshold distance of) a single point of interest/pin on the map, the mapping application zooms to the point of interest/pin on the map. If the location is near two points of interest/pins, the mapping application zooms to the closest point of interest/pin to the particular location. Otherwise, if the particular location is near (i.e., within a certain threshold distance) a cloud of points of interest/pins (i.e., a group of points of interest within a particular distance of each other on the map), the mapping application zooms to the center of the cloud of points of interest on the map. Otherwise the zoom is directed towards the user's selected location.

Figure 14:
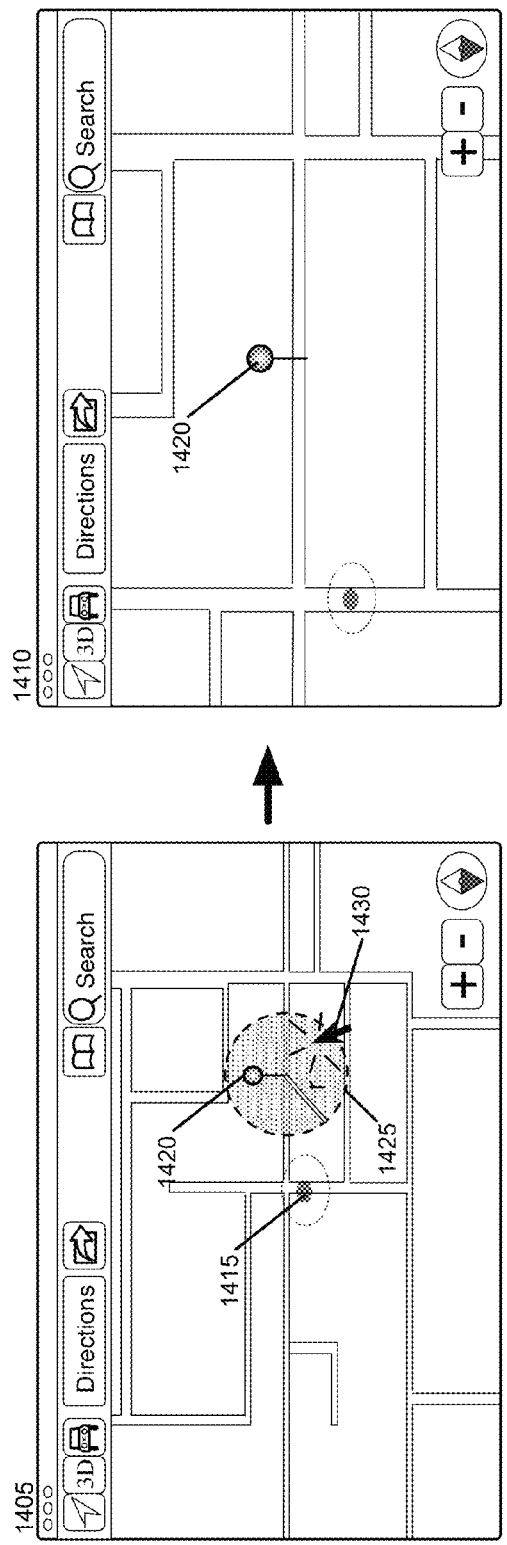
FIG. 14 conceptually illustrates the smart-aim zoom feature detecting a selection at a particular location within a first threshold of a pin and zooming towards the particular pin.

In some embodiments, the smart-aim zoom algorithm treats "points of interest" on the map the same as "pins" on the map. Accordingly, the description of the smart-aim algorithm in some embodiments may use the terms "point of interest" or "pin" interchangeably within the description of the algorithm. In particular, points of interest on a map generally corresponds to locations on the map that have been identified as locations that would interest a user, including, for example, a place of business, a tourist attraction, a landmark, a park, a building, etc. Pins on the map may correspond to locations that have been identified on the map as a result of, for example, a search query, a user dropping a pin on the map, a bookmarked location on the map, and various other actions that produce pins on the map. As described, the smart-aim zoom first determines whether a user's zoom location is near a particular point of interest or pin on the map. FIG. 14 illustrates a zoom towards a particular pin. This figure illustrates this operation in two stages 1405-1410.

The first stage 1405 illustrates the mapping application displaying a particular area of a map that includes various roads, the user's current location 1415 on the map, and a pin 1420. The pin may appear on the map, for instance, as a result of a previous search query executed by the user. In various embodiments, responsive to a user selection of a pin on the map (e.g., a touch selection, such as a tap), the device is configured to display additional information about the selected pin including but not limited to ratings, reviews or review snippets, hours of operation, store status (e.g., open for business, permanently closed, etc.), and/or images of a storefront for the point of interest.

Stage 1405 also illustrates the mapping application receiving a selection input 1430 at a particular location on the map. This location is within a certain threshold distance, or radius of the pin 1420, as illustrated by the shaded region 1425 surrounding the pin. The shaded region is illustrated in this figure only for illustrative purposes but is not actually displayed on the map by the mapping application. In some embodiments, the mapping application uses a different threshold distances for different pins based on various factors. For example, the mapping application will use a larger distance for a pin or point of interest that has been selected and a smaller distance for a pin or point of interest that has not been selected. Furthermore, in some embodiments, the mapping application uses larger threshold distances for pins and smaller threshold distances for points of interest.

Stage 1405 illustrates that the user has selected to zoom in on an area that is very close to the pin 1420. As such, the mapping application infers that the user actually intends to zoom in directly on the pin 1420. As such, the mapping application will re-center the map on the pin 1420 and focus the zoom on this point rather than the user's actual selected location 1430. Stage 1410 illustrates that the mapping application has now zoomed in on the pin 1420, which is now centered within the map. In this stage 1410, the mapping application displays a smaller region of the map with larger roads.

FIG. 14 illustrates a user selecting within a certain threshold distance of a single pin that caused the mapping application to infer that the user most likely intended to zoom in on the actual pin. In some embodiments, a user's selection may also be near a single point of interest on the map. When the user selects a location that is near a certain distance to a single point of interest (or pin) on the map, the mapping application infers that the user intends to zoom in on the point of interest and thus re-centers a zoom on the point of interest.

Figure 15:
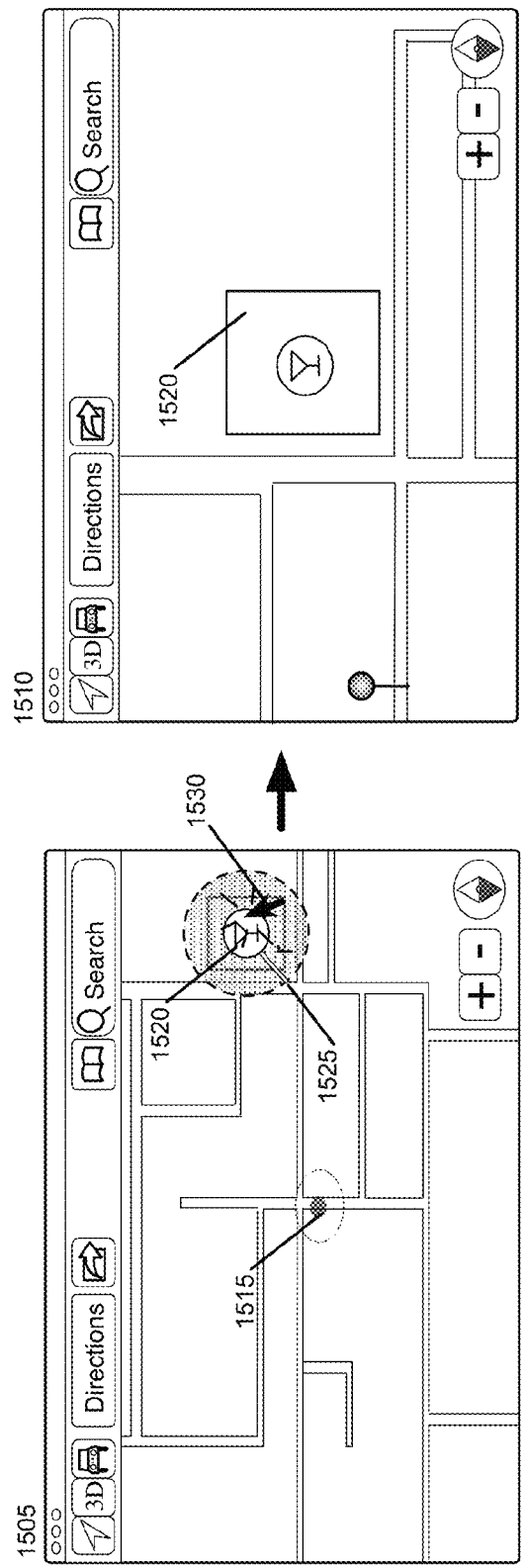
FIG. 15 conceptually illustrates the smart-aim zoom feature receiving a selection at a particular location with a first threshold of a point of interest and zooming towards the particular point of interest.

FIG. 15 illustrates a zoom towards a single particular point of interest on the map. This figure illustrates this operation in two stages 1505-1510. The first stage 1505 illustrates the mapping application displaying a particular area of a map that includes various roads, the user's current location 1515 on the map, and a point of interest 1520. The point of interest may appear on the map as a location that would likely interest a user searching within the particular region of the map. For example, the point of interest 1520 may be a place of business, a tourist attraction, a landmark, etc. In various embodiments, responsive to a user selection of a point of interest 1520 on the map (e.g., a touch selection, such as a tap), the device is configured to display additional information about the selected point of interest 1520 including but not limited to ratings, reviews or review snippets, hours of operation, store status (e.g., open for business, permanently closed, etc.), and/or images of a storefront for the point of interest.

Stage 1505 also illustrates the mapping application receiving a selection input 1530 at a particular location on the map. This location is within a certain threshold distance, "r", of the single point of interest 1520, as illustrated by the shaded region 1525 surrounding the point of interest. The shaded region 1525 is illustrated in this figure only for illustrative purposes but is not actually displayed on the map by the mapping application. In particular, the user has selected to zoom in on an area that is very close to the point of interest 1520. As such, the mapping application infers that the user actually intends to zoom in directly on the point of interest 1520. As such, the mapping application will re-center the map on the point of interest 1520 and focus the zoom on this point rather than the user's actual selected location 1530. Stage 1510 illustrates the mapping application has now zoomed in on the point of interest 1520, which is now centered within the map. In this stage 1510, the mapping application displays a smaller region of the map with larger roads than compared to stage 1505. FIGS. 14 and 15 illustrate a user selecting within a certain threshold distance of a single pin or point of interest that caused the mapping application to infer that the user most likely intended to zoom in on the actual pin or point of interest.

Figure 16:
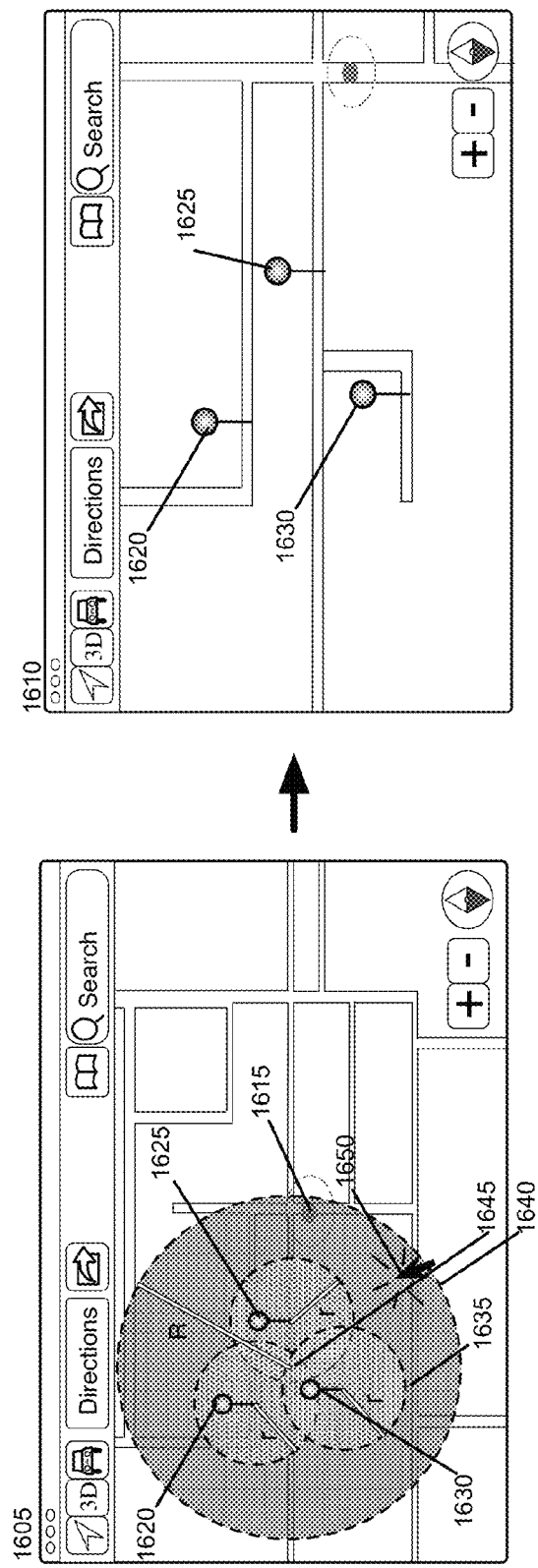
FIG. 16 conceptually illustrates the smart-aim zoom feature detecting a selection near a cloud of several pins and centering a zoom on this cloud of pins.

In some embodiments, a user's selection may not be near a single point of interest (or pin), but rather, near a group (sometimes referred to as a cloud) of several points of interest and/or pins. When the user selects a location that is within a certain distance to a cloud of points of interest and/or pins, the mapping application infers that the user intends to zoom in on the cloud of pins and thus re-centers a zoom over a center of the cloud of pins. FIG. 16 illustrates a user zooming in on a location near a cloud of several pins and the mapping application centering the zoom on this cloud of pins. This figure illustrates this operation in two stages 1605-1610.

The first stage 1605 illustrates the mapping application displaying a region of a map. The region of the map includes various roads, the user's current location 1615 on the map, and several pins corresponding to various points of interest 1620-1630. For each point of interest 1620-1630, this stage illustrates a first shaded region 1635 that has a radius "r" from a particular point of interest or pin. Furthermore, this stage also illustrates a second shaded region 1640 that has a larger radius "R" from a center point 1645 of the cloud of points of interest and pins 1620-1630. The mapping application is also receiving a user selection 1650 within this second shaded region 1640. Since the user selection 1650 is not within any of the smaller shaded regions 1635 of a single point of interest 1620-1630, and it is not within an inter-secting shaded region of two points of interest or pins, the mapping application does not re-center the zoom directly on any of the individual pins 1620-1630. However, since the mapping application has detected that the user selection is within the second, larger threshold distance "R" from the center 1645 of the cloud of pins 1620-1630, the mapping application will center the zoom using a computed center 1645 of the cloud of pins 1620-1630. In some embodiments, the center 1645 is computed by averaging the longitude and latitude coordinates of the pins and points of interest of the cloud (i.e., computing the barycenter). In some embodiments, the mapping application may select a "central" pin from among the cloud of pins 1620-1630 as the center to focus a zoom. In particular, the "central" pin may be identified by determining a pin amongst the cloud of pins for which the sum of the distances to the other pins in the cloud of pins is a minimum.

Stage 1610 illustrates that the mapping application has now zoomed in on the region of the map that includes the cloud of pins 1620-1630. Furthermore, the zoom has been centered on a calculated center (not illustrated) of the cloud of pins 1620-1630. Thus, even though the user's selection input was received at a different location, the mapping application has intelligently determined to focus the zoom on the center of cloud of pins 1620-1630.

Figure 17:
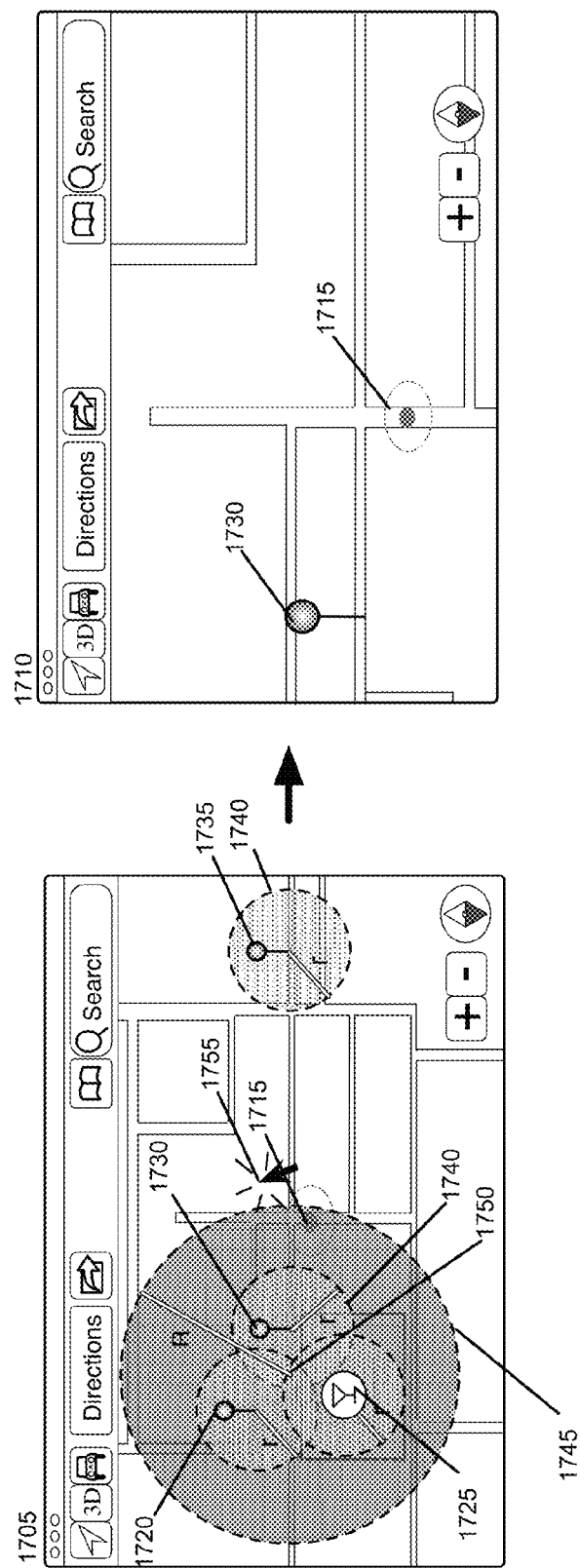
FIG. 17 conceptually illustrates the smart-aim zoom feature zooming directly to a user's selection in the situation where a user's selection is not near a single pin or a cloud of pins.

In the situation where a user's selection is not near a single pin, and is not near a cloud of pins, the mapping application zooms directly to the user's selected location. FIG. 17 illustrates the mapping application zooming directly to a user's selection. This figure illustrates this operation in two stages 1705-1710.

Stage 1705 illustrates the mapping application displaying an area of a map with various roads, the user's current location 1715 on the map, several pins and points of interest 1720-1735. Each pin and/or point of interest 1720-1735 also illustrates a surrounding first shaded region 1740 with a radius "r" from the particular pin 1720-1735. The cloud of pins 1720-1730 also include a surrounding larger second shaded region 1745 with a radius "R" from a center 1750 of the cloud of pins 1720-1730. This stage 1705 illustrates a first shaded region 1740 surrounding each pin 1720-1735 and a second shaded region 1745 surrounding the cloud of pins 1720-1730. As described above, these shaded regions are illustrated only for explanatory purposes and are not actually visible on the map in the mapping application.

Stage 1705 illustrates the mapping application receiving a user's selection input 1755 at a particular location on the map. This selection input 1755 is not within any of the individual shaded regions 1740 of any of the pins 1720-1735. Thus the mapping application will not zoom to any single pin on the map. Furthermore, the selection input 1755 is not within the second shaded region 1745 surrounding the cloud of pins 1720-1730. Thus the mapping application will not zoom to the center of the cloud of pins 1720-1730. Since the user's selection is not within any of the different shaded regions, the mapping application will zoom to the location of the user's selection input 1755.

Stage 1710 illustrates that the mapping application has zoomed to the area of the map centered at the user's selection input (not illustrated) received in stage 1705. The mapping application displays a single pin 1730 that has not been centered on the map, since the user selection on the map was at a distance larger than a threshold distance from this pin 1730. FIGS. 14-17 illustrate the smart-aim zoom feature used by some embodiments of the mapping application when zooming on a map. This smart-aim feature determines a user's likely intended zoom location to either a pin, a cloud of pins, or an actual location that has not been designated as a point of interest.

Figure 18:
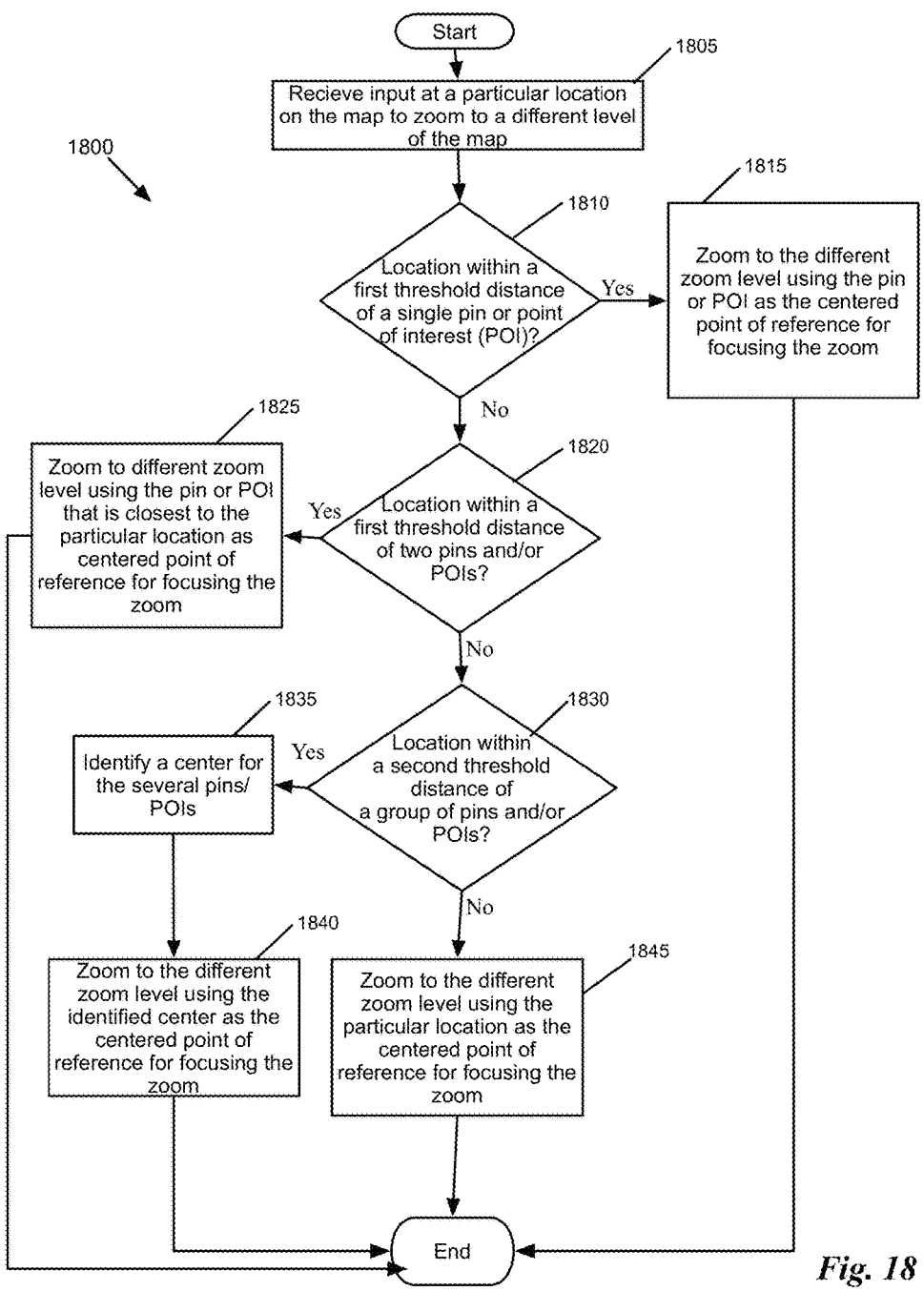
FIG. 18 conceptually illustrates a process of some embodiments for implementing a smart-aim zoom.

FIG. 18 conceptually illustrates a process 1800 of some embodiments for implementing a smart-aim zoom. In some embodiments, a mapping application performs the process 1800. The process 1800 starts by receiving (at 1805) an input at a particular location on a map to zoom to a different level of the map. The input may be received from various input devices, including any combination of a trackpad, mouse, keypad, scroll-wheel of a mouse, etc. In some embodiments, only specific types of zoom input result in the application performing a smart-aim zoom (e.g., a double-click or double-tap zoom input), while other types of zoom input do not use the smart-aim zoom process (e.g., using a displayed scale to change the zoom level).

The process then determines (at 1810) whether the particular location is within a first threshold distance of a single point of interest and/or a single pin on the map. In some embodiments, the threshold distance that is used may be a configurable parameter that can be specified by the user. In some embodiments, the threshold distance will vary based on the type of device being used, and thus may take into account the size of the screen space on which the mapping application is being displayed. In some embodiments, the threshold distance for a pin is larger than the threshold distance for a point of interest and the threshold distance for a selected pin or point of interest is larger than the threshold distance of a non-selected pin or point of interest.

When the process determines (at 1810) that the particular location is within the first threshold distance of only a singe pin or point of interest, the process zooms (at 1815) to the new different zoom level and uses the single point of interest (or single pin) as the point on which to focus the zoom. The process then ends. Thus the mapping application will re-center the map region on the point of interest or pin and not the actual location that the user had selected on the map.

When the process determines (at 1810) that the particular location is not within the first threshold distance of a single pin or point of interest, the process then determines (at 1820) whether the particular location is within the first threshold distance of two pins and/or points of interest (e.g., 1 pin and 1 point of interest, 2 pins, or points of interest). If the process determines that the particular location is within the first threshold distance of two pins/points of interest, the process zooms (at 1825) to the different zoom level using the pin or point of interest that is closest to the particular location as the centered point of reference for focusing the zoom. The process then ends.

If the location is not within this first threshold distance of two pins/points of interest, the process determines (at 1830) whether the particular location is within a second threshold distance of a group (also called a cloud) of pins and/or points of interest. For example, the user may select near a cloud of pins and points of interest on the map. Some embodiments identify clouds of pins and/or points of interest upon the display of the pins and points of interest on the map. In some embodiments, pins and points of interest are considered part of a single cloud when the first threshold distances (as described above for the smart zoom to a single pin) of the pins and points of interest overlap. Other embodiments consider all points of interest and/or pins within the viewable region of the map to be part of a cloud.

When the particular location is within the second threshold distance of the several points of interest and/or pins, the process identifies (at 1835) a center for the several points of interest and pins that form the cloud. In some embodiments, in order to identify a "center" of several points of interests and pins, the process computes the average of the coordinates (i.e. longitude and latitude coordinates) of the pins and/or points of interest on the map (i.e., the barycenter). In some embodiments, the process identifies a "central" pin (or point of interest) as the center by identifying a pin among the cloud of pins for which the sum of the distances to the other pins is a minimum. In some embodiments, the process may use other mechanisms for determining a center of a cloud of pins and points of interest.

After the process identifies a center for the cloud of pins, the process zooms (at 1840) to the different zoom level using the identified center as the centered point of reference for focusing the zoom and ends. However, if the process (at 1830) determines that the particular location is not within a second threshold distance of several pins and/or points of interest, the process zooms (at 1845) to the different zoom level using the particular location (at which the zoom input was received) as the centered point on which to focus the zoom. The process then ends.

D. Locked Zoom

Figure 19:
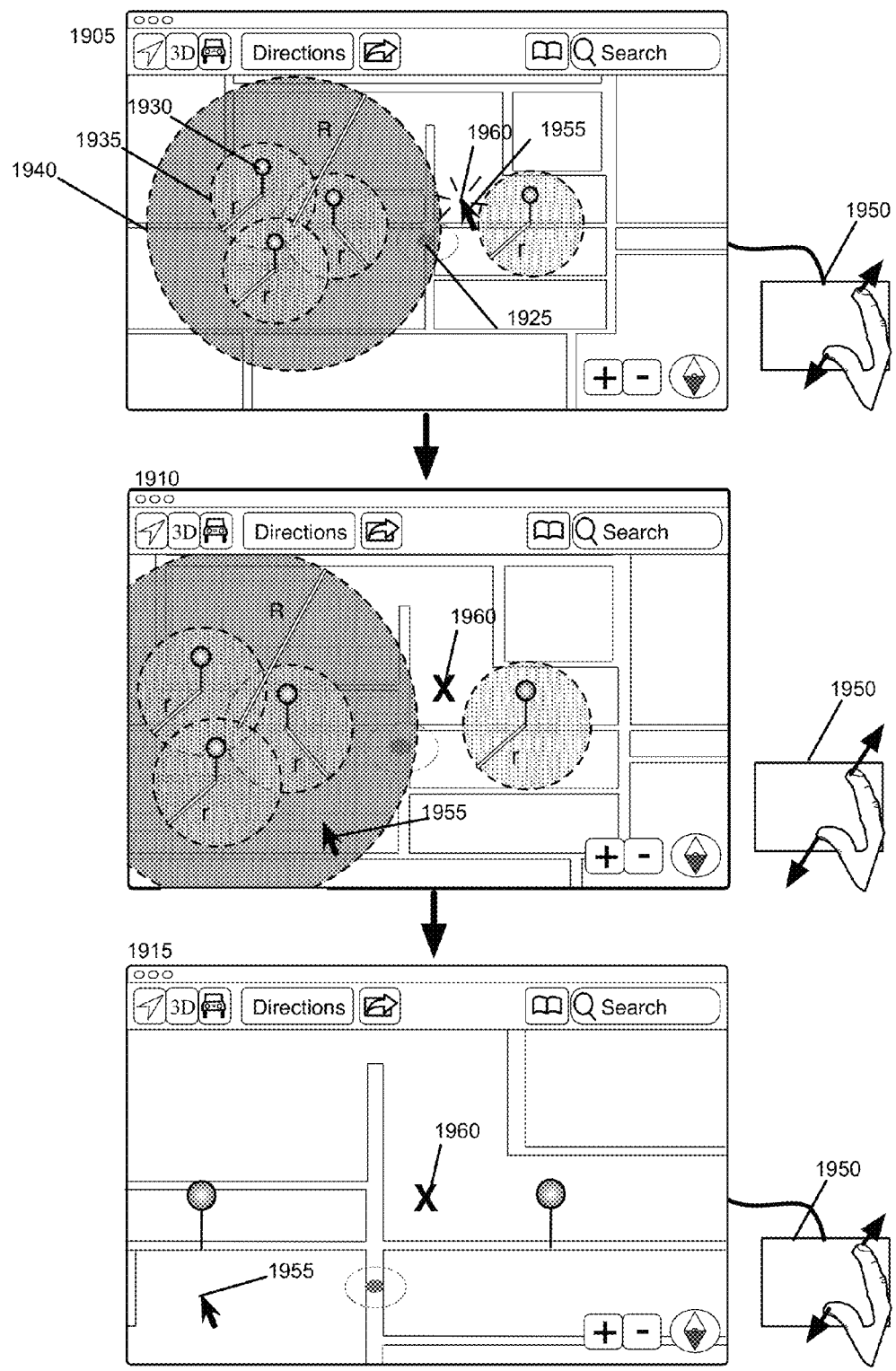
FIG. 19 conceptually illustrates a locked zoom feature of the mapping application.

In some embodiments, the mapping application also provides a "locked" zoom feature that allows a user to focus a zoom on a particular location of the map without having to constantly re-center the map region to zoom in on the location. In particular, the locked zoom feature locks a particular location to use as a "center" of a zoom when it first receives an initial input to zoom the map. The subsequent zooms are then locked towards this particular location even though the location indicator may be moved to a different area of the map. For example, a user may apply a series of two-finger spreading gestures on a trackpad device to zoom-in on a particular location on the map. While applying these series of gestures on the trackpad, the user may accidentally cause the location indicator to move to a different location of the map than the original location at which the user intended to direct the zoom. However, the locked zoom feature of the mapping application prevents the application from zooming to the moved location indicator location, since the application locked the center of the zoom at the original location at which the user first initiated the zoom on the map. Thus the user may continue to apply the gestures to zoom towards this original intended location without having to constantly re-center the map on the original location when the location indicator is accidentally moved to a different location on the map. FIG. 19 illustrates the mapping application zooming in on a particular location on the map using a locked zoom feature. This figure illustrates this operation in three stages 1905-1915.

The first stage 1905 illustrates the mapping application displaying an area of a map that includes various roads, the user's current location 1925 on the map, various pins 1930, a first shaded region of a pin 1935 and a second shaded region 1940 surrounding a cloud of pins 1930. Stage 1905 also illustrates a trackpad 1950 that provides a touch input for interacting with the mapping application and controlling the movement of the location indicator 1955 along the map. In particular, the user has placed the location indicator 1955 at a particular location on the map. This location is not within a first surrounding region 1935 of any individual pin 1930 or the second surrounding region 1940 of the cloud of pins 1930. Furthermore, the trackpad 1950 illustrates the user applying a two-finger spreading gesture (e.g., moving two fingers away from each other on the trackpad) in order to zoom-in on the selected location 1955.

Stage 1910 illustrates that the mapping application is displaying the map at a higher zoom level than it did at the previous stage 1905. The mapping application has locked the zoom at the particular location 1960 that was initially selected by the user in stage 1905. Furthermore, the mapping application now indicates that the location indicator 1955 has moved to a different area on the map. The trackpad 1950 indicates that the user is applying a second two-finger spreading gesture to zoom-in further on the map. As the mapping application previously locked the user's selected location 1960 for zooming the map, the mapping application will continue to zoom in on this particular location 1960 even though the location indicator 1955 has moved to a different area on the map.

Stage 1915 illustrates that the mapping application is displaying the map at a higher zoom level than it did at the previous stage 1910, and that this zoom has been focused towards the original selected location 1960 even though the location indicator 1955 has now moved to a different location on the map after the gestural input for zooming the map. In particular, in some embodiments, after the mapping application receives a gestural input to begin zooming in on the map at the particular location 1960, the mapping application locks this particular location for subsequent zooms, even though the location indicator 1955 may move to a different location on the map. Furthermore, the mapping application will ignore the movement of the location indicator 1955 as a result of the zoom swiping gestures, and continue to zoom in on the original location 1960 selected by the user. In some embodiments, the series of swiping gestures must be received within a certain time interval for the mapping application to keep the original selected location 1960 locked for the zoom. If a user decides to select a different location at which to re-center the zoom, the mapping application is able to detect this new location by analyzing the time between the zoom gestural input to determine whether to keep the original location locked or to use a new location as the focus of a subsequent zoom.

In addition to the various zooming mechanisms described above, the mapping application of some embodiments provides a novel interactive compass that may also be used for a variety of different purposes, which is described below in Section III.

III. Interactive Compass

Figure 20:
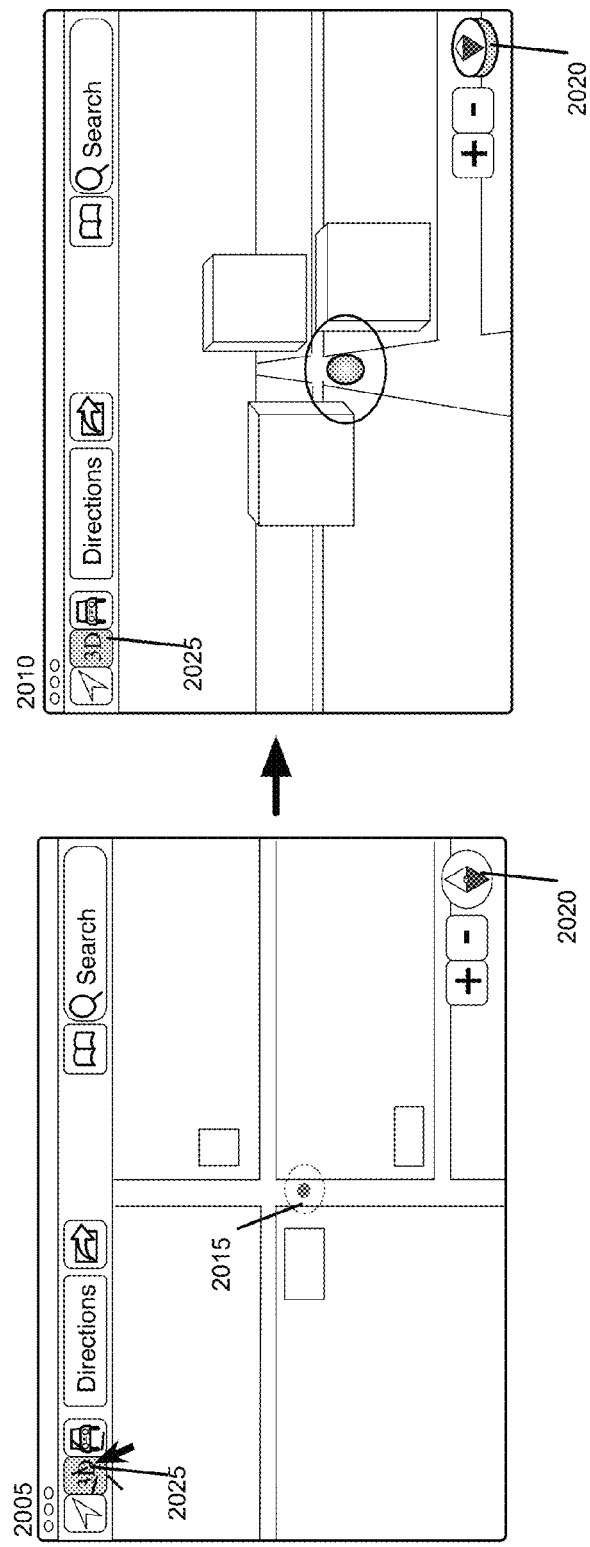
FIG. 20 conceptually illustrates a compass control as an indicator for determining whether the mapping application is in a 2D or 3D view of the map.

In some embodiments the mapping application provides an interactive on screen compass control that can be used to apply several different operations in the mapping application. For example, different user input on the compass control can cause the mapping application to perform various different operations, including rotating the map in different directions, transitioning the map presentation between 2D and 3D modes, and various other operations based on the particular type of user input. In particular, when the compass is dragged in a first vertical direction, the mapping application transitions from a 2D presentation to a 3D presentation (or vice-versa). When the compass control is dragged in a second, horizontal direction, the mapping application rotates the map in conjunction with the rotation of the compass. When the compass control receives a first selection input (e.g., a mouse click on the compass control), both the compass and corresponding map are rotated until they reach a north-up orientation. When the compass receives a second subsequent selection input (e.g., a second mouse click), the mapping application toggles the presentation of the map between a 2D and 3D mode. In addition to causing the application to perform the various operations described above, the compass control serves as (1) an indicator as to whether the mapping application is currently in a 2D mode or a 3D mode and (2) an indicator that continuously points to north (e.g., the direction to the North Pole). FIG. 20 illustrates the compass control as an indicator of whether the mapping application is in a 2D or 3D view of the map. This example illustrated in this figure is provided in terms of two stages 2005-2010 of interactions with the mapping application.

The first stage 2005 illustrates that the mapping application is displaying a map region that includes the current location 2015 of the device and a compass control 2020. The compass control 2020 serves as an indicator for several purposes. First, the compass control 2020 provides an indication of whether the mapping application is currently in a 2D mode or a 3D mode. Second, the compass control 2020 serves as an indicator that the user can use to identify the direction to the North Pole. In some embodiments, this compass control 2020 is in the shape of two isosceles triangles that abut at their bases, with one of the triangles pointing north (in a direction away from the abutting bases) and having a color (e.g., orange) that differentiates it from the other triangle. As further described below, the compass control 2020 can also be used to restore a north-up orientation after the user has rotated a 2D or 3D view of the map. In some embodiments, the compass control 2020 will not disappear until the mapping application receives a user input to remove the compass (e.g., selection of the compass).

In stage 2005, the compass control 2020 is illustrated upright, flat on the map to indicate that the mapping application is in a 2D mode. In this stage, the mapping application is also receiving a user selection of a 3D button 2025 to switch from the current 2D mode of the map to a 3D mode of the map.

Stage 2010 illustrates that the mapping application has entered a 3D mode, with the buildings illustrated on the map in a 3-dimensions. Furthermore, the compass control 2020 has changed shape to a 3-dimensional object as well. In some embodiments, the mapping application displays a shadow underneath the compass control 2020 to further exemplify that the mapping application is in a 3D mode.

Figure 21:
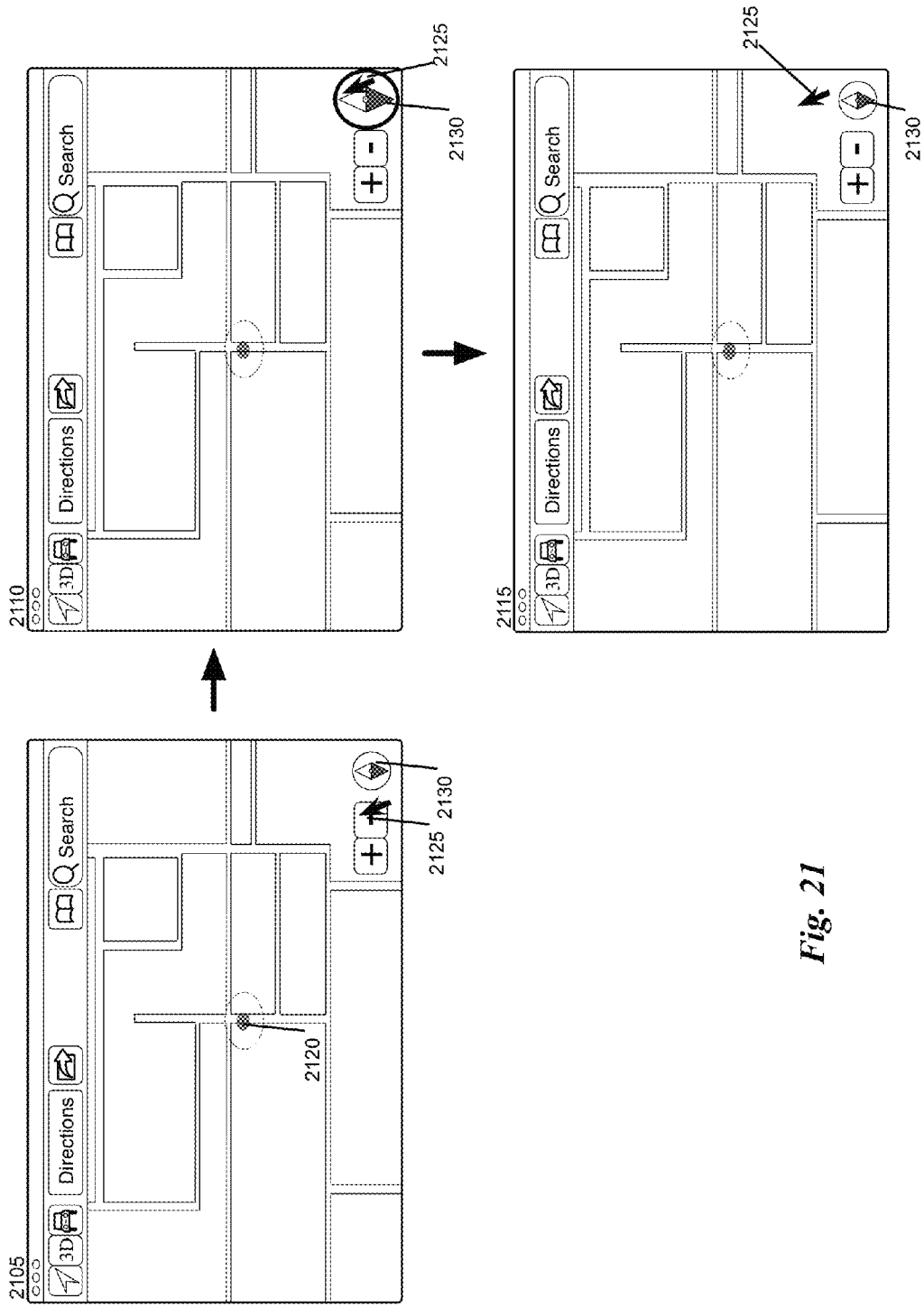
FIG. 21 conceptually illustrates the compass control changing size to indicate that it is selectable when a user's location indicator is positioned over the compass.

In order to give an indication to the user that the compass control is a selectable control item within the user interface of the mapping application, the compass control changes size when a user's control input is positioned over the compass control. FIG. 21 illustrates the compass control changing size to indicate that it is selectable when a user's location indicator is positioned over the compass. This example illustrated in this figures is provided in terms of three stages 2105-2115 of interactions with the mapping application.

The first stage 2105 illustrates the mapping application displaying a map region that includes the current location 2120 of the device, a location indicator 2125, and a compass control 2130. As illustrated, the location indicator 2125 is currently positioned over a zoom-out button on the map (which is not being selected). The compass control 2130 is illustrated at a particular size within the map.

The second stage 2110 illustrates that the location indicator 2125 has moved and is now positioned over the compass control 2130. As such, the compass control 2130 has changed in size to a larger size to indicate that it is a selectable item on the map. If the compass control 2130 had not changed size, a user would likely have not known that the user is able to select the compass control 2130 for various operations. Stage 2115 illustrates that the location indicator 2125 has moved further up and is no longer positioned over the compass control 2130. Since the location indicator 2125 is no longer positioned over the compass control 2130, the compass control 2130 has changed back to its original size illustrated in stage 2105.

A. Compass for Transitioning Between 2D and 3D

Figure 22:
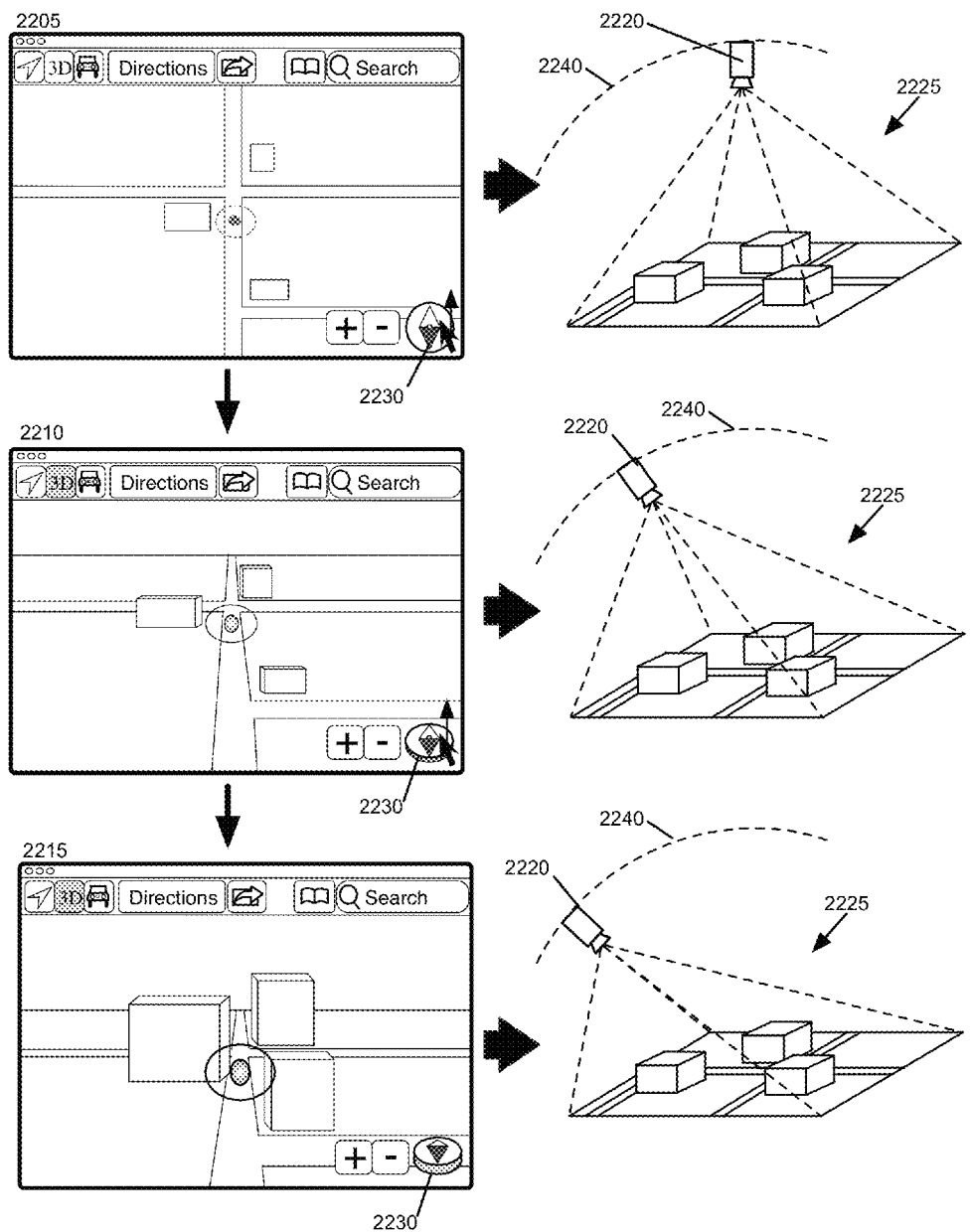
FIG. 22 conceptually illustrates a map transitioning from a 2D to 3D mode based on a user dragging the compass control in a vertical direction.

A user may use the compass control to apply various operations in the mapping application. For example, the user may drag the compass in a particular direction to rotate the map. Furthermore, the user may drag the compass in another particular direction to cause the mapping application to transition from a 2D mode to a 3D mode (or a 3D mode to a 2D mode depending on the current mode of the mapping application). FIG. 22 illustrates the map view transitioning from a 2D to 3D mode based on a user dragging the compass control in a vertical direction. This example illustrated in this figure is provided in terms of three stages 2205-2215 of interactions with the mapping application. For each stage, the figure also illustrates the concept of a virtual camera. When rendering a 3D map, a virtual camera is a conceptualization of the position in the 3D map scene from which the device renders the scene to generate a 3D view of the map. FIG. 22 illustrates a location in a 3D map scene 2225 that includes three buildings and various intersecting roads. To illustrate the transition of the map view from a 2D to a 3D mode, this figure illustrates a corresponding virtual camera 2220 in three scenarios, each of which corresponds to a different virtual camera location (i.e., a different rendering position) and a different resulting view that is displayed by the mapping application on the device in each stage 2205-2215.

Stage 2205 illustrates the mapping application displaying a region of a map in a 2D mode. The region includes 3 buildings and various intersecting roads. The first stage 2205 shows the virtual camera 2220 at a first perspective position pointing directly downwards towards the 2D map at a first angle (e.g., 90 degrees) with respect to the horizon. In this position, the camera 2220 points towards a location that may be a stationary position of the device or of a location being explored with the mapping application. When the map is being used for navigation, the location may correspond to a position in front of a moving location of the device. In some embodiments, the default position of the camera 2220 is set at a particular orientation with respect to the current location, but this orientation can be modified when the user rotates the map. Stage 2205 also illustrates the mapping application receiving a select and drag of the compass control 2230 in a vertical direction upwards. This causes the map view to begin to transition from the current 2D mode to a 3D mode.

Stage 2210 illustrates the mapping application displaying the region of the map in a 3D mode. The building and roads are now illustrated in 3D. Furthermore, stage 2210 illustrates the virtual camera 2220 at a new perspective position pointing downwards towards the 3D map at a smaller angle with respect to the horizon (that is less than 90 degrees). The scene rising is accomplished by the virtual camera 2220 lowering and decreasing the viewing angle with respect to the horizon. Rendering a 3D map view using the virtual camera 2220 positioned at this angle results in a 3D map view 2210 in which the buildings and the roads are taller than their illustration in the first map view 2205 in the first stage. As indicated by the dashed-line arc 2240, the virtual camera 2200 moved downwards along arc 2240 while tilting (e.g., pitching) farther up. Furthermore, in stage 2210, the mapping application is still receiving a select and drag of the compass control 2230 in the vertical direction.

The third stage 2215 shows the scene rising, which is accomplished by the virtual camera 2220 lowering and decreasing the viewing angle with respect to the horizon. In some embodiments, the particular rate by which the virtual camera lowers (or raises) is computed based on the rate that the user performs the drag operation. For example, if a user performs a fast vertical drag, the mapping application will quickly transition between the 2D and 3D modes, whereas if the user performs a slower vertical drag, the mapping application will transition between the 2D and 3D modes at a slower rate. Rendering a 3D map view using the virtual camera 2220 positioned at this angle results in a 3D map view 2215 in which the buildings and the roads are taller than their illustration in the map view of the second stage 2210. The third stage 2215 shows the virtual camera 2220 at a different second perspective position pointing at a lower perspective towards the 3D map 2225 at an even smaller second angle (e.g., 30 degrees) with respect to the horizon than in the second stage 2210. As indicated by the dashed-line arc 2240, the virtual camera 2200 has moved even further downwards along arc 2240 while tilting (e.g., pitching) farther up.

Figure 23:
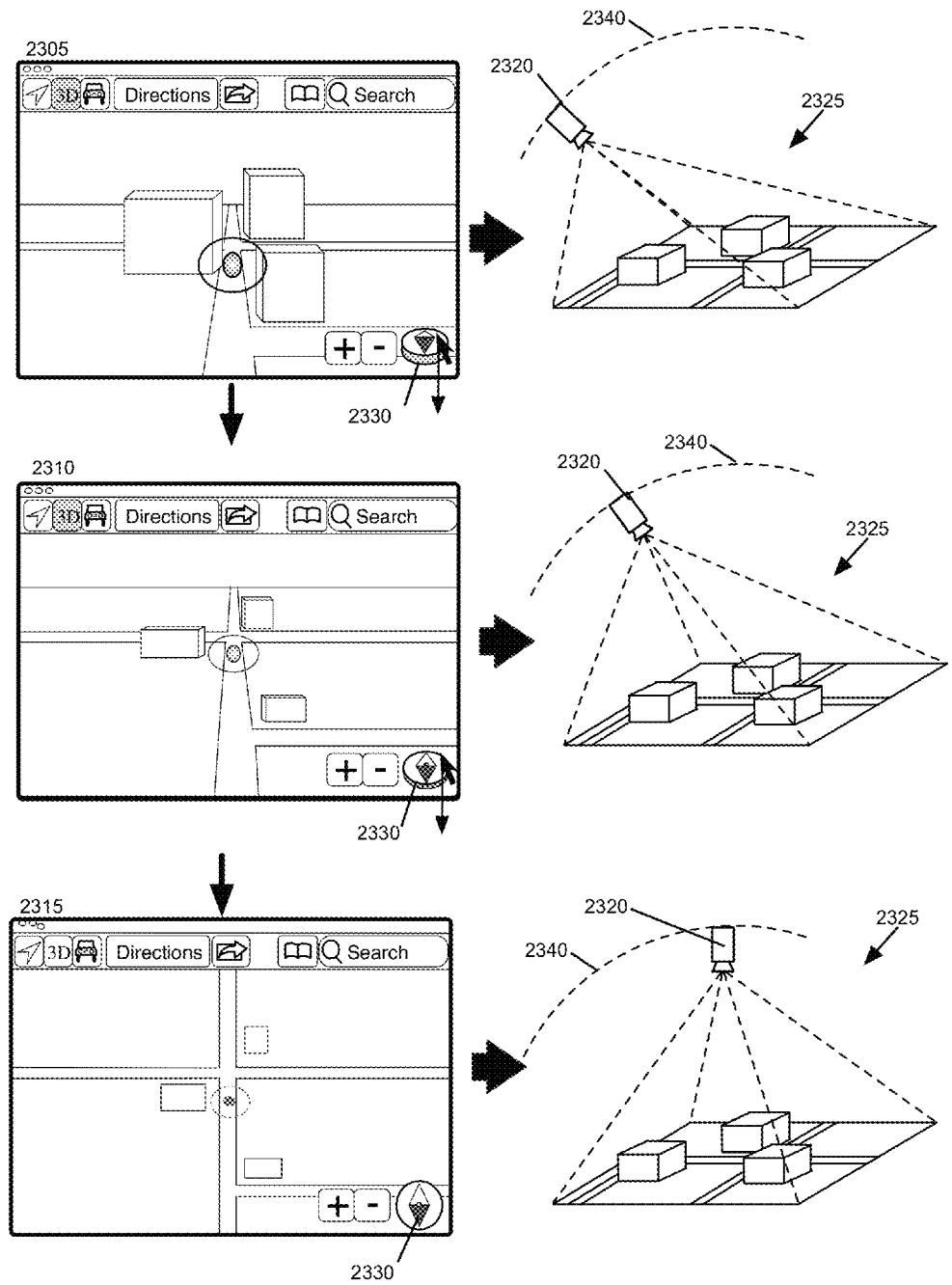
FIG. 23 conceptually illustrates the map transitioning from a 3D to 2D mode based on a user dragging the compass control in a vertical direction downwards.

FIG. 23 illustrates the map view transitioning from a 3D to 2D mode based on a user dragging the compass control in a vertical direction downwards. This example illustrated in this figure is provided in terms of three stages 2305-2315 of interactions with the mapping application. For each stage, the figure also illustrates the virtual camera over the map scene. Stage 2305 illustrates the mapping application displaying three buildings and various intersecting roads in 3D. Furthermore, stage 2305 illustrates the virtual camera 2320 at a perspective position pointing downwards towards the 3D map scene 2325 at a particular angle with respect to the horizon (that is less than 90 degrees). Stage 2305 also illustrates the mapping application receiving a select and drag of the compass control 2330 in a vertical direction downwards. This causes the mapping application to transition the map view from the current 3D mode to a 2D mode.

Stage 2310 illustrates the mapping application displaying the region of the map. The building and roads are still illustrated in 3D, however, the building are not as tall as in stage 2310. Furthermore, stage 2310 illustrates the virtual camera 2320 at a new perspective position pointing downwards towards the 3D map at a larger angle with respect to the horizon than in stage 2305 (that is still less than 90 degrees). The scene flattening is accomplished by the virtual camera 2320 raising and increasing the viewing angle with respect to the horizon. Rendering the 3D map view using the virtual camera 2320 positioned at this angle results in the 3D map view 2310 in which the buildings and the roads are shorter and narrower than their illustration in the first map view 2305 in the first stage. As indicated by the dashed-line arc 2340, the virtual camera 2320 moved upwards along arc 2340 while tilting (e.g., pitching) farther down. Furthermore, stage 2310 illustrates the mapping application continuing to receive the drag of the compass control 2330 in the vertical direction downwards.

The third stage 2315 illustrates that the map scene has completely flattened into a 2D mode, which is accomplished by the virtual camera 2320 raising and increasing the viewing angle with respect to the horizon. In particular, the virtual camera 2320 is now pointing directly downwards towards the map scene 2325 at a perpendicular angle (e.g., 90 degrees) with respect to the horizon. Rendering a map view using the virtual camera 2320 positioned at this angle results in a 2D map view in which the buildings and the roads have now been flattened out. In some embodiments, a downward vertical drag may cause the mapping application to transition from a 2D to 3D mode and an upward vertical drag may cause the mapping application to transition from a 3D mode to a 2D mode. In other embodiments, a user may specify a particular direction as a preference setting provided by the mapping application. In addition to using the compass control to perform 2D/3D adjustments, the compass control may also be used to rotate the region of the map being displayed by the mapping application.

B. Compass for Rotating Map View

Figure 24:
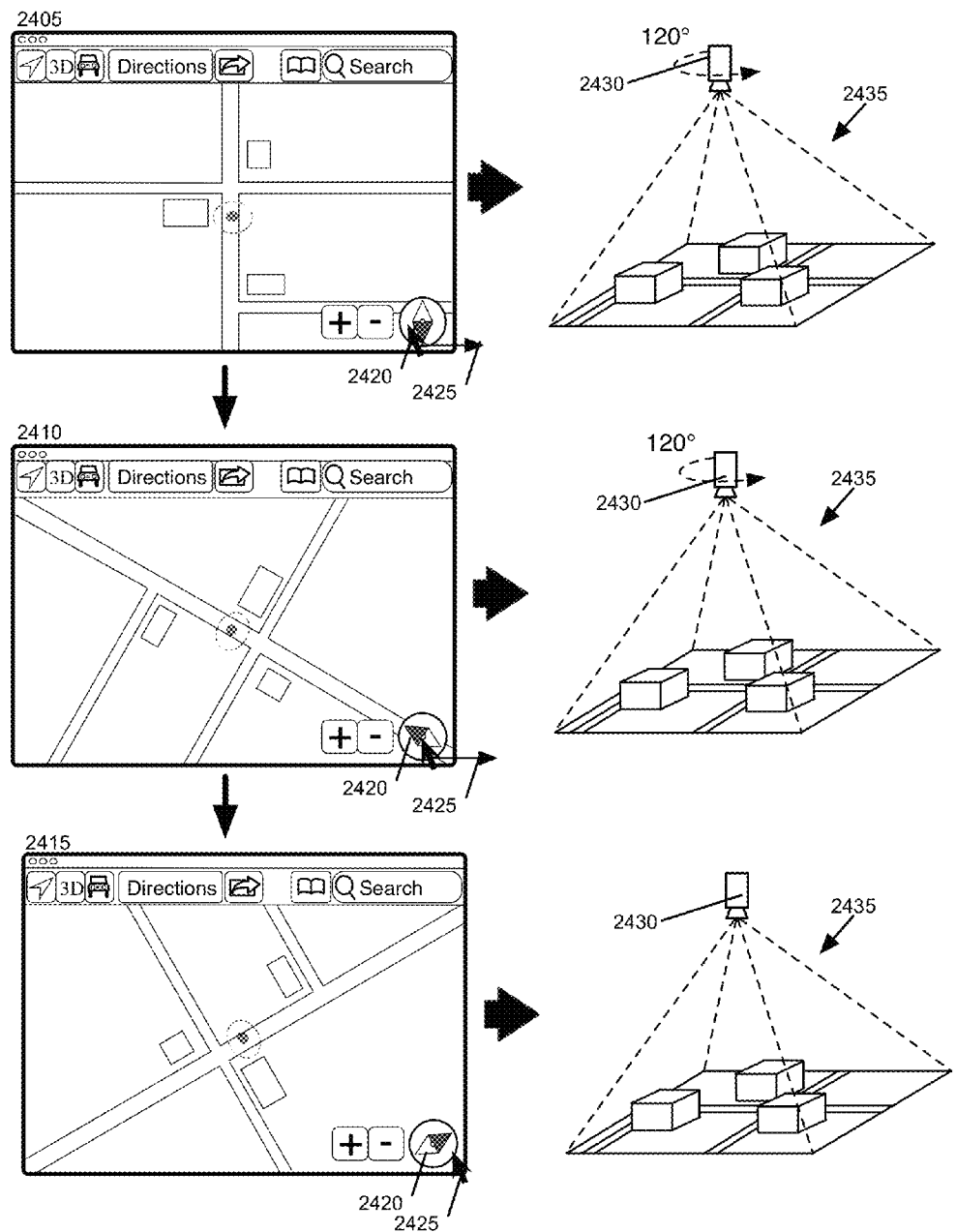
FIG. 24 conceptually illustrates using the compass control to rotate the map.

The compass control can be used to rotate the region of the map being displayed by the mapping application. FIG. 24 illustrates using the compass control to rotate the map view. This example illustrated in this figure is provided in terms of three stages 2405-2415 of interactions with the mapping application. For each stage, the figure also illustrates the virtual camera 2430 position for the particular stage in order to conceptualize the position in the map scene 2435 from which the device renders the scene to generate the view of the map.

Stage 2405 illustrates the mapping application displaying a region of a map. The region includes three buildings and several roads. Furthermore, the compass control 2420 indicates that the user is facing south on the map (e.g., the colored portion of the compass control 2420 corresponding to north is pointed down). This stage also illustrates the mapping application receiving a select and drag of the compass control 2420 in the horizontal direction by the location indicator 2425. This has the effect of rotating the region of the map being displayed, which is illustrated by the rotation of the virtual camera 2430 (e.g., by 120 degrees) over the map scene 2435. In this example, the virtual camera and map were rotated by 120 degrees during the duration that the user dragged the compass control. In some embodiments, the map may rotate at different rates. In particular, the rate of rotation is computed based on the rate that the user performers the drag operation. For example, a map region will rotate at a faster rate if the user performs a fast horizontal drag, and a slower rate if the user performs a slower horizontal drag. In some embodiments, the mapping application may change the rate of rotation based on the duration of the drag operation. For instance, the mapping application may initially rotate the map at a slower rate of rotation and gradually increase the rate of rotation as the duration of the drag operation increases.

In stage 2405, the user is dragging the lower portion of the compass control to the right, which causes the mapping application to rotate counter-clockwise. If the user had dragged the lower portion of the compass control 2425 to the left, this would have rotated the map view in a clock-wise manner. Furthermore, if the user had dragged the top portion of the compass control 2425 to the right, it would have caused the map view to rotate in a clockwise manner and if the user had dragged the top portion of the compass control to the left, it would have caused the map view to rotate in a counter-clockwise manner.

Stage 2410 illustrates that the mapping application now displays the region of the map after a rotation by 120 degrees. As such, the map includes the same 3 buildings displayed in stage 2405, but from a different rotated viewing angle. Furthermore, the orientation of the compass control 2420 has changed to show the change in view on the map. Stage 2410 illustrates the user continuing to select and drag the compass control 2420 in the horizontal direction to the right, which causes the mapping application to continue to rotate the region of the map being displayed. As illustrated, the virtual camera 2430 is also continuing to rotate by another 120 degrees of the map scene 2435 for the particular duration that the user performs the drag operation. This example illustrates the mapping application rotating the map scene by 120 degrees in both stages 2405 and 2410, which would occur in the situation where the duration of the drag operations are identical. In particular, the map continuously rotates as the user drags the particular compass control and stops rotating when the user releases the selection of the compass control. In some embodiments, the rate that the map rotates is based on the rate that the user performs the dragging with the particular input device. For example, the rate that the user moves the mouse in a particular direction determines the rate of rotation of the compass control Stage 2415 illustrates that the mapping application has now stopped rotating the region of the map being displayed since the compass control 2420 is no longer being dragged to the right. Likewise, the virtual camera 2430 is no longer rotating over the map scene 2435. Stage 2415 illustrates the mapping application displaying the region of the map after having rotated it by a total of 240 degrees (120 degrees between stage 2405 and 2410 and 120 degrees from stage 2410 to 2415) from the first stage 2405. The region of the map illustrates the three buildings from a different view than in the previous stages 2410 and 2405. Furthermore, the compass control 2420 now indicates that the user is facing a different direction (e.g., closer to the west).

Figure 25:
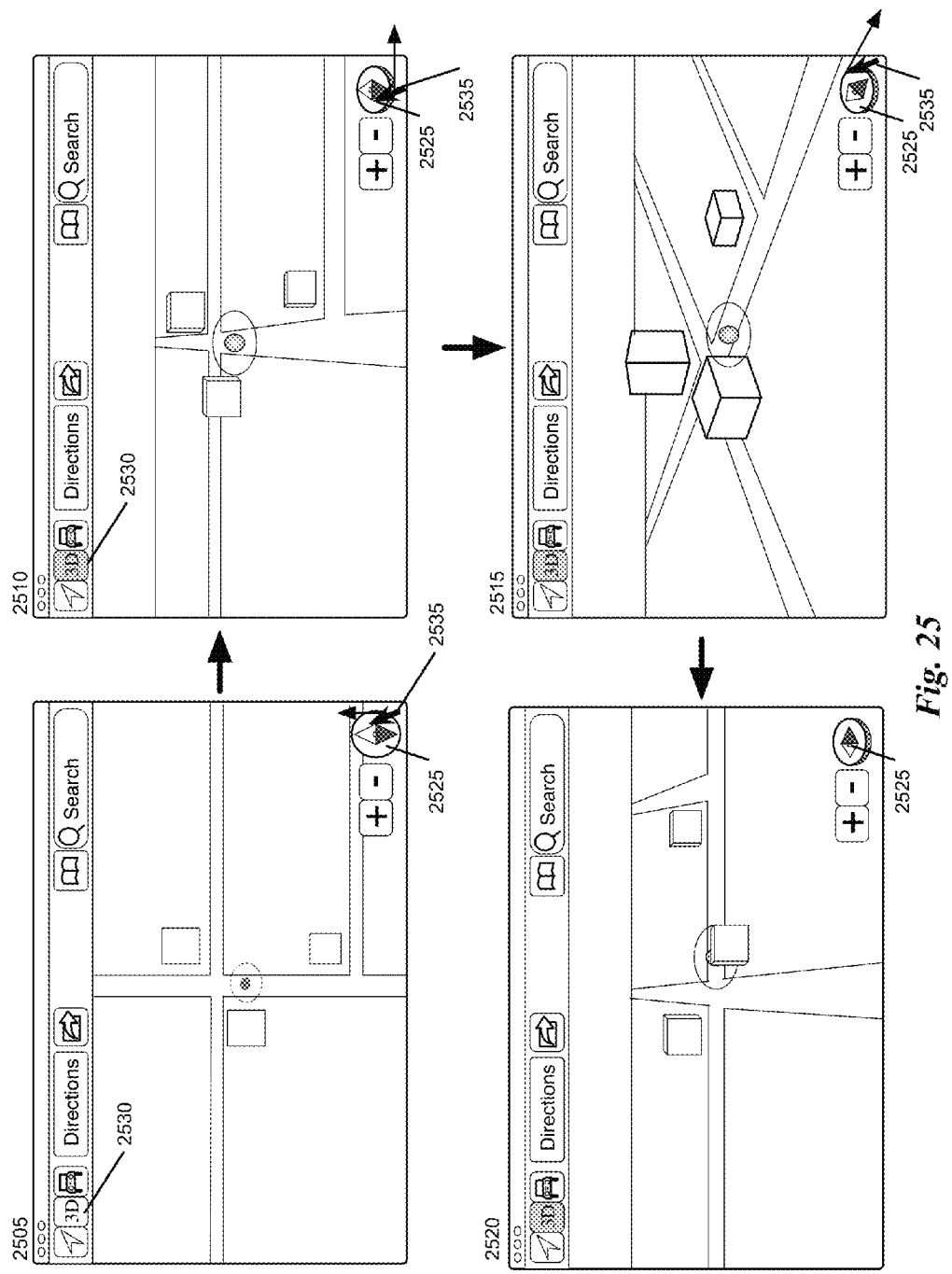
FIG. 25 conceptually illustrates a user interacting with the compass control to both transition between a 2D and 3D mode and to rotate to a desired view of a region of a map.

By selecting and dragging the compass control in different directions, a user can navigate a region of the map being displayed by the mapping application. As described above, FIG. 14 illustrates that the compass control can be used to transition between a 2D and 3D mode and FIG. 15 illustrates that the compass control can be used to rotate the map view to different directions. A user can interact with the compass control to easily adjust the map view both between a 2D and 3D mode and to their desired viewpoint. FIG. 25 illustrates a user interacting with the compass control to both transition between a 2D and 3D mode and to rotate to a desired view of a region of a map. This example illustrated in this figure is provided in terms of four stages 2505-2520 of interactions with the mapping application.

Stage 2505 illustrates the mapping application displaying a region of a map that includes three buildings and several intersecting roads. The mapping application is also displaying various tools, including a compass control 2525 that provides both an indication of the direction for north and an indication of whether the map view is in a 2D or a 3D mode. As illustrated, the compass control 2525 is currently upright to indicate that the mapping application is in a 2D mode. Furthermore, the buildings and roads are flat on the map and the 3D control icon 2530 is not currently highlighted. Stage 2505 also illustrates the mapping application receiving a user selecting and dragging the compass control 2525 with the location indicator 2535 in a vertical direction. As described in FIG. 22, when a user selects and drags the compass control 2535 in a vertical direction, the map view transitions to a 3D mode (or a 2D mode if the application is already in a 3D mode and the vertical direction is downward).

Stage 2510 illustrates the mapping application displaying the region of the map in a 3D mode. The three buildings now appear in three-dimension. Furthermore, the 3D control icon 2530 has been highlighted to indicate that the map view is now in a 3D mode. Likewise, the compass control 2535 has been flattened out to provide another indication of the 3D mode. Stage 2510 illustrates the mapping application receiving another select and drag of the compass control 2525 with the location indicator 2535 being dragged in a horizontal direction. As described in FIG. 24, this horizontal dragging causes the mapping application to rotate the view of the map region.

Stage 2515 illustrates the mapping application now displaying the region of the map after rotating to a new viewpoint. The same three buildings that were illustrated in the previous stage now appear at a different angle. Furthermore, the compass control has rotated based on the direction to the north. Stage 2515 illustrates that the user is now selecting and dragging the compass control 2525 in the diagonal direction downwards, which simultaneously rotates the region of the map being displayed by the mapping application and transitions the map from the 3D to 2D modes. In particular, when the user drags the compass control in a diagonal direction, the mapping application rotates the map based on the horizontal aspect of the diagonal drag and transitions the map between 2D and 3D based on the vertical aspect of the diagonal drag.

Stage 2520 illustrates the mapping application displaying the region after further rotating the region than in stage 2515. The compass control 2525 indicates that the region of the map is now facing west. Furthermore, the mapping application has slightly transitioned the map back towards the 2D mode as a result of the downward vertical dragging aspect of the diagonal drag in stage 2515, as illustrated by the buildings appearing shorter and flattening towards the 2D mode. Furthermore, the user is no longer dragging the compass control 2525 which has stopped both the rotation and transitioning of the region of the map being displayed by the mapping application. As such, this figure illustrates that the user can quickly obtain a desired view of a region of a map by dragging the compass control in various directions to adjust both the view of the map between a 3D and 2D perspective and rotating the map to a particular direction.

C. Compass to Reorient to North and Toggle 2D-3D

Figure 26:
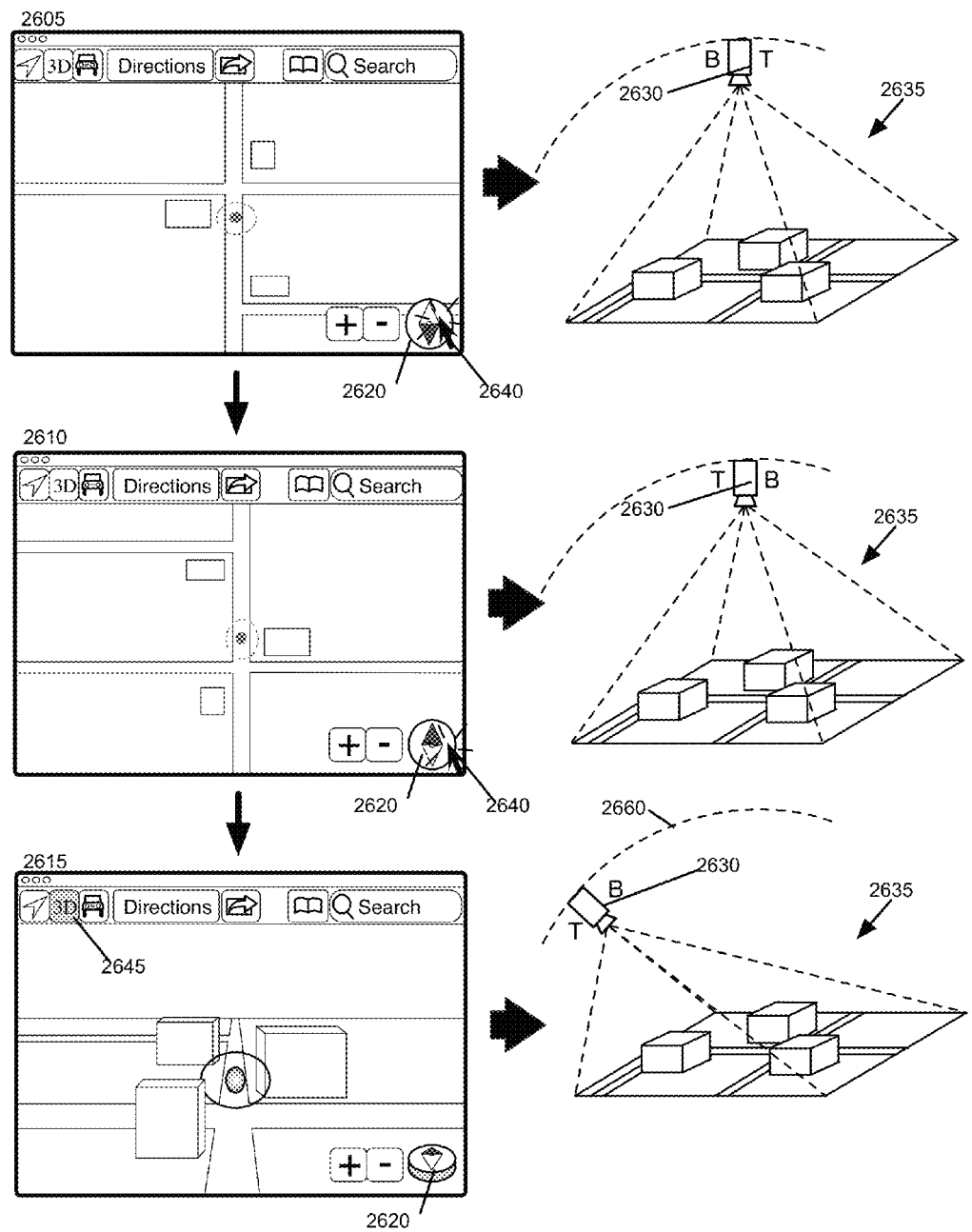
FIG. 26 conceptually illustrates using the compass control to restore a north-up orientation and to transition into a 3D mode.

In some cases, applying various rotations to the map may result in a map that the user cannot quickly visually understand, due to being accustomed to north-up maps. Without an easy way to get back to north-up orientation (i.e., an orientation where the north direction is aligned with the top of the device), some users may have difficulty interacting with the map views. To solve this, the mapping application of some embodiments allows the user to select (e.g., via a mouse-click) the compass control to restore a north-up orientation. Furthermore, the user may select the compass control a second time (e.g., via a second mouse-click) to transition from a 2D to a 3D mode (or a 3D to 2D mode). FIG. 26 illustrates using the compass control to restore a north-up orientation and to transition into a 3D mode. This example illustrated in this figure is provided in terms of three stages 2605-2615 of interactions with the mapping application. Furthermore, for each stage 2605-2615 the figure also illustrates the position of a virtual camera 2630 for the particular stage in order to conceptualize the position in the map scene 2635 from which the device renders the scene to generate the view of the map.

Stage 2605 illustrates the mapping application displaying a region of the map in a 2D mode. The region includes three buildings and various intersecting roads. The compass control 2620 currently indicates that the mapping view is facing south. Likewise the virtual camera 2630 is positioned directly over the map scene 2635. The top and bottom of the virtual camera 2630 have also been labeled for explanatory purposes. As orientated, the virtual camera 2630 is currently positioned such that the right side of the map scene 2635 corresponds to a south direction (as drawn in the figure, the right side of the map scene 2635 corresponds to the top of the map as shown on the device, in order to show the angle of the virtual camera 2630). Stage 2605 also illustrates the mapping application receiving a user selection of the compass control 2620 through a location indicator 2640 on the screen. After a user selects the compass control 2620 a first time, the mapping application restores a north-up orientation of the map.

Stage 2610 illustrates that the mapping application is now displaying the region of the map in a north-up orientation, as indicated by the colored portion of the compass control 2620. Likewise, the virtual camera 2630 now indicates that the top and bottom of the virtual camera are at opposite ends as from stage 2605 with the left-side of the map scene 2635 corresponding to the top of the map as shown on the device. Stage 2610 illustrates the mapping application receiving a second user selection of the compass control 2620 through the location indicator 2640. After receiving a second selection input, the compass control 2620 causes the mapping application to transition to a 3D mode.

Stage 2615 illustrates the mapping application displaying a 3D mode of the region of the map. The three buildings and the roads on the map now appear in three-dimension. Furthermore, the compass control 2620 has been flattened out and shown in 3D on the screen to provide a further indication that the mapping application is now in 3D mode. Likewise, the 3D control icon 2645 has been highlighted to indicate that the mapping application is in 3D mode. The corresponding virtual camera 2630 over the map scene 2635 has moved downward along the dashed-arc 2660 to a diagonal angle. At this angle, the buildings appear in 3 dimension and are not flat on the screen.

Figure 27:
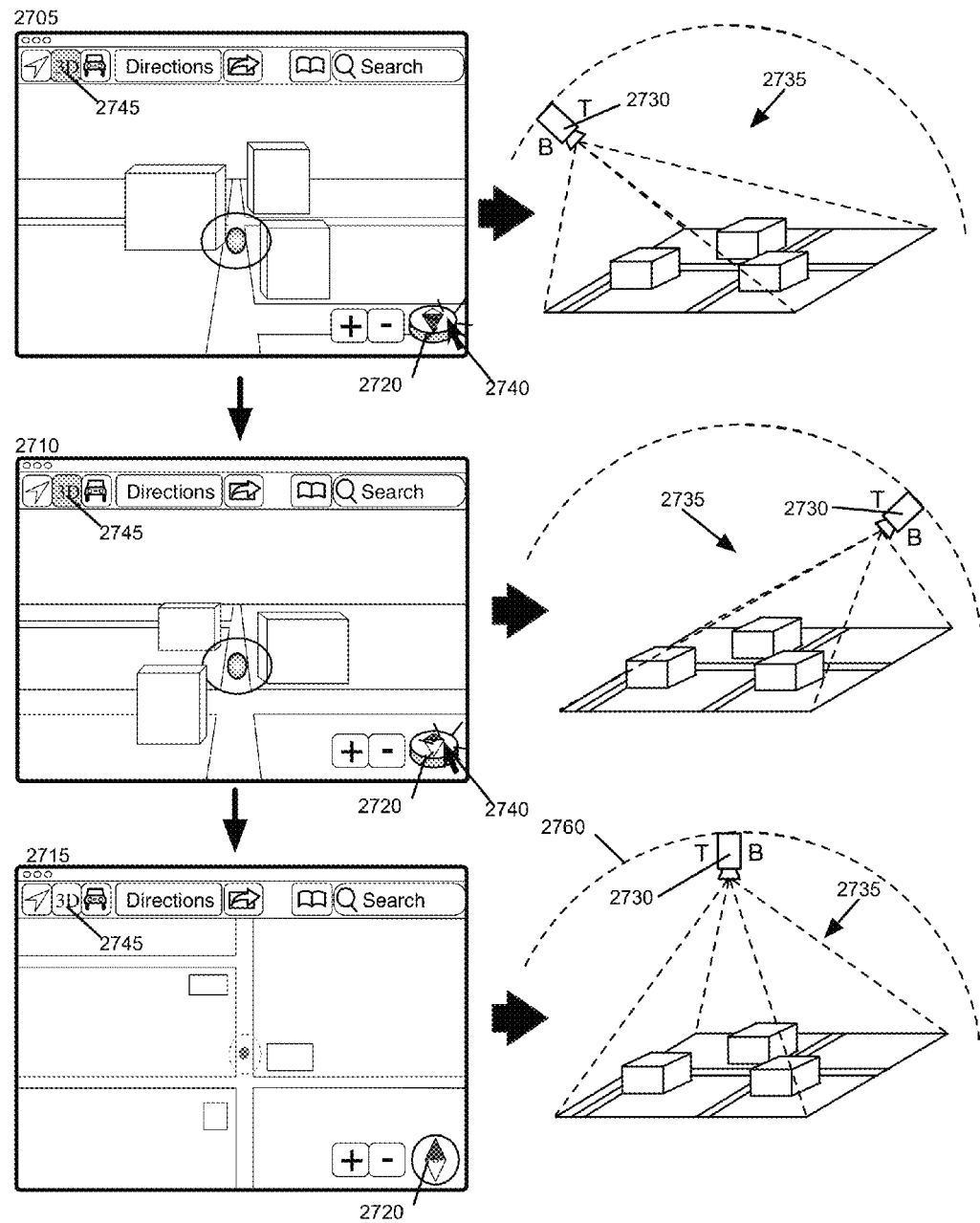
FIG. 27 conceptually illustrates using the compass control to restore a north-up orientation and to transition from a 3D mode to a 2D mode.

The compass control can also be used to transition from a 3D mode back to a 2D mode. FIG. 27 illustrates using the compass control to restore a north-up orientation and to transition from a 3D mode to a 2D mode. This example illustrated in this figure is provided in terms of three stages 2705-2715 of interactions with the mapping application. Furthermore, for each stage 2705-2715 the figure also illustrates the virtual camera 2730 position for the particular stage in order to conceptualize the position in the map scene 2735 from which the device renders the scene to generate the view of the map.

Stage 2705 illustrates the mapping application displaying a region of the map in a 3D mode. The region includes three buildings and various intersecting roads displayed in three-dimensions. The compass control 2720 currently indicates that the mapping view is facing south. Likewise the virtual camera 2730 is positioned at an angle over the map scene 2735. The top and bottom of the virtual camera 2730 have also been labeled for explanatory purposes. As orientated, the virtual camera 2730 is currently positioned such that the right side of the map scene 2735 corresponds to the top of the map as shown on the device. Stage 2705 also illustrates the mapping application receiving a user selection of the compass control 2720 through a location indicator 2740 on the screen. After a user selects the compass control 2725 a first time, the mapping application restores a north-up orientation of the map.

Stage 2710 illustrates that the mapping application is now displaying the region of the map in a north-up orientation, as indicated by the colored portion of the compass control 2720 facing upwards. Likewise, the virtual camera 2730 now indicates that the virtual camera is at the opposite end of the map scene 2735 as from stage 2705. Now, the left side of the map scene 2635 corresponds to the top of the map. Stage 2710 illustrates the mapping application receiving a second user selection of the compass control 2720 through the location indicator 2740. After receiving a second selection input, the compass control 2720 causes the map view to transition from the 3D mode to a 2D mode.

Stage 2715 illustrates the mapping application displaying a 2D mode of the region of the map. The three buildings and the roads on the map now appear flat on the screen in two-dimensions. Furthermore, the compass control 2720 is illustrated as upright and shown in 2D on the screen to provide a further indication that the mapping application is back into a 2D mode. Likewise, the 3D control icon 2745 is no longer highlighted to indicate that the mapping application is in 2D mode. The corresponding virtual camera 2730 over the map scene 2735 has moved back to the top of the dashed-arc 2760 to a 90 degree angle with respect to the horizon. By having the virtual camera 2730 at this angle directly above the map scene 2735, the building and roads now appear flat on the screen in two dimensions. Note that the user may also select the 3D control 2745, in some embodiments, in order to toggle between a 2D and 3D presentation of the map. In particular, the user may select the 3D control 2745 with an input device or through a shortcut hotkey. The 3D control provides a quick mechanism for transitioning between 2D and 3D in addition to the various other mechanisms that have been described.

Figure 28:
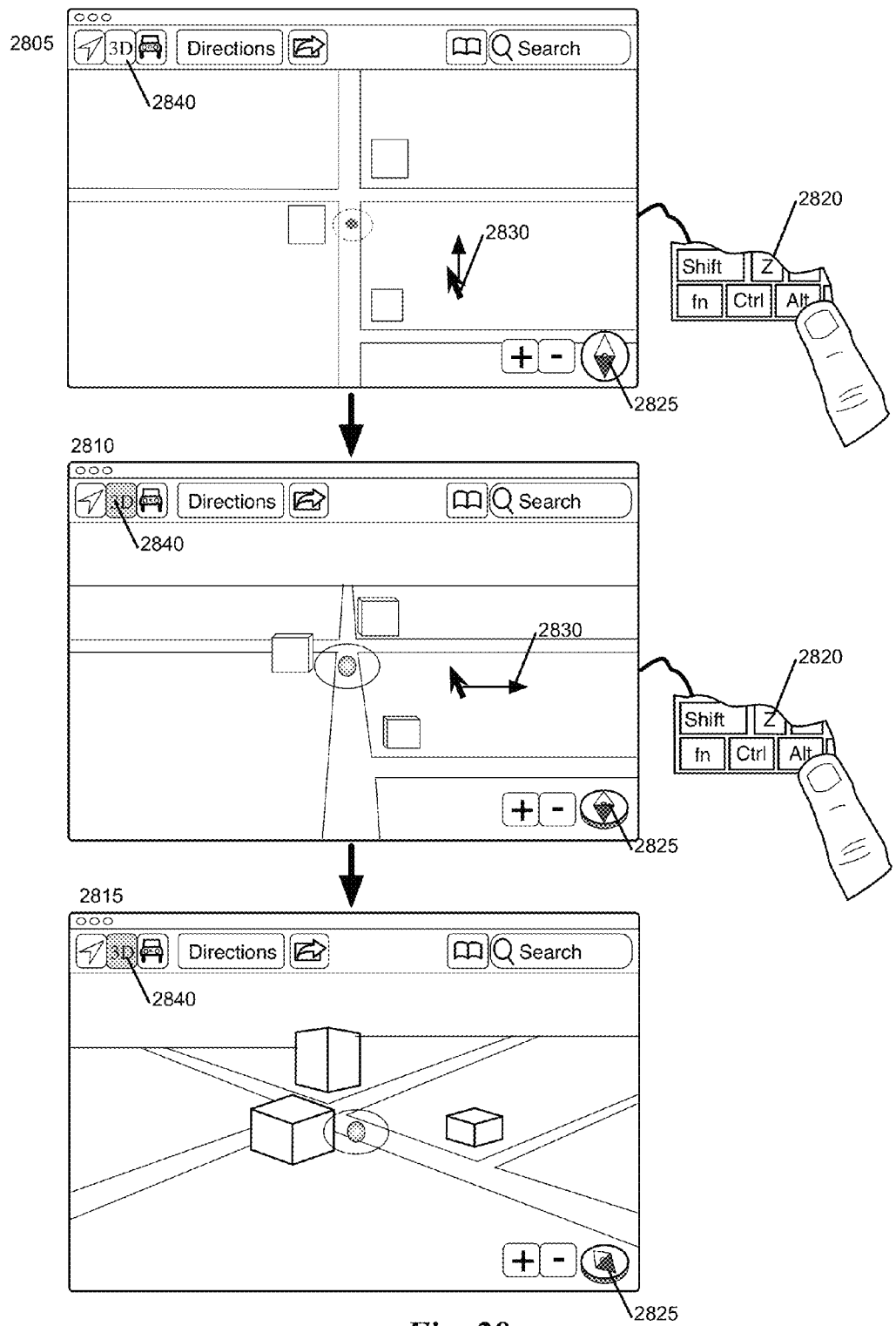
FIG. 28 conceptually illustrates a mechanism for changing the display of the map using a combination of a keypad and the location indicator.

In addition to using the compass control to navigate the map, a user may also use a combination of a location indicator control and a keypad to control the navigation of the map region displayed by the mapping application. FIG. 28 illustrates a mechanism for changing the display of the map view using a combination of a keypad and the location indicator. This example illustrated in this figure is provided in terms of three stages 2805-2815 of interactions with the mapping application. Stages 2805 and 2810 also illustrate a portion of keypad that is used to control the mapping application.

The first stage 2805 illustrates the mapping application displaying a region of a map in a 2D mode. The region includes three buildings and several intersecting roads. The compass control 2825 currently indicates that map faces south. In this stage, the user is selecting with the location indicator 2830 a particular area of the map and moving the location indicator in a vertical direction. Furthermore, as the user moves the location indicator 2830 upwards on the map, the user is concurrently selecting and holding the "Alt" key on the keypad 2820. This causes the mapping application to transition the map from the 2D mode to a 3D mode. Selecting and dragging the compass control 2825 in a vertical direction could also produce this operation. In some embodiments, if the user were to select and drag the map without holding the "Alt" key, the mapping application would drag the region of the map being displayed according to the particular movement of the input device. For example, dragging the map would be one mechanism for moving to and displaying different regions of the map.

Stage 2810 illustrates that the mapping application is now displaying the region of the map in 3D mode. The three buildings now appear in three-dimensions. Furthermore, both the compass control 2825 and the 3D icon 2840 now indicate that the mapping application is in 3D mode. By holding the "Alt" key on the keypad 2820 and dragging the location indicator vertically on the map, the user has effectively performed the same operation as described in FIG. 22 above with respect to dragging the compass control 2825 in a vertical direction. The user can also cause the mapping application to rotate the map region being displayed in a similar manner as described in FIG. 24, using a combination of the keypad and location indicator controls.

Stage 2810 illustrates that the user has selected the "Alt" key on the keypad and concurrently dragging the location indicator 2830 in a horizontal direction. This causes the mapping application to rotate the region of the map being displayed by the mapping application. Stage 2815 illustrates the mapping application displaying the region of the map from a different rotated vantage point from stage 2810. The compass control 2825 has also been rotated from its position in stage 2810. The user may use different mechanisms for applying the same operations within the mapping application. FIG. 28 illustrates the use of both a keypad and the location indicator to control the viewing rotation and angle of a particular map region. In some embodiments, the user may control the map region using different combinations of keypad and location indicator movements. For example, the user may customize different keys on their keypad to correspond to different operations.

FIG. 29 conceptually illustrates a state diagram 2900 that describes different states and transitions between these states for the compass control of the mapping application of some embodiments (e.g., the application described in the above sections). One of ordinary skill in the art will recognize that the application of some embodiments will have many different states related to all different types of input events, and the state diagram 2900 is specifically focused on a subset of these events. The state diagram 2900 describes and refers to various user input (e.g., select, vertical drag, horizontal drag, etc.) on the compass control for changing states of the application. One of ordinary skill in the art will recognize that various devices, such as touch-screen gestural input, keyboard input, touchpad/track pad input, etc., may be used for providing similar selection and/or drag operations.

In some embodiments, when a user initially opens the mapping application, the mapping application is in state 2905, which is a 2D north-up map browsing state. In this state, the mapping application displays a region of the map in a two dimensional mode. Furthermore, the mapping application displays the region of the map such that the top of the map faces north. In some embodiments, the mapping application is displayed on a device with that receives user input through various input devices, including any combination of a mouse, a trackpad, and a keypad. When the mapping application receives a user input on the compass control, the application may transition to various different states depending on the type of input.

In state 2905, when the mapping application receives a selection input (e.g., via a mouse-click) of the compass control, the mapping application transitions from state 2905 to state 2910 to animate a transition of the map from a 2D to 3D mode. The animation animates the region of map raising from the ground, as described above in FIG. 22. After the mapping application performs the animation, the mapping application transitions to state 2915 and displays the map in a 3D mode with a north-up orientation.

From state 2905, when the mapping receives a selection and subsequent vertical drag of the compass control in an upward direction, the mapping application transitions from state 2905 to state 2920 to animate a transition of the map from a 2D to 3D mode. The animation animates the region of map raising from the ground, as described above in FIG. 22. The animation continues for as long as the user performs the upward dragging of the compass control, until the user reaches a minimum angle between the virtual camera and the ground. When the compass control is no longer being dragged, or the minimum virtual camera angle is reached, the mapping application transitions to state 2915 and displays the map in the 3D mode with a north-up orientation. The animation state 2920 differs from the state 2910 in that the animation stopping point is defined based for the state 2910, but dependent on the user input for the state 2920. In addition, while in the state 2915, the mapping application can transition back to state 2920 if a vertical drag upwards is received and the minimum virtual camera angle for viewing the map has not been reached.

From state 2905, when the mapping application receives a selection and subsequent horizontal drag of the compass control, the mapping application transitions from state 2905 to state 2925 to animate a rotation of the map. The animation animates the region of map rotating, as described above in FIG. 24. The animation continues for as long as the user performs the horizontal dragging of the compass control. When the compass control is no longer being dragged and the map is in a non-north-up orientation (i.e., not facing north), the mapping application transitions to state 2930 and displays the map in the 2D mode with a non-north-up orientation (i.e., the orientation of the map when the rotation stopped). When the user stops dragging the compass control with the map in a north-up orientation (i.e., facing north), the mapping application transitions back to state 2905 and displays the map in the 2D mode with a north-up orientation.

From state 2915, when the mapping application is in the 3D north-up display state and the compass control receives a vertical drag in the downward direction, the mapping application transitions from state 2915 to state 2935 to animate a transition of the map from a 3D to 2D mode. The animation animates the region of map flattening into the ground, as described above in FIG. 23 (i.e., by moving a virtual camera in an arc upwards). The animation continues for as long as the user performs the downward dragging of the compass control. When the mapping application has reached a 2D mode (i.e., the virtual camera reaches a 90° angle with the map), the mapping application transitions to state 2905 and displays the map in the 2D mode with a north-up orientation. When the compass control is no longer being dragged and the mapping application is still in a 3D mode (because the virtual camera has not reached the 90° angle), the mapping application transitions back to state 2915 and displays the map in the 3D mode with a north-up orientation.

From state 2915, when the mapping application is in the 3D north-up display state and the mapping application receives a selection input (e.g., via a mouse-click) of the compass control, the mapping application transitions from state 2915 to state 2940 to animate a transition of the map from a 3D to 2D mode. The animation animates the region of map flattening back into the ground, as described above in FIG. 23. In this case, unlike the state 2935, the animation will always complete the transition to 2D mode. After the mapping application performs the animation, the mapping application transitions to state 2905 and displays the map in a 2D mode with a north-up orientation.

From state 2915, when the mapping application receives a selection and subsequent horizontal drag of the compass control, the mapping application transitions from state 2915 to state 2945 to animate a rotation of the map. The animation animates the region of map rotating, as described above in FIG. 24. The animation continues for as long as the user performs the horizontal dragging of the compass control. When the compass control is no longer being dragged and the map is in a non-north-up orientation (i.e., not facing north), the mapping application transitions to state 2950 and displays the map in the 3D mode with a non-north-up orientation. When the compass control is no longer being dragged and the map is in a north-up orientation (i.e., facing north), the mapping application transitions back to state 2915 and displays the map in the 3D mode with a north-up orientation.

From state 2930, when the mapping application receives a selection of the compass control, the mapping application transitions from state 2930 to state 2955 to animate a rotation of the map. The animation animates the region of map rotating until the map reaches a north-up orientation, as described above in stages 2605 and 2610 of FIG. 26. After reaching a north-up orientation, the mapping application transitions to state 2905 and displays the map in the 2D mode with a north-up orientation. In some embodiments, the map automatically rotates in a specific one of a clockwise or counter-clockwise direction (i.e., always in the same direction). In other embodiments, the map rotates in whichever direction will cause the map to reach a north-up orientation more quickly.

In state 2930, when the mapping application receives a selection and subsequent horizontal drag of the compass control, the mapping application transitions from state 2930 to state 2925 to animate a rotation of the map. The animation animates the region of map rotating, as described above in FIG. 24. The animation continues for as long as the user performs the horizontal dragging of the compass control. When the compass control is no longer being dragged and the map is in a non-north-up orientation (i.e., not facing north), the mapping application transitions back to state 2930 and displays the map in the 2D mode with a non-north-up orientation (i.e., the orientation of the map when the rotation stopped). When the user stops dragging the compass control with the map in a north-up orientation (i.e., facing north), the mapping application transitions to state 2905 and displays the map in the 2D mode with a north-up orientation.

From state 2930, when the mapping application receives a selection and subsequent vertical drag of the compass control in an upward direction, the mapping application transitions from state 2930 to state 2960 to animate a transition of the map from a 2D to 3D mode. The animation animates the region of map raising from the ground, as described above in FIG. 22. The animation continues for as long as the user performs the upward dragging of the compass control, until the user reaches a minimum angle between the virtual camera and the ground. When the compass control is no longer being dragged, or the minimum virtual camera angle is reached, the mapping application transitions to state 2950 and displays the map in the 3D mode with a non-north-up orientation. While in the state 2950, the mapping application can transition back to state 2960 if a vertical drag upwards is received and the minimum virtual camera angle for viewing the map has not been reached.

From state 2950, when the mapping application is in the 3D non-north-up display state and receives a selection input (e.g., via a mouse-click) of the compass control, the mapping application transitions from state 2950 to state 2965 to animate a rotation of the map. The animation animates the region of map rotating until the map reaches a north-up orientation, as described above in stages 2705 and 2710 of FIG. 27. After reaching a north-up orientation, the mapping application transitions to state 2915 and displays the map in the 3D mode with a north-up orientation. In some embodiments, the map automatically rotates in a specific one of a clockwise or counter-clockwise direction (i.e., always in the same direction). In other embodiments, the map rotates in whichever direction will cause the map to reach a north-up orientation more quickly.

From state 2950, when the mapping application receives a selection and subsequent horizontal drag of the compass control, the mapping application transitions from state 2950 to state 2945 to animate a rotation of the map. The animation animates the region of map rotating, as described above in FIG. 24. The animation continues for as long as the user performs the horizontal dragging of the compass control. When the compass control is no longer being dragged and the map is in a non-north-up orientation (i.e., not facing north), the mapping application transitions back to state 2950 and displays the map in the 3D mode with a non-north-up orientation (i.e., the orientation of the map when the rotation stopped). When the user stops dragging the compass control with the map in a north-up orientation (i.e., facing north), the mapping application transitions to state 2915 and displays the map in the 3D mode with a north-up orientation.

From state 2950, when the mapping application is in the 3D non-north-up display state and the compass control receives a vertical drag in the downward direction, the mapping application transitions from state 2950 to state 2970 to animate a transition of the map from a 3D to 2D mode. The animation animates the region of map flattening into the ground, as described above in FIG. 23 (i.e. by moving a virtual camera in an arc upwards). The animation continues for as long as the user performs the downward dragging of the compass control. When the mapping application has reached a 2D mode (i.e., the virtual camera reaches a 90° angle with the map), the mapping application transitions to state 2930 and displays the map in the 2D mode with a non-north-up orientation. When the compass control is no longer being dragged and the mapping application is still in a 3D mode (because the virtual camera has not reached the 90° angle), the mapping application transitions back to state 2950 and displays the map in the 3D mode with a non-north-up orientation.

The state diagram 2900 illustrates changing between different states based on input received as either a horizontal drag or a vertical drag of the compass control. In particular, the horizontal drag determines the rotation of the map and the vertical drag determines the transitioning of the map between 2D and 3D modes. One of ordinary skill in the art will recognize that in some embodiments, a diagonal drag may result in a combined rotating and transitioning of the map. In particular, in some embodiments, when the mapping application receives a diagonal drag, the mapping application computes a horizontal drag value and a vertical drag value for the diagonal drag, and these values determine the particular rotation and transitioning effects to simultaneously apply to the map for the particular drag. As such, the mapping application will include states for rotating and transitioning from 2D to 3D (or vice versa) simultaneously.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 30:
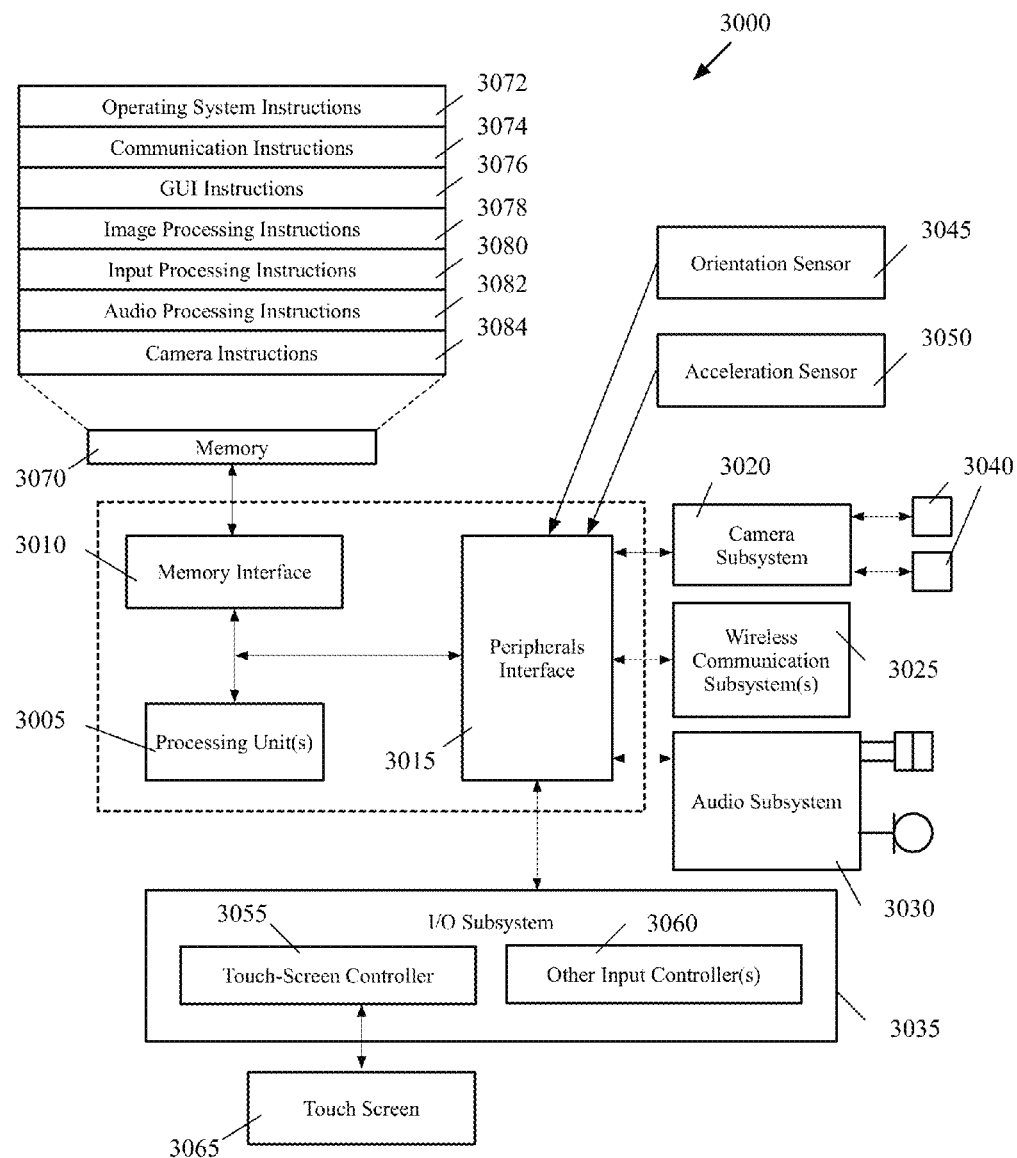
FIG. 30 conceptually illustrates an architecture of a mobile computing device with which some embodiments are implemented.

The mapping and navigation applications of some embodiments operate on mobile devices, such as smart phones (e.g., iPhones®) and tablets (e.g., iPads®). FIG. 30 is an example of an architecture 3000 of such a mobile computing device. Examples of mobile computing devices include smartphones, tablets, laptops, etc. As shown, the mobile computing device 3000 includes one or more processing units 3005, a memory interface 3010 and a peripherals interface 3015.

The peripherals interface 3015 is coupled to various sensors and subsystems, including a camera subsystem 3020, a wireless communication subsystem(s) 3025, an audio subsystem 3030, an I/O subsystem 3035, etc. The peripherals interface 3015 enables communication between the processing units 3005 and various peripherals. For example, an orientation sensor 3045 (e.g., a gyroscope) and an acceleration sensor 3050 (e.g., an accelerometer) is coupled to the peripherals interface 3015 to facilitate orientation and acceleration functions.

The camera subsystem 3020 is coupled to one or more optical sensors 3040 (e.g., a charged coupled device (CCD) optical sensor, a complementary metal-oxide-semiconductor (CMOS) optical sensor, etc.). The camera subsystem 3020 coupled with the optical sensors 3040 facilitates camera functions, such as image and/or video data capturing. The wireless communication subsystem 3025 serves to facilitate communication functions. In some embodiments, the wireless communication subsystem 3025 includes radio frequency receivers and transmitters, and optical receivers and transmitters (not shown in FIG. 30). These receivers and transmitters of some embodiments are implemented to operate over one or more communication networks such as a GSM network, a Wi-Fi network, a Bluetooth network, etc. The audio subsystem 3030 is coupled to a speaker to output audio (e.g., to output voice navigation instructions). Additionally, the audio subsystem 3030 is coupled to a microphone to facilitate voice-enabled functions, such as voice recognition (e.g., for searching), digital recording, etc.

The I/O subsystem 3035 involves the transfer between input/output peripheral devices, such as a display, a touch screen, etc., and the data bus of the processing units 3005 through the peripherals interface 3015. The I/O subsystem 3035 includes a touch-screen controller 3055 and other input controllers 3060 to facilitate the transfer between input/output peripheral devices and the data bus of the processing units 3005. As shown, the touch-screen controller 3055 is coupled to a touch screen 3065. The touch-screen controller 3055 detects contact and movement on the touch screen 3065 using any of multiple touch sensitivity technologies. The other input controllers 3060 are coupled to other input/control devices, such as one or more buttons. Some embodiments include a near-touch sensitive screen and a corresponding controller that can detect near-touch interactions instead of or in addition to touch interactions.

The memory interface 3010 is coupled to memory 3070. In some embodiments, the memory 3070 includes volatile memory (e.g., high-speed random access memory), non-volatile memory (e.g., flash memory), a combination of volatile and non-volatile memory, and/or any other type of memory. As illustrated in FIG. 30, the memory 3070 stores an operating system (OS) 3072. The OS 3072 includes instructions for handling basic system services and for performing hardware dependent tasks.

The memory 3070 also includes communication instructions 3074 to facilitate communicating with one or more additional devices; graphical user interface instructions 3076 to facilitate graphic user interface processing; image processing instructions 3078 to facilitate image-related processing and functions; input processing instructions 3080 to facilitate input-related (e.g., touch input) processes and functions; audio processing instructions 3082 to facilitate audio-related processes and functions; and camera instructions 3084 to facilitate camera-related processes and functions. The instructions described above are merely exemplary and the memory 3070 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 30 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 30 may be split into two or more integrated circuits.

B. Computer System

Figure 31:
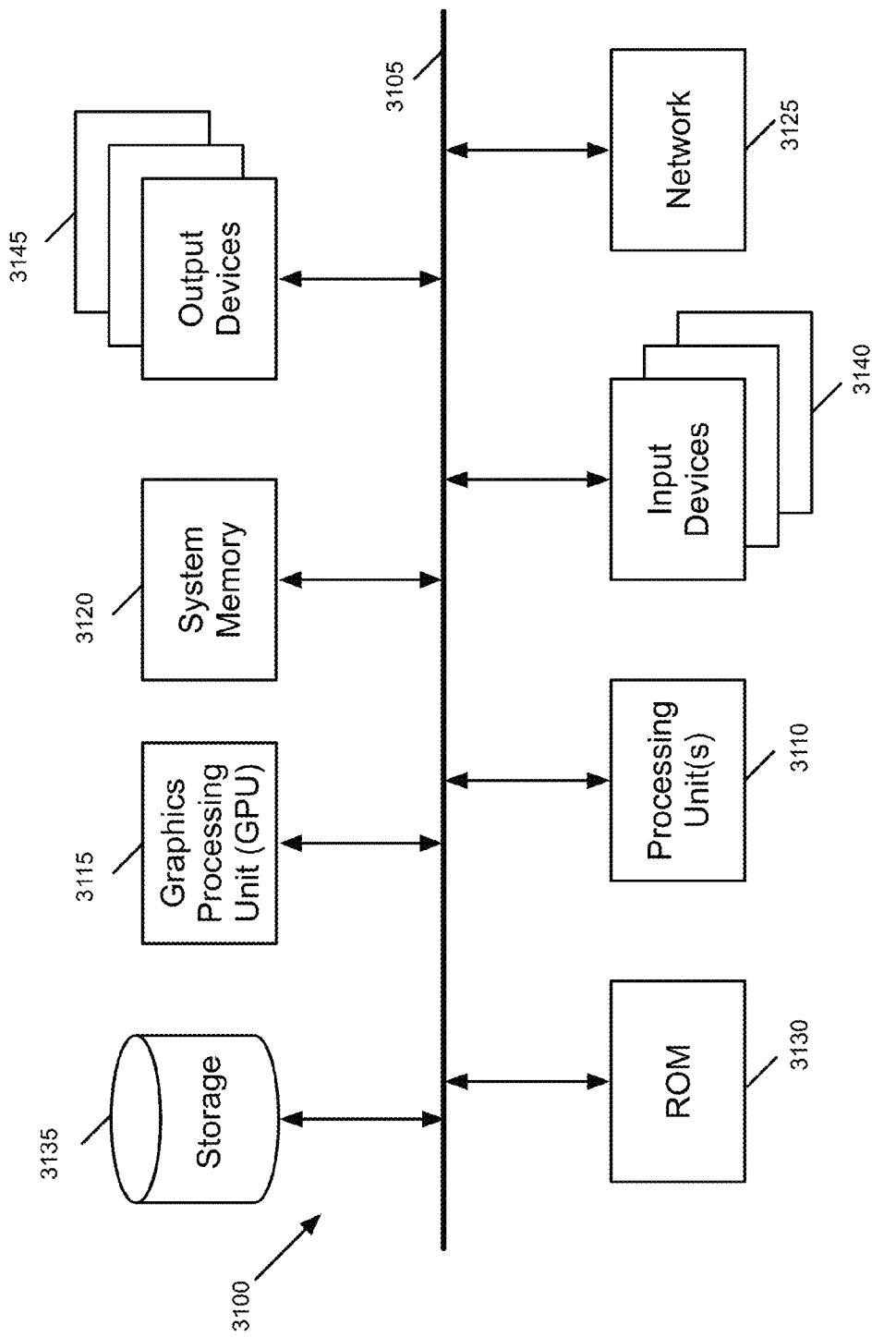
FIG. 31 conceptually illustrates an electronic system with which some embodiments of the invention are implemented.

FIG. 31 conceptually illustrates another example of an electronic system 3100 with which some embodiments of the invention are implemented. The electronic system 3100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3100 includes a bus 3105, processing unit(s) 3110, a graphics processing unit (GPU) 3115, a system memory 3120, a network 3125, a read-only memory 3130, a permanent storage device 3135, input devices 3140, and output devices 3145.

The bus 3105 collectively represents all system, peripheral, and chipset buses that communicatively connect the numerous internal devices of the electronic system 3100. For instance, the bus 3105 communicatively connects the processing unit(s) 3110 with the read-only memory 3130, the GPU 3115, the system memory 3120, and the permanent storage device 3135.

From these various memory units, the processing unit(s) 3110 retrieves instructions to execute and data to process in order to execute the processes of the invention. The processing unit(s) may be a single processor or a multi-core processor in different embodiments. Some instructions are passed to and executed by the GPU 3115. The GPU 3115 can offload various computations or complement the image processing provided by the processing unit(s) 3110. In some embodiments, such functionality can be provided using CoreImage's kernel shading language.

The read-only-memory (ROM) 3130 stores static data and instructions that are needed by the processing unit(s) 3110 and other modules of the electronic system. The permanent storage device 3135, on the other hand, is a read-and-write memory device. This device is a non-volatile memory unit that stores instructions and data even when the electronic system 3100 is off. Some embodiments of the invention use a mass-storage device (such as a magnetic or optical disk and its corresponding disk drive, integrated flash memory) as the permanent storage device 3135.

Other embodiments use a removable storage device (such as a floppy disk, flash memory device, etc., and its corresponding drive) as the permanent storage device. Like the permanent storage device 3135, the system memory 3120 is a read-and-write memory device. However, unlike storage device 3135, the system memory 3120 is a volatile read-and-write memory, such a random access memory. The system memory 3120 stores some of the instructions and data that the processor needs at runtime. In some embodiments, the invention's processes are stored in the system memory 3120, the permanent storage device 3135, and/or the read-only memory 3130. For example, the various memory units include instructions for processing multimedia clips in accordance with some embodiments. From these various memory units, the processing unit(s) 3110 retrieves instructions to execute and data to process in order to execute the processes of some embodiments.

The bus 3105 also connects to the input and output devices 3140 and 3145. The input devices 3140 enable the user to communicate information and select commands to the electronic system. The input devices 3140 include alphanumeric keyboards and pointing devices (also called "cursor control devices"), cameras (e.g., webcams), microphones or similar devices for receiving voice commands, etc. The output devices 3145 display images generated by the electronic system or otherwise output data. The output devices 3145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 31, bus 3105 also couples electronic system 3100 to a network 3125 through a network adapter (not shown). In this manner, the computer can be a part of a network of computers (such as a local area network ("LAN"), a wide area network ("WAN"), or an Intranet), or a network of networks, such as the Internet. Any or all components of electronic system 3100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 32:
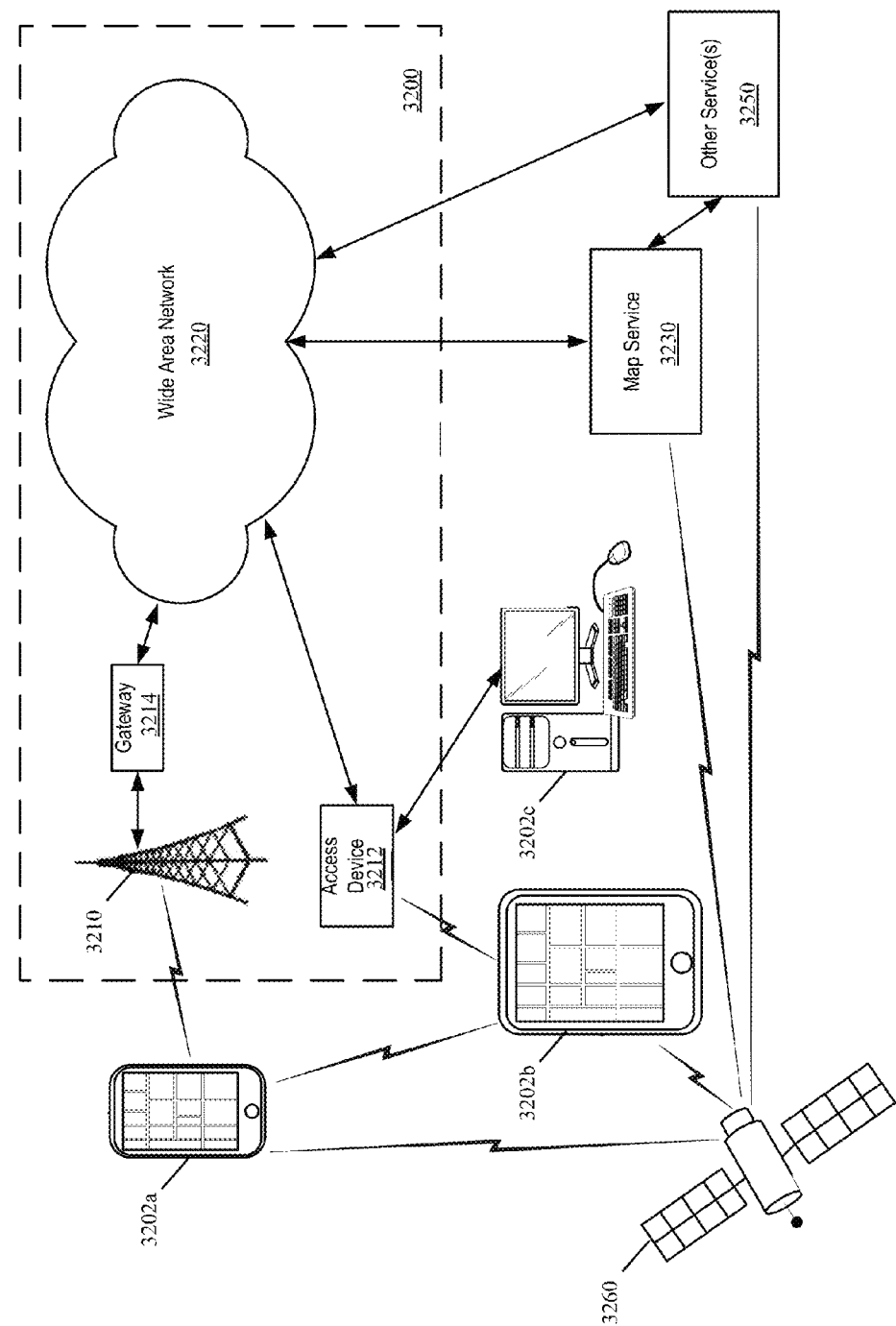
FIG. 32 illustrates a map service operating environment, according to some embodiments.

Various embodiments may operate within a map service operating environment. FIG. 32 illustrates a map service operating environment, according to some embodiments. A map service 3230 (also referred to as mapping service) may provide map services for one or more client devices 3202a-3202c in communication with the map service 3230 through various communication methods and protocols. A map service 3230 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 3202a-3202c may utilize these map services by obtaining map service data. Client devices 3202a-3202c may implement various techniques to process map service data. Client devices 3202a-3202c may then provide map services to various entities, including, but not limited to, users, internal software or hardware modules, and/or other systems or devices external to the client devices 3202a-3202c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wired or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 3202a-3202c) are implemented on different portable-multifunction device types. Client devices 3202a-3202c utilize map service 3230 through various communication methods and protocols. In some embodiments, client devices 3202a-3202c obtain map service data from map service 3230. Client devices 3202a-3202c request or receive map service data. Client devices 3202a-3202c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS) system. A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow the virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wired or wireless network type).

FIG. 32 illustrates one possible embodiment of an operating environment 3200 for a map service 3230 and client devices 3202a-3202c. In some embodiments, devices 3202a, 3202b, and 3202c communicate over one or more wired or wireless networks 3210. For example, wireless network 3210, such as a cellular network, can communicate with a wide area network (WAN) 3220, such as the Internet, by use of gateway 3214. A gateway 3214 in some embodiments provides a packet oriented mobile data service, such as General Packet Radio Service (GPRS), or other mobile data service allowing wireless networks to transmit data to other networks, such as wide area network 3220. Likewise, access device 3212 (e.g., IEEE 802.11g wireless access device) provides communication access to WAN 3220. Devices 3202a and 3202b can be any portable electronic or computing device capable of communicating with a map service. Device 3202c can be any non-portable electronic or computing device capable of communicating with a map service.

In some embodiments, both voice and data communications are established over wireless network 3210 and access device 3212. For instance, device 3202a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 3210, gateway 3214, and WAN 3220 (e.g., using Transmission Control Protocol/Internet Protocol (TCP/IP) or User Datagram Protocol (UDP)). Likewise, in some implementations, devices 3202b and 3202c can place and receive phone calls, send and receive e-mail messages, and retrieve electronic documents over access device 3212 and WAN 3220. In various embodiments, any of the illustrated client devices may communicate with map service 3230 and/or other service(s) 3250 using a persistent connection established in accordance with one or more security protocols, such as the Secure Sockets Layer (SSL) protocol or the Transport Layer Security (TLS) protocol.

Devices 3202a and 3202b can also establish communications by other means. For example, wireless device 3202a can communicate with other wireless devices (e.g., other devices 3202b, cell phones, etc.) over the wireless network 3210. Likewise devices 3202a and 3202b can establish peer-to-peer communications 3240 (e.g., a personal area network) by use of one or more communication subsystems, such as Bluetooth® communication from Bluetooth Special Interest Group, Inc. of Kirkland, Wash. Device 3202c can also establish peer to peer communications with devices 3202a or 3202b (not shown). Other communication protocols and topologies can also be implemented. Devices 3202a and 3202b may also receive Global Positioning Satellite (GPS) signals from GPS satellites 3260.

Devices 3202a, 3202b, and 3202c can communicate with map service 3230 over one or more wire and/or wireless networks, 3210 or 3212. For instance, map service 3230 can provide map service data to rendering devices 3202a, 3202b, and 3202c. Map service 3230 may also communicate with other services 3250 to obtain data to implement map services. Map service 3230 and other services 3250 may also receive GPS signals from GPS satellites 3260.

In various embodiments, map service 3230 and/or other service(s) 3250 are configured to process search requests from any of the client devices. Search requests may include but are not limited to queries for businesses, addresses, residential locations, points of interest, or some combination thereof. Map service 3230 and/or other service(s) 3250 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 3230 and/or other service(s) 3250 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 3230 and/or other service(s) 3250, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 3230 and/or other service(s) 3250 provide one or more feedback mechanisms to receive feedback from client devices 3202a-3202c. For instance, client devices may provide feedback on search results to map service 3230 and/or other service(s) 3250 (e.g., feedback specifying ratings, reviews, temporary or permanent business closures, errors etc.); this feedback may be used to update information about points of interest in order to provide more accurate or more up-to-date search results in the future. In some embodiments, map service 3230 and/or other service(s) 3250 may provide testing information to the client device (e.g., an A/B test) to determine which search results are best. For instance, at random intervals, the client device may receive and present two search results to a user and allow the user to indicate the best result. The client device may report the test results to map service 3230 and/or other service(s) 3250 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A non-transitory machine readable medium storing a mapping application for execution by at least one processing unit, the mapping application comprising sets of instructions for:
   displaying, on a display screen of a device, a presentation of a map at a particular zoom level;
   receiving an initial input at a first location on the map to zoom the map to a second zoom level;
   detecting that the first location is within a threshold distance of a location of a location of interest (LOI) on the map;
   modifying the presentation of the map to be at the second zoom level using the location of the LOI to determine a center point for the presentation of the map on the display screen at the second zoom level;
   receiving a second input at a second location on the map to zoom the map to a third zoom level;
   determining whether the second input is received within a particular threshold time period from the receipt of the initial input; and
   upon determining that the second input was received within the particular threshold time period from receiving the initial input, modifying the presentation of the map to be at the third zoom level using the location of the LOI to determine a center point for the presentation of the map on the display screen at the third zoom level.

2. The non-transitory machine readable medium of claim 1, wherein the center point is the LOI.

3. The non-transitory machine readable medium of claim 1, wherein the mapping application further comprises a set of instructions for, upon determining that a second input is not received within a particular threshold time period from the receipt of the initial input, modifying the presentation of the map to be at the third zoom level using the location of the second input to determine a center point for the presentation of the map on the display screen at the third zoom level.

4. A non-transitory machine readable medium storing a mapping application for execution by at least one processing unit, the mapping application comprising sets of instructions for:
   displaying, on a display screen of a device, a presentation of a map at a first zoom level;
   receiving an initial input at a first location on the map to zoom the map to a second zoom level;
   modifying the presentation of the map to be at the second zoom level using the first location to identify a center for the map presentation as the presentation zooms to the second level;
   receiving an input at a second location on the map to zoom the map to a third zoom level; and
   modifying the presentation of the map to be at the third zoom level while using the first location to identify a center for the map presentation as the presentation zooms to the third level.

5. The non-transitory machine readable medium of claim 1,
   wherein the location of interest is one of a pre-defined point of interest and a user-specified selectable location, and
   wherein the threshold distance is (i) a first threshold distance when the location of interest is a pre-defined point of interest and (ii) a second, larger threshold distance when the location of interest is a user-specified selectable location.

6. The non-transitory machine readable medium of claim 1, wherein the location of interest is a selectable location of interest and the threshold distance is (i) a first threshold distance when the location of interest is unselected and (ii) a second, larger threshold distance when the location of interest is selected.

7. The non-transitory machine readable medium of claim 1, wherein the mapping application further comprises sets of instructions for:
   detecting that the first location is within a threshold distance of a plurality of LOIs on the map;
   modifying the presentation of the map to be at the second zoom level using the location of the closest of the plurality of LOIs to determine a center point for the presentation of the map on the display screen at the second zoom level; and
   upon determining that the second input was received within the particular threshold time period from receiving the initial input, modifying the presentation of the map to be at the third zoom level using the location of the closest of the plurality of LOIs to determine a center point for the presentation of the map on the display screen at the third zoom level.

8. The non-transitory machine readable medium of claim 4, wherein the sets of instructions for modifying the presentation of the map using the first location to identify a center for the map presentation comprise sets of instructions for detecting that the first location is within a threshold distance of a location of a location of interest (LOI) on the map and using the location of the LOI to identify a center for the map presentation.

9. The non-transitory machine readable medium of claim 8, wherein the center for the map presentation is the LOI.

10. The non-transitory machine readable medium of claim 8, wherein the location of interest is a selectable location of interest and the threshold distance is (i) a first threshold distance when the location of interest is unselected and (ii) a second, larger threshold distance when the location of interest is selected.

11. The non-transitory machine readable medium of claim 4, wherein the sets of instructions for modifying the presentation of the map using the first location to identify a center for the map presentation comprise sets of instructions for using the locations of a plurality of LOIs that are within a threshold distance of the first location to identify a center for the map presentation.

12. The non-transitory machine readable medium of claim 11, wherein the sets of instructions for using the locations of a plurality of LOIs that are within a threshold distance of the first location to identify a center for the map presentation further comprise sets of instructions for computing a center of the plurality of LOIs to use in determining the center for the map presentation by averaging coordinates of the plurality of LOIs.

13. The non-transitory machine readable medium of claim 11, wherein the sets of instructions for using the locations of a plurality of LOIs that are within a threshold distance of the first location to identify a center for the map presentation further comprise sets of instructions for using the closest LOI of the plurality of LOIs to identify a center for the map presentation.

14. A mobile device comprising:
a set of processing units for executing instructions;
a display screen; and
a non-transitory machine-readable medium storing instructions for:
displaying, on the display screen, a presentation of a map at a particular zoom level;
receiving an initial input at a first location on the map to zoom the map to a second zoom level;
detecting that the first location is within a threshold distance of a location of a location of interest (LOI) on the map;
modifying the presentation of the map to be at the second zoom level using the location of the LOI to determine a center point for the presentation of the map on the display screen at the second zoom level;
receiving a second input at a second location on the map to zoom the map to a third zoom level;
determining whether the second input is received within a particular threshold time period from the receipt of the initial input; and
upon determining that the second input was received within the particular threshold time period from receiving the initial input, modifying the presentation of the map to be at the third zoom level using the location of the LOI to determine a center point for the presentation of the map on the display screen at the third zoom level.

15. The mobile device of claim 14, wherein the center point is the LOI.

16. The mobile device of claim 14, wherein the non-transitory machine-readable medium further stores instructions for:
upon determining that a second input is not received within a particular threshold time period from the receipt of the initial input, modifying the presentation of the map to be at the third zoom level using the location of the second input to determine a center point for the presentation of the map on the display screen at the third zoom level.

17. The mobile device of claim 14,
wherein the location of interest is one of a pre-defined point of interest and a user-specified selectable location, and
wherein the threshold distance is (i) a first threshold distance when the location of interest is a pre-defined point of interest and (ii) a second, larger threshold distance when the location of interest is a user-specified selectable location.

18. The mobile device of claim 14, wherein the location of interest is a selectable location of interest and the threshold distance is (i) a first threshold distance when the location of interest is unselected and (ii) a second, larger threshold distance when the location of interest is selected.

19. The mobile device of claim 14, wherein the display screen is a touchscreen and wherein the initial and second input comprise gestural input received from the touchscreen of the mobile device.

20. The mobile device of claim 14, wherein the threshold distance is a first threshold distance and the non-transitory machine-readable medium further stores instructions for:
determining that the first location is within a second threshold distance of a plurality of LOIs;
modifying the presentation of the map to be at the second zoom level using the locations of the plurality of LOIs to determine a center point for the presentation of the map on the display screen at the second zoom level; and
upon determining that the second input was received within the particular threshold time period from receiving the initial input, modifying the presentation of the map to be at the third zoom level using the locations of the plurality of LOIs to determine a center point for the presentation of the map on the display screen at the third zoom level.

21. The mobile device of claim 20 wherein the sets of instructions for modifying the presentation of the map using the locations of the plurality of LOIs to determine a center point for the presentation of the map at the second and third levels comprise sets of instructions for computing a center of the plurality of LOIs to use in determining the center point by averaging coordinates of the plurality of LOIs.

22. A mobile device comprising:
a set of processing units for executing instructions;
a display screen; and
a non-transitory machine-readable medium storing instructions for:
displaying, on the display screen, a presentation of a map at a first zoom level;
receiving an initial input at a first location on the map to zoom the map to a second zoom level;
modifying the presentation of the map to be at the second zoom level using the first location to identify a center for the map presentation as the presentation zooms to the second level;

receiving an input at a second location on the map to zoom the map to a third zoom level; and modifying the presentation of the map to be at the third zoom level while using the first location to identify a center for the map presentation as the presentation zooms to the third level.

23. The mobile device of claim 22, wherein the sets of instructions for modifying the presentation of the map using the first location to identify a center for the map presentation comprise sets of instructions for detecting that the first location is within a threshold distance of a location of a location of interest (LOI) on the map and using the location of the LOI to identify a center for the map presentation.

24. The mobile device of claim 22, wherein the display screen is a touchscreen and wherein the initial input and the input at the second location comprise gestural input received from the touchscreen of the mobile device.

25. The mobile device of claim 22, wherein the location of interest is a selectable location of interest and the threshold distance is (i) a first threshold distance when the location of interest is unselected and (ii) a second, larger threshold distance when the location of interest is selected.

26. The mobile device of claim 22, wherein the sets of instructions for modifying the presentation of the map using the first location to identify a center for the map presentation comprise sets of instructions for using the locations of a plurality of LOIs that are within a threshold distance of the first location to identify a center for the map presentation.

* * * * *